(12) United States Patent
Sakumoto

(10) Patent No.: US 9,178,700 B2
(45) Date of Patent: Nov. 3, 2015

(54) INFORMATION PROCESSING APPARATUS, INFORMATION PROCESSING METHOD, PROGRAM, AND RECORDING MEDIUM

(75) Inventor: Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/235,240

(22) PCT Filed: Jun. 25, 2012

(86) PCT No.: PCT/JP2012/066125
§ 371 (c)(1),
(2), (4) Date: Jan. 27, 2014

(87) PCT Pub. No.: WO2013/024629
PCT Pub. Date: Feb. 21, 2013

(65) Prior Publication Data
US 2014/0153717 A1 Jun. 5, 2014

(30) Foreign Application Priority Data

Aug. 12, 2011 (JP) ................................. 2011-177071

(51) Int. Cl.
*H04L 9/00* (2006.01)
*H04L 9/08* (2006.01)
(Continued)

(52) U.S. Cl.
CPC .............. *H04L 9/0861* (2013.01); *H04L 9/088* (2013.01); *H04L 9/3093* (2013.01); *H04L 9/3247* (2013.01); *H04L 9/3271* (2013.01)

(58) Field of Classification Search
CPC ..... H04L 9/0861; H04L 9/088; H04L 9/3221; H04L 9/3093
See application file for complete search history.

(56) References Cited

U.S. PATENT DOCUMENTS

| | | | |
|---|---|---|---|
| 2009/0010428 A1* | 1/2009 | Delgosha et al. | 380/30 |
| 2012/0039463 A1* | 2/2012 | Gentry et al. | 380/28 |
| 2013/0170640 A1* | 7/2013 | Gentry | 380/30 |

FOREIGN PATENT DOCUMENTS

| | | |
|---|---|---|
| EP | 2 600 563 A1 | 6/2013 |
| JP | 2011-254155 | 12/2011 |

OTHER PUBLICATIONS

U.S. Appl. No. 14/370,817, filed Jul. 7, 2014, Sakumoto, et al.
(Continued)

*Primary Examiner* — Nirav B Patel
*Assistant Examiner* — Mohammed Waliullah
(74) *Attorney, Agent, or Firm* — Oblon, McClelland, Maier & Neustadt, L.L.P.

(57) ABSTRACT

Provided an information processing apparatus including a message generation unit that generates a message based on a pair of multi-order multivariate polynomials $F=(f_1, \ldots, f_m)$ and a vector s that is an element of a set $K^n$, a message supply unit that supplies the message to a verifier storing the pair of multi-order multivariate polynomials F and vectors $y=(y_1, \ldots, y_m)=(f_1(s), \ldots, f_m(s))$, an intermediate information generation unit that generates third information based on first information randomly selected by the verifier and second information obtained at a time of generation of the message, an intermediate information supply unit that supplies the third information to the verifier, and a response supply unit that supplies the verifier with response information corresponding to a verification pattern which the verifier selects from among k (where k≥2) verification patterns.

16 Claims, 28 Drawing Sheets

(51) Int. Cl.
*H04L 9/30* (2006.01)
*H04L 9/32* (2006.01)

(56) References Cited

OTHER PUBLICATIONS

International Search Report issued Jul. 24, 2012 in Corresponding PCT/JP2012/066125 (with English translation).
Masahiro Yogisawa, "Zero—Knowledge Interactive Proof Systems Based on Linear indeterminate Equation", Transactions of Information Processing Society of Japan, vol. 35, No. 3, Mar. 15, 1994, pp. 359-363 (with partial English translation) 6 pages.
Yuichi Komano, et al., "ASS-CC: Provably Secure Algebraic Surface Signature Scheme", The 2010 Symposium on Cryptography and Information Security, Jan. 19, 2010, 6 pages.
Koichi Sakumoto, "Provable Security of HFE and UOV Signature Schemes against Chosen-Message Attack", The 2011 Symposium on Cryptography and Information Security, Jan. 25, 2011, 9 pages.
Koichi Sakumoto, et al., "Public-Key Identification Schemes Based on Multivariate Quadratic Polynomials", Advances in Cryptology, CRYPTO 2011, vol. 6841, Proceedings (LNCS 6841), Aug. 2011, pp. 706-723.
Koichi Sakumoto, et al., "Public-Key Identification Schemes Based on Multivariate Quadratic Polynomials",(online), Aug. 18, 2011, URL:http:/ www.iacr.org/cryptodb/archive/2011/CRYPTO/presentation/13-1-Sakumoto.pdf.
Jacques Patarin, "Asymmetric Cryptography with a Hidden Monomial", and a candidate algorithm for $\simeq$ 64 bits asymmetric signatures, 1998, 16 pages.
Jacques Patarin, "Quartz,128-Bit Long Digital Structures", http://www.minrank.org/quartz,2001, CT-RSA 2001, LNCS 2020, pp. 282-297.
Extended European Search Report issued May 18, 2015 in Patent Application No. 12823703.9.
Office Action issued Apr. 7, 2015 in Japanese Patent Application No. 2011-177071.

* cited by examiner

PUBLIC-KEY AUTHENTICATION SCHEME

DIGITAL SIGNATURE SCHEME

FIG. 19

MODIFICATION INTO EFFICIENT DIGITAL SIGNATURE SCHEME
(3-PASS)

SIGNATURE GENERATION ALGORITHM Sig (1) $a_i = (r_{0i}, t_{0i}, e_{0i}, r_{1i}, t_{1i}, e_{1i}, c_{0i}, c_{1i}, c_{2i})$
(2) $Cmt \leftarrow H(c_{01}, c_{11}, c_{21}, \cdots, c_{0N}, c_{1N}, c_{2N})$
(3) $(Ch_1, \cdots, Ch_N) \leftarrow H(M, Cmt)$
(4) $Rsp_i \leftarrow Select(Ch_i, a_i)$
(5) DIGITAL SIGNATURE: $(Cmt, Rsp_1, \cdots, Rsp_N)$

SIGNATURE VERIFYING ALGORITHM Ver (1) $(Ch_1, \cdots, Ch_N) \leftarrow H(M, Cmt)$
(2) $(c_{01}, c_{11}, c_{21}, \cdots, c_{0N}, c_{1N}, c_{2N}) \leftarrow$ Reproduce$(Ch_1, \cdots, Ch_N, Rsp_1, \cdots, Rsp_N)$
(3) check $Cmt = H(c_{01}, c_{11}, c_{21}, \cdots, c_{0N}, c_{1N}, c_{2N})$

⇒ IMPROVE EFFICIENCY

SIGNATURE GENERATION ALGORITHM Sig (1) $a_i = (r_{0i}, t_{0i}, e_{0i}, r_{1i}, t_{1i}, e_{1i}, c_{0i}, c_{1i}, c_{2i})$
(2) $(Ch_1, \cdots, Ch_N) \leftarrow H(M, c_{01}, \cdots, c_{2N})$
(3) $Rsp_i \leftarrow Select(Ch_i, a_i)$
(4) DIGITAL SIGNATURE: $(Ch_1, \cdots, Ch_N, Rsp_1, \cdots, Rsp_N)$

SIGNATURE VERIFYING ALGORITHM Ver (1) $(c_{01}, c_{11}, c_{21}, \cdots, c_{0N}, c_{1N}, c_{2N}) \leftarrow$ Reproduce$(Ch_1, \cdots, Ch_N, Rsp_1, \cdots, Rsp_N)$
(2) check $(Ch_1, \cdots, Ch_N)$
 $= H(M, c_{01}, c_{11}, c_{21}, \cdots, c_{0N}, c_{1N}, c_{2N})$

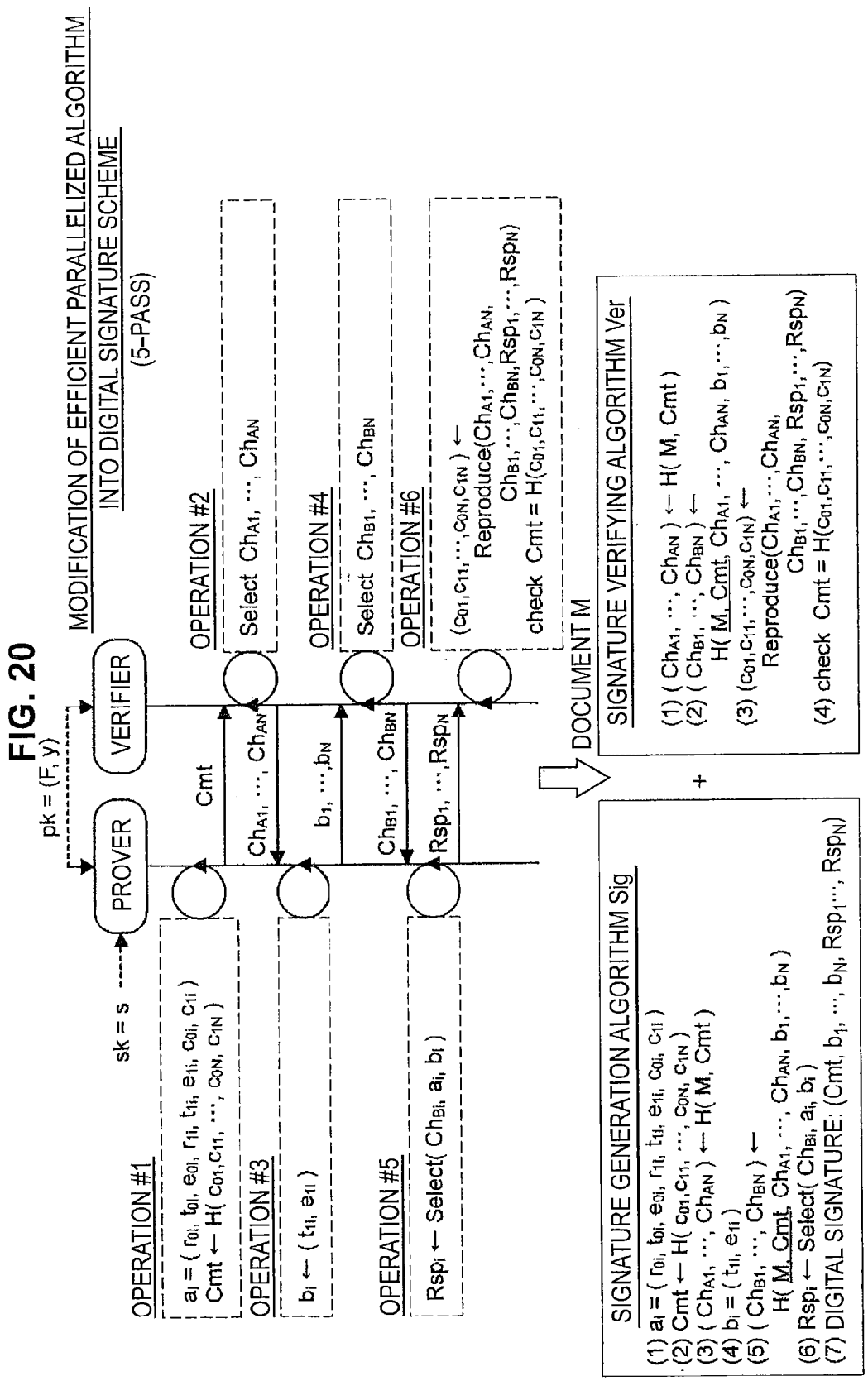

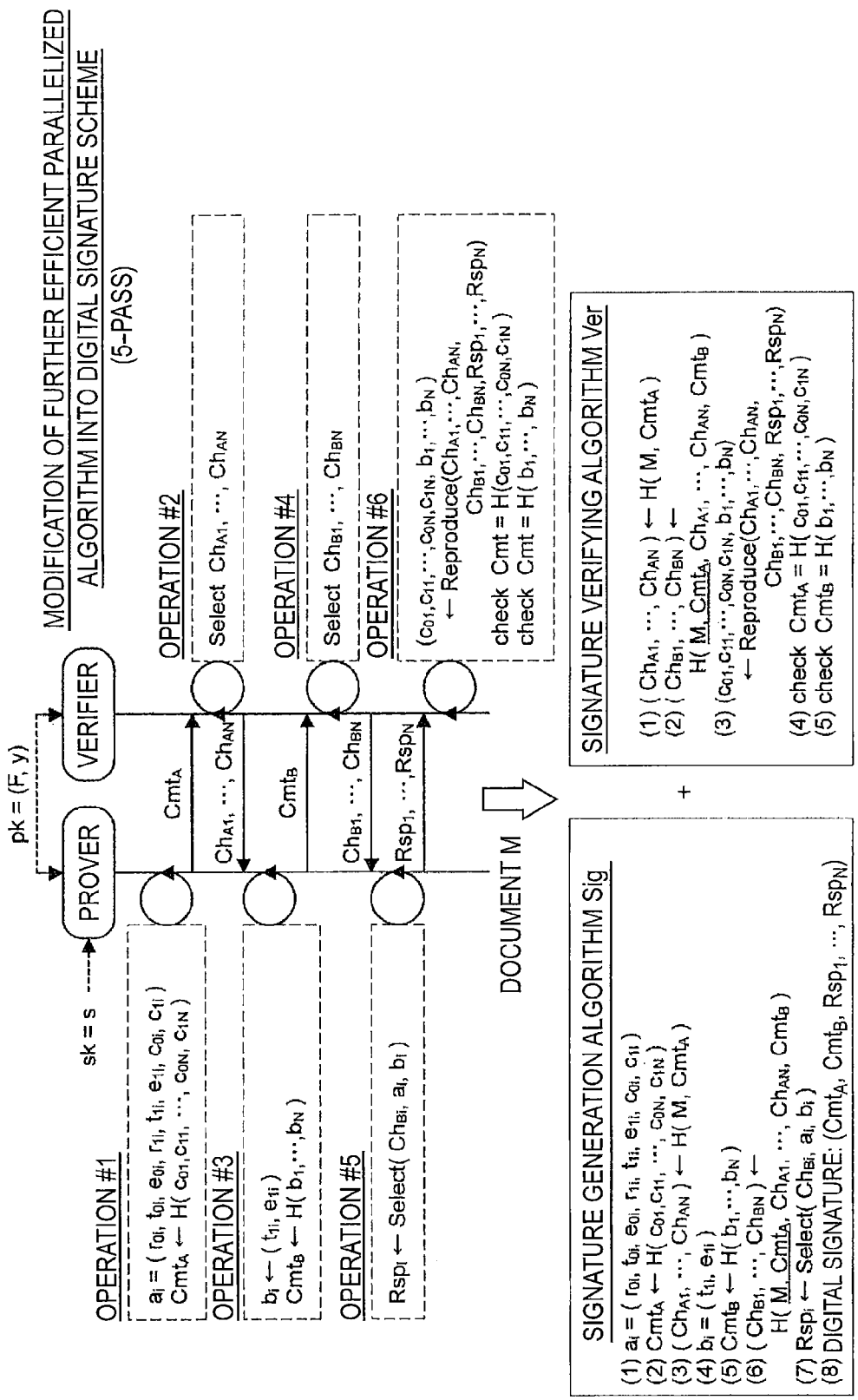

FIG. 22
PARALLEL SERIAL ALGORITHM
(3-PASS)
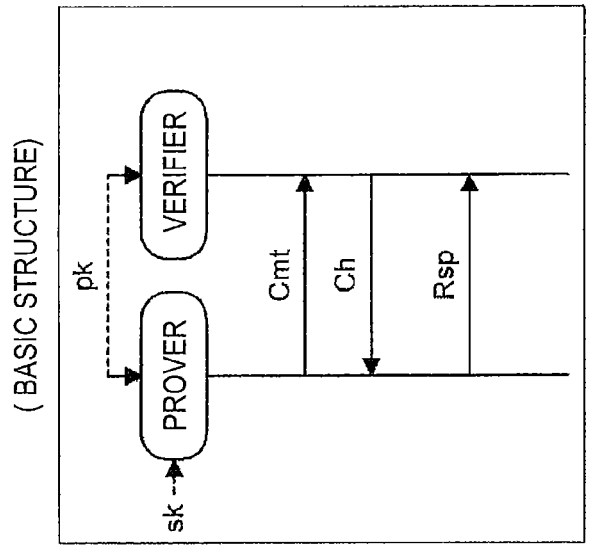
(BASIC STRUCTURE)
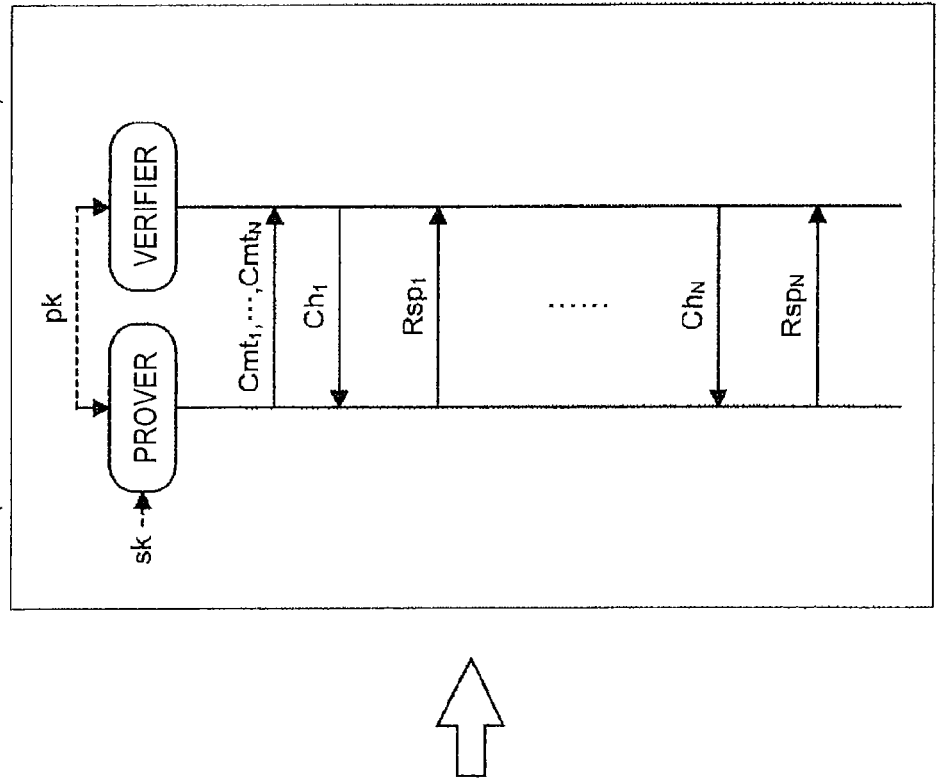
(PARALLEL SERIAL STRUCTURE)

FIG. 23
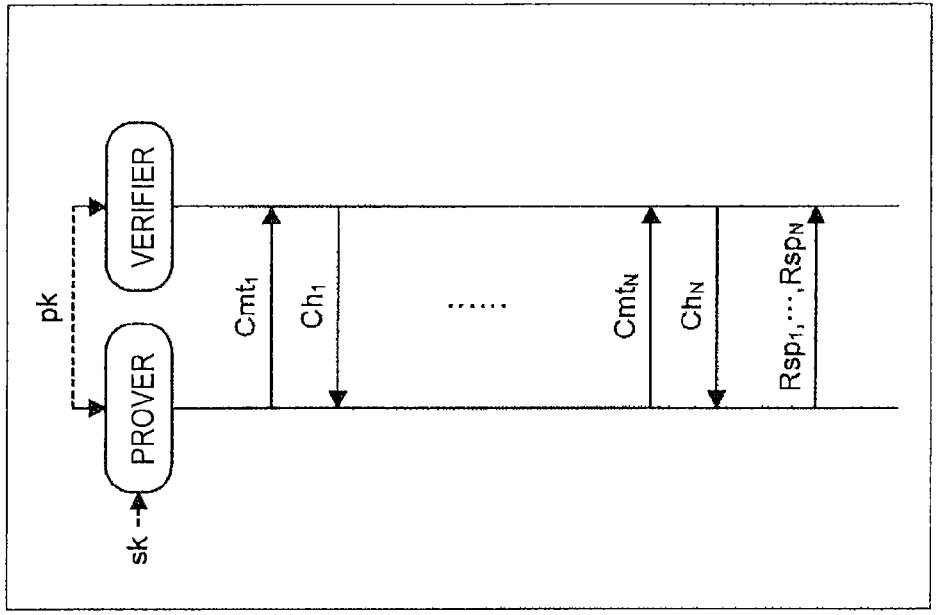
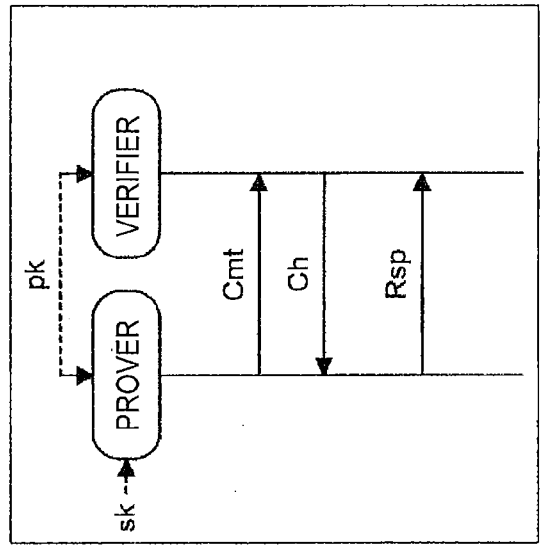

FIG. 24
PARALLEL SERIAL ALGORITHM
(5-PASS)
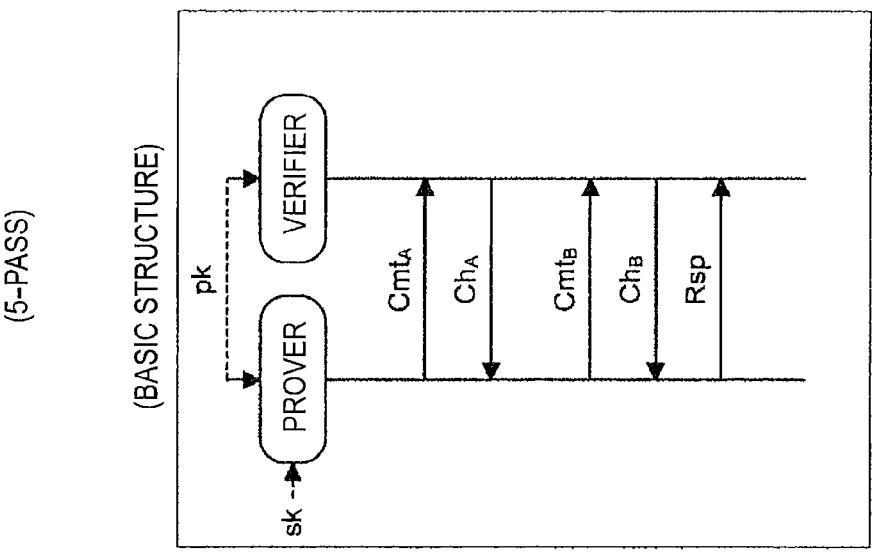
(BASIC STRUCTURE)
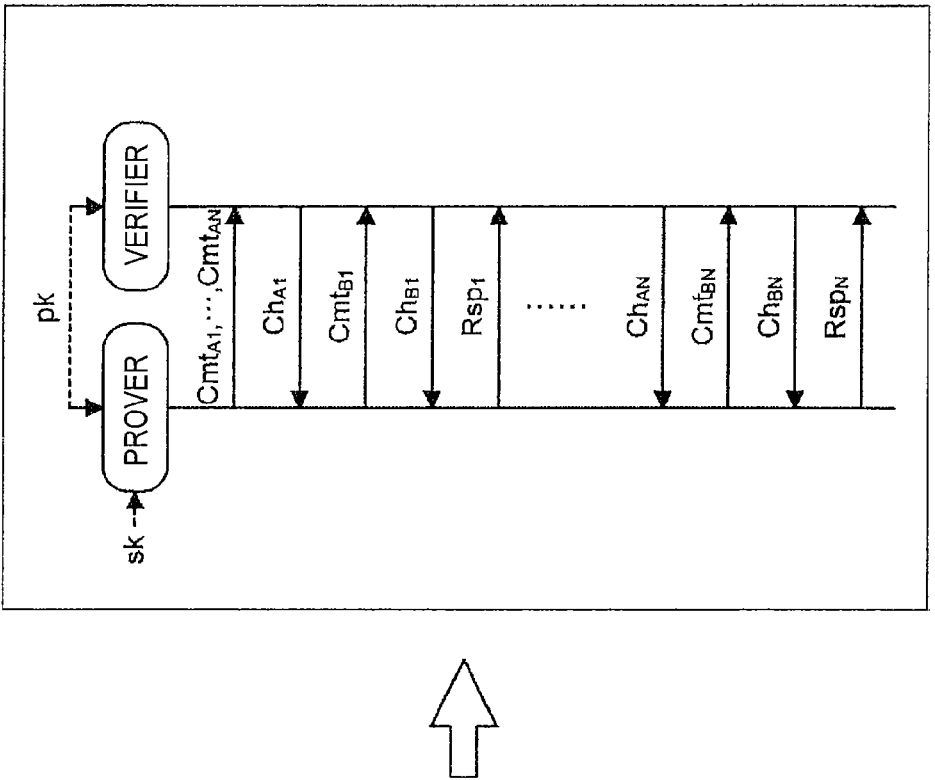
(PARALLEL SERIAL STRUCTURE #1)

FIG. 26
SERIAL PARALLEL ALGORITHM
(5-PASS)
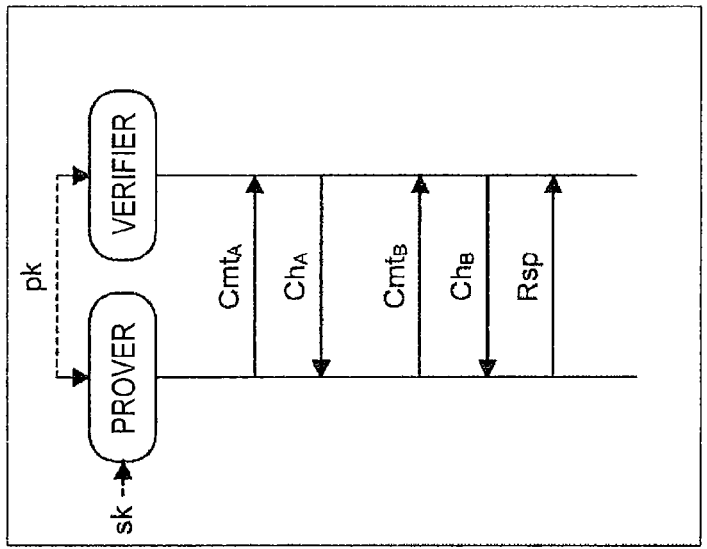
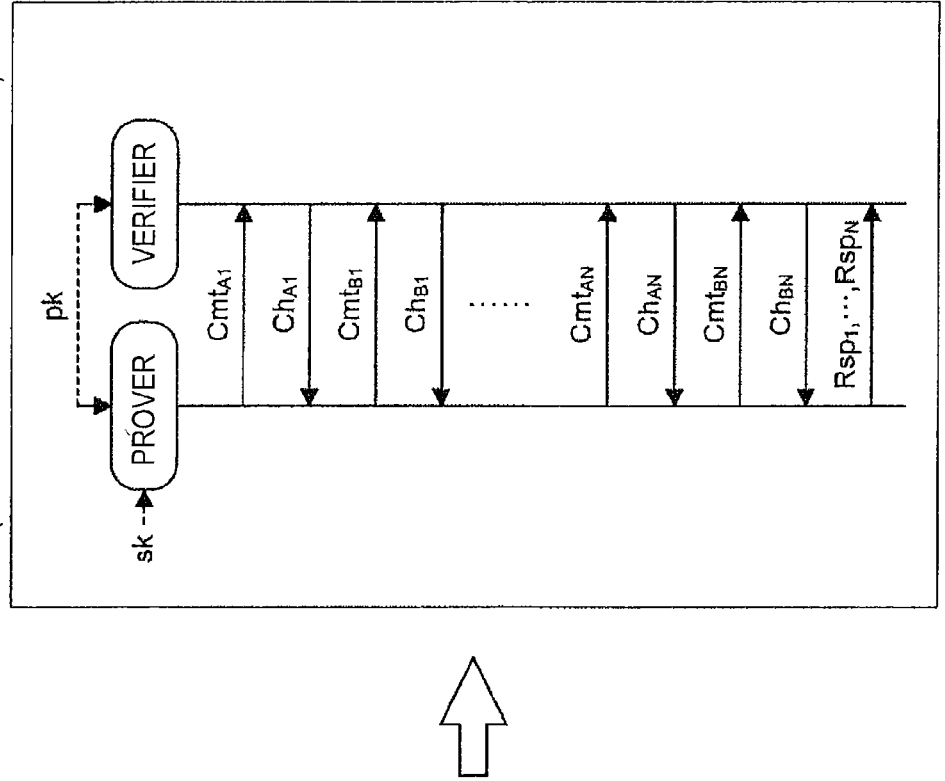

FIG. 27
SERIAL PARALLEL ALGORITHM
(5-PASS)
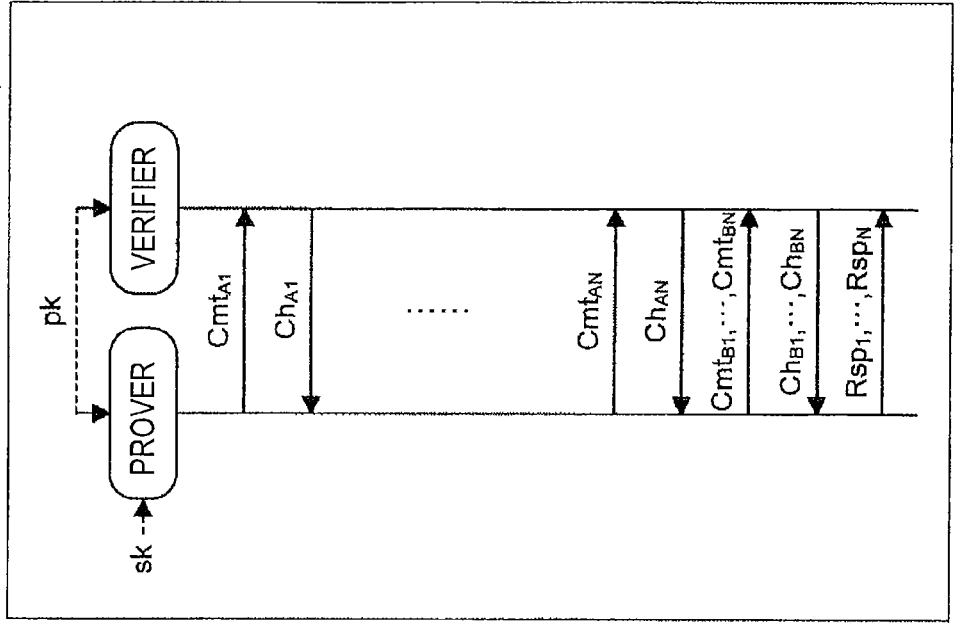
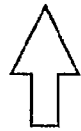
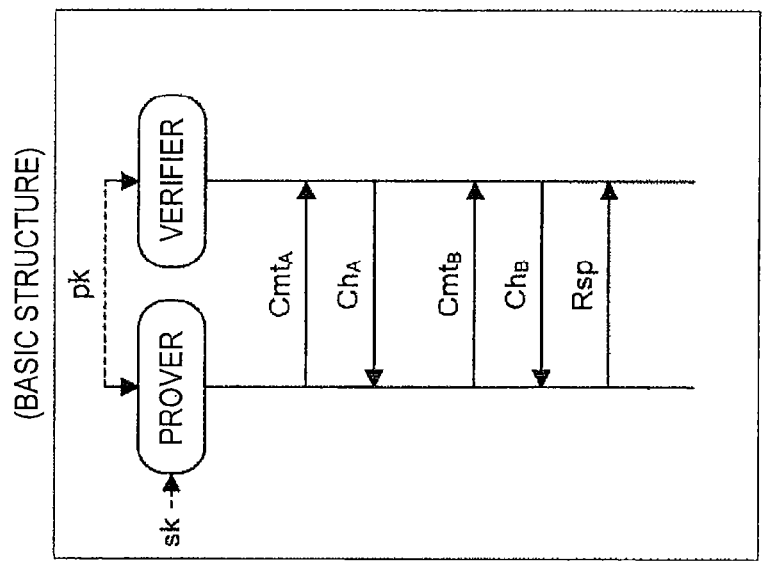

INFORMATION PROCESSING APPARATUS, INFORMATION PROCESSING METHOD, PROGRAM, AND RECORDING MEDIUM

TECHNICAL FIELD

The present technology relates to an information processing apparatus, an information processing method, a program, and a recording medium.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in the following non-patent literatures 1 and 2.

CITATION LIST

Non-Patent Literature

Non-Patent Literature 1: Jacques Patarin, Asymmetric Cryptography with a Hidden Monomial, CRYPTO 1996, pp. 45-60

Non-Patent Literature 2: Patarin, J., Courtois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag., pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n) = y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n))) = y'$ related to $x_1, \ldots, x_n$. On the other hand, the equation $B(F(A(x_1, \ldots, x_n))) = y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n))) = y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n))) = y$ of a combined form of three functions (trapdoors) B, F, and A that can be relatively easily solved has been used, and thus it is difficult to ensure sufficient security.

The present technology is devised in view of the above-mentioned circumstance and is intended to provide a novel and improved information processing apparatus, a novel and improved information processing method, a novel and improved program, and a novel and improved recording medium capable of realizing a public-key authentication scheme and a digital signature scheme that are efficient and have high security using a multi-order multivariate simultaneous equation for which efficient solving means (trapdoor) is not known.

Solution to Problem

According to an embodiment of the present technology, there is provided an information processing apparatus including a message generation unit that generates a message based on a pair of multi-order multivariate polynomials $F=(f_1, \ldots, f_m)$ and a vector s that is an element of a set $K^n$, a message supply unit that supplies the message to a verifier storing the pair of multi-order multivariate polynomials F and vectors $y=(y_1, \ldots, y_m)=(f_1(s), \ldots, f_m(s))$, an intermediate information generation unit that generates third information based on first information randomly selected by the verifier and second information obtained at a time of generation of the message, an intermediate information supply unit that supplies the third information to the verifier, and a response supply unit that supplies the verifier with response information corresponding to a verification pattern which the verifier selects from among k (where k≥2) verification patterns. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x+x_2)-F(x_1)-F(x_2)$ with respect to vectors $x_1=(x_{l1}, \ldots, x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided an information processing apparatus including an information storage unit that stores a pair of multi-order multivariate polynomials $F=(f_1, \ldots, f_m)$ and vectors $y_1, \ldots, y_m)=(f_1(s), \ldots, f_m(s))$, a message acquisition unit that acquires a message generated based on the pair of multi-order multivariate polynomials F and a vector s which is an element of a set $K^n$, an information supply unit that supplies randomly selected first information to a prover that supplies the message, an intermediate information acquisition unit that acquires third information generated by the prover based on the first information and second information obtained at a time of generation of the message, a pattern information supply unit that supplies the prover with information on one verification pattern randomly selected from among k (where k≥3) verification patterns, a response acquisition unit that acquires response information corresponding to the selected verification pattern from the prover, and a verification unit that verifies whether or not the prover stores the vector s based on the message, the first information, the third information, the pair of multi-order multivariate polynomials F, and the response information. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided an information processing method including generating a message based on a pair of multi-order multivariate polynomials $F=(f_1, \ldots, f_m)$ and a vector s that is an element of a set $K^n$, supplying the message to a verifier storing the pair of multi-order multivariate polynomials F and vectors $y=(y_1, \ldots, y_m)=(f_1(s), \ldots, f_m(s))$, generating third information based on first information randomly selected by the verifier and second information obtained at a time of generation of the message, supplying the third information to the verifier, and supplying the verifier with response information corresponding to a verification pattern which the verifier selects from among k (where k≥2) verification patterns. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided an information processing method including, by an information processing apparatus storing a pair of multi-order multivariate polynomials $F=(f_1, \ldots, f_m)$ and vectors $y=(y_1, \ldots, y_m)=(f_1(s), \ldots, f_m(s))$, acquiring a message generated based on the pair of multi-order multivariate polynomials F and a vector s which is an element of a set $K^n$, supplying randomly selected first information to a prover that supplies the message, acquiring third information generated by the prover based on the first information and second information obtained at a time of generation of the message, supplying the prover with information on one verification pattern randomly selected from among k (where k≥3) verification patterns, and acquiring response information corresponding to the selected verification pattern from the prover, verifying whether or not the prover stores the vector s based on the message, the first information, the third information, the pair of multi-order multivariate polynomials F, and the response information. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided a program causing a computer to realize a message generation function of generating a message based on a pair of multi-order multivariate polynomials $F=(f_1, \ldots, f_m)$ and a vector s that is an element of a set $K^n$, a message supply function of supplying the message to a verifier storing the pair of multi-order multivariate polynomials F and vectors $y=(y_1,\ldots,y_m)=(f_1(s),\ldots,f_m(s))$, an intermediate information generation function of generating third information based on first information randomly selected by the verifier and second information obtained at a time of generation of the message, an intermediate information supply function of supplying the third information to the verifier, and a response supply function of supplying the verifier with response information corresponding to a verification pattern which the verifier selects from among k (where k≥2) verification patterns. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1,\ldots,f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1},\ldots,x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided a program causing a computer to realize an information storage function of storing a pair of multi-order multivariate polynomials $F=(f_1,\ldots,f_m)$ and vectors $y=(y_1,\ldots,y_m)=(f_1(s),\ldots,f_m(s))$, a message acquisition function of acquiring a message generated based on the pair of multi-order multivariate polynomials F and a vector s which is an element of a set $K^n$, an information supply function of supplying randomly selected first information to a prover that supplies the message, an intermediate information acquisition function of acquiring third information generated by the prover based on the first information and second information obtained at a time of generation of the message, a pattern information supply function of supplying the prover with information on one verification pattern randomly selected from among k (where k≥3) verification patterns, and a response acquisition unit of acquiring response information corresponding to the selected verification pattern from the prover, a verification function that verifies whether or not the prover stores the vector s based on the message, the first information, the third information, the pair of multi-order multivariate polynomials F, and the response information. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1,\ldots,f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1},\ldots,x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided a computer-readable recording medium having a program recorded thereon, the program causing a computer to realize a message generation function of generating a message based on a pair of multi-order multivariate polynomials $F=(f_1,\ldots,f_m)$ and a vector s that is an element of a set $K^n$, a message supply function of supplying the message to a verifier storing the pair of multi-order multivariate polynomials F and vectors $y=(y_1,\ldots,y_m)=(f_1(s),\ldots,f_m(s))$, an intermediate information generation function of generating third information based on first information randomly selected by the verifier and second information obtained at a time of generation of the message, an intermediate information supply function of supplying the third information to the verifier, and a response supply function of supplying the verifier with response information corresponding to a verification pattern which the verifier selects from among k (where k≥2) verification patterns. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1,\ldots,f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1},\ldots,x_{ln})$ (where l=1, 2) is configured as a term proportional to $(x_{1,i})^{q(z)}$ (where 1≤i≤n, $q(z)=q^z$, and 1≤z≤k).

According to an embodiment of the present technology, there is provided a computer-readable recording medium having a program recorded thereon, the program causing a computer to realize an information storage function of storing a pair of multi-order multivariate polynomials $F=(f_1,\ldots,f_m)$ and vectors $y=(y_1,\ldots,y_m)=(f_1(s),\ldots,f_m(s))$, a message acquisition function of acquiring a message generated based on the pair of multi-order multivariate polynomials F and a vector s that is an element of a set $K^n$, an information supply function of supplying randomly selected first information to a prover that supplies the message, an intermediate information acquisition function of acquiring third information generated by the prover based on the first information and second information obtained at a time of generation of the message, a pattern information supply function of supplying the prover with information on one verification pattern randomly selected from among k (where k≥3) verification patterns, a response acquisition unit of acquiring response information corresponding to the selected verification pattern from the prover, and a verification function of verifying whether or not the prover stores the vector s based on the message, the first information, the third information, the pair of multi-order multivariate polynomials F, and the response information. The vector s is a secret key. The pair of multi-order multivariate polynomials F and the vectors y are public keys. The message is information obtained by executing calculation prepared in advance for the verification pattern corresponding to the response information based on the public keys, the first information, the third information, and the response information. The pair of multi-order multivariate polynomials F include polynomials $f_1,\ldots,f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1},\ldots,x_{ln})$ (where l=1, 2) is configured as a term proportional to $(x_{1,i})^{q(z)}$ (where 1≤i≤n, $q(z)=q^z$, and 1≤z≤k).

Advantageous Effects of Invention

According to the present technology described above, it is possible to realize a public-key authentication scheme and a digital signature scheme that are efficient and have high security using a multi-order multivariate simultaneous equation for which efficiently solving means (trapdoor) is not known.

BRIEF DESCRIPTION OF DRAWINGS

FIG. 19 is an explanatory diagram for describing a method of modifying a further efficient algorithm related to the 3-pass public-key authentication scheme into an algorithm of a digital signature scheme.

FIG. 20 is an explanatory diagram for describing a method of modifying an efficient algorithm related to the 5-pass public-key authentication scheme into an algorithm of the digital signature scheme.

FIG. 21 is an explanatory diagram for describing a method of modifying a further efficient algorithm related to the 5-pass public-key authentication scheme into an algorithm of the digital signature scheme.

FIG. 22 is an explanatory diagram for describing a parallel serial structure of the efficient algorithm related to the 3-pass public-key authentication scheme.

FIG. 23 is an explanatory diagram for describing a serial parallel structure of the efficient algorithm related to the 3-pass public-key authentication scheme.

FIG. 24 is an explanatory diagram for describing a parallel serial structure (parallel serial structure #1) of the efficient algorithm related to the 5-pass public-key authentication scheme.

FIG. 26 is an explanatory diagram for describing a serial parallel structure (serial parallel structure #1) of the efficient algorithm related to the 5-pass public-key authentication scheme.

FIG. 27 is an explanatory diagram for describing a serial parallel structure (serial parallel structure #2) of the efficient algorithm related to the 5-pass public-key authentication scheme.

DESCRIPTION OF EMBODIMENTS

Figure 1:
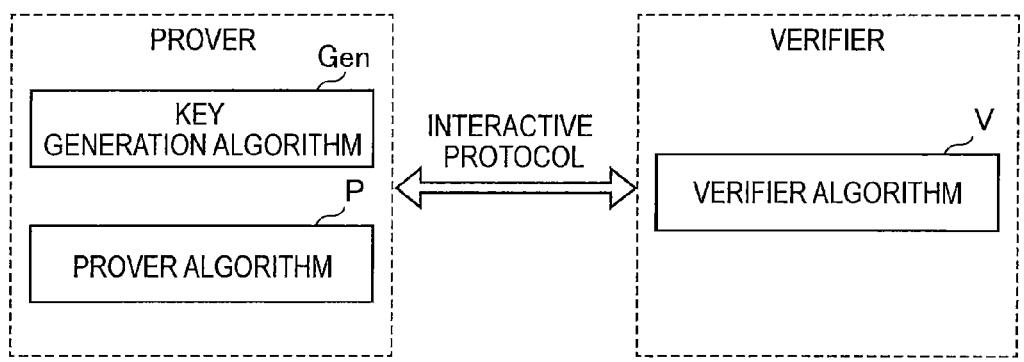
FIG. 1 is an explanatory diagram for describing an algorithm structure related to a public-key authentication scheme.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Next, an example of an algorithm structure related to a 3-pass public-key authentication scheme will be described with reference to FIGS. 4 to 8. Next, an example of an algorithm structure related to a 5-pass public-key authentication scheme will be described with reference to FIGS. 5 to 17. Next, a method of modifying the efficient algorithms related to the 3-pass and 5-pass public-key authentication schemes into algorithms of the digital signature scheme will be described with reference to FIGS. 18 to 21.

Next, a parallel serial structure and a serial parallel structure of the efficient algorithms related to the 3-pass and 5-pass public-key authentication schemes will be described with reference to FIGS. 22 to 27. Next, a hardware configuration example of an information processing apparatus capable of realizing each algorithm according to the first and second embodiments of the present technology will be described with reference to FIG. 28. Finally, a summary of the technical spirit of the present embodiments and operational advantageous effects obtained from the technical spirit will be described in brief.

(Detailed Articles)
1. Introduction
 1-1: Algorithm of Public-Key Authentication Scheme
 1-2: Algorithms for Digital Signature Scheme
 1-3: N-pass Public-key Authentication Scheme
2. Algorithm Structures Related to 3-pass Public-key Authentication Scheme
 2-1: Example of Specific Algorithm Structure
 2-2: Efficient Algorithm Based on Quadratic Multivariate Polynomial
  2-2-1: Basic Structure
  2-2-2: Parallelized Algorithm
 2-3: Efficient Algorithm Based on High-order Multivariate Polynomial (Scheme #1)
  2-3-1: Basic Structure
  2-3-2: Parallelized Algorithm
3: Algorithm Structure Related to 5-pass Public-key Authentication Scheme
 3-1: Example of Specific Algorithm Structure
 3-2: Efficient Algorithm Based on Quadratic Multivariate Polynomial
  3-2-1: Basic Structure
  3-2-2: Parallelized Algorithm
 3-3: Efficient Algorithm Based on High-order Multivariate Polynomial (First Embodiment)
  3-3-1: Basic Structure
  3-3-2: Parallelized Algorithm
 3-4: Efficient Algorithm Based on High-order Multivariate Polynomial (Second Embodiment)
  3-4-1: Basic Structure
  3-4-2: Parallelized Algorithm (Structure Example 1)
  3-4-3: Parallelized Algorithm (Structure Example 2: High Efficiency)
  3-4-4: Parallelized Algorithm (Structure Example 2: Higher Efficiency)
4: Modification of Digital Signature Scheme
 4-1: Modification of 3-pass Public-key Authentication Scheme into Digital Signature Scheme
  4-1-1: Digital Signature Algorithm (Structure Example 1)
  4-1-2: Digital Signature Algorithm (Structure Example 2: High Efficiency)
 4-2: Modification of 5-pass Public-key Authentication Scheme into Digital Signature Scheme
  4-2-1: Digital Signature Algorithm (Structure Example 1)
  4-2-2: Digital Signature Algorithm (Structure Example 2: High Efficiency)
5: Hybrid Type Algorithm
 5-1: Hybrid Type Algorithm Related to of 3-pass Public-key Authentication Scheme
  5-1-1: Parallel Serial Algorithm
  5-1-2: Serial Parallel Algorithm
 5-2: Hybrid Type Algorithm Related to of 5-pass Public-key Authentication Scheme
  5-2-1: Parallel Serial Algorithm (Structure Example #1)
  5-2-2: Parallel Serial Algorithm (Structure Example #2)
  5-2-3: Serial Parallel Algorithm (Structure Example #1)
  5-2-4: Serial Parallel Algorithm (Structure Example #2)
 6: Supplement
 6-1: Method of Setting System Parameter
 6-2: Method of Responding to Irregular Challenge
  6-2-1: Responding Method by Prover
  6-2-2: Responding Method by Verifier
7: Example of Hardware Configuration
8: Summary <1. Introduction>

The embodiments herein relate to a public-key authentication scheme and a digital signature scheme that base their safety on the difficulty of solving multi-order multivariate simultaneous equations. However, the embodiments herein differ from techniques of the related art such as HFE digital signature schemes, and relate to a public-key authentication scheme and a digital signature scheme that utilize multi-order multivariate simultaneous equations that lack a means of efficient solving (trapdoors). First, algorithms for a public-key authentication scheme, algorithms for a digital signature scheme, and an n-pass public-key authentication scheme will be briefly summarized.

[1-1: Algorithm of Public-Key Authentication Scheme]

First, an overview of algorithm of a public-key authentication scheme will be described with reference to FIG. 1. FIG. 1 is an explanatory diagram for describing an algorithm structure of a public key authentication scheme.

A public key authentication is used when a person (prover) convinces another person (verifier) that she is the prover herself by using a public key pk and a secret key sk. For example, a public key $pk_A$ of a prover A is made known to the verifier B. On the other hand, a secret key $sk_A$ of the prover A is secretly managed by the prover A. According to the public key authentication scheme, a person who knows the secret key $sk_A$ corresponding to the public key $pk_A$ is regarded as the prover A herself.

In order for the prover A to prove to the verifier B that she is the prover A herself using the public-key authentication setup, the prover A, via a interactive protocol, presents proof to the verifier B indicating that she knows the secret key $sk_A$ corresponding to the public key $pk_A$. The proof indicating the prover A knows the secret key $sk_A$ is then presented to verifier B, and in the case where the verifier B is able to confirm that proof, the validity of the prover A (the fact that the prover A is herself) is proven.

However, a public-key authentication setup demands the following conditions in order to ensure safety.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the execution of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

Conducting public-key authentication safely involves using an interactive protocol exhibiting both soundness and zero-knowledge. If an authentication process were hypothetically conducted using an interactive protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Figure 28:
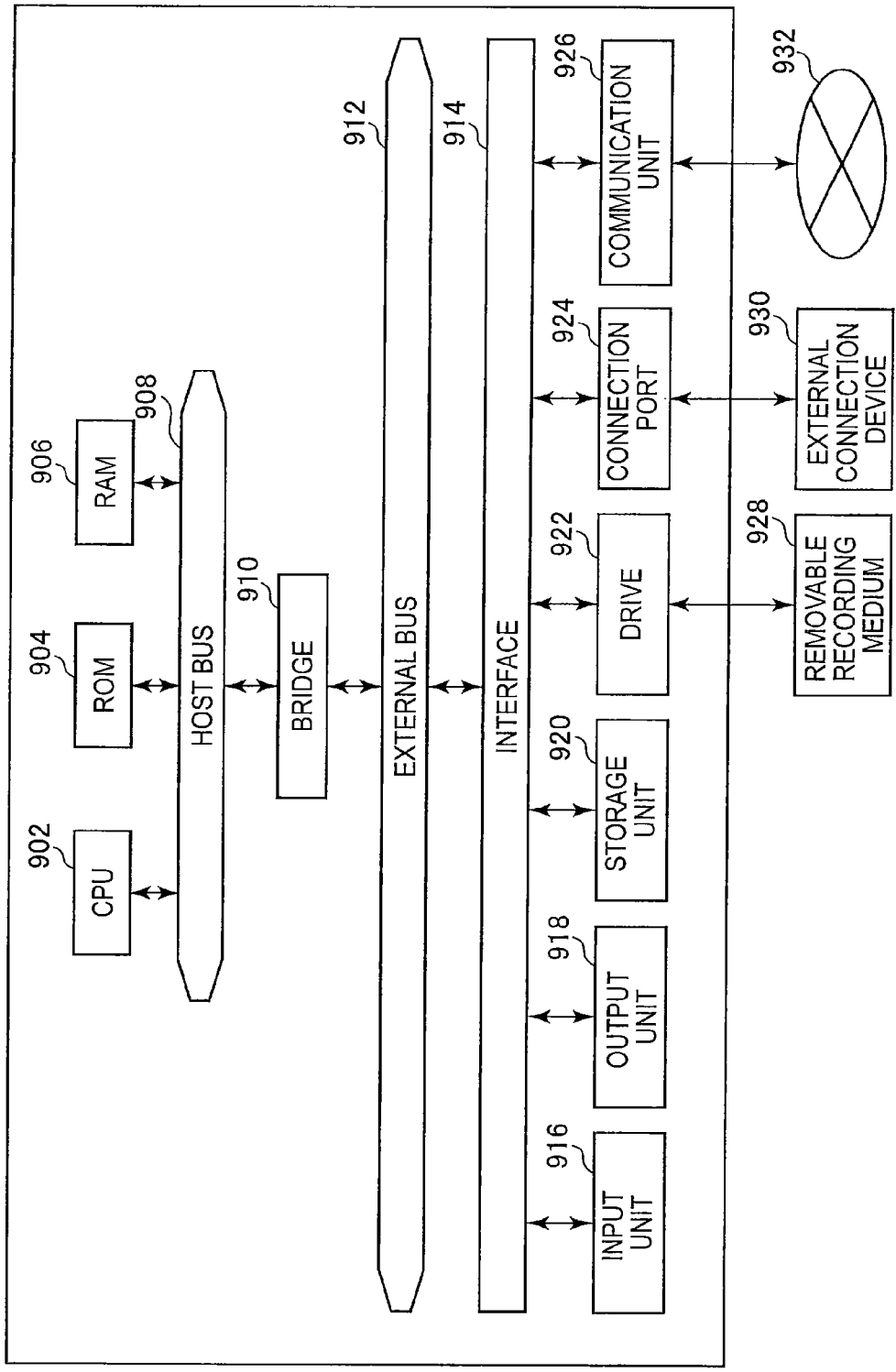
FIG. 28 is an explanatory diagram for describing a hardware configuration example of an information processing apparatus capable of executing the algorithm according to each embodiment of the present technology.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 28, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter $1^\lambda$ ($\lambda$ is an integer of 0 or more) as an input and outputs the secret key sk and the public key pk.

[Math 1]

$$(sk, pk) \leftarrow Gen(1^\lambda) \qquad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following formula (2).

[Math 2]

$$0/1 \leftarrow V(pk) \qquad (2)$$

As above, realizing meaningful public-key authentication involves having the interactive protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key generation algorithm Gen, prover algorithm P, and verifier algorithm V are skillfully designed to satisfy these requirements.

The foregoing thus summarizes the algorithms in a public-key authentication scheme.

[1-2: Algorithms for Digital Signature Scheme]

Figure 2:
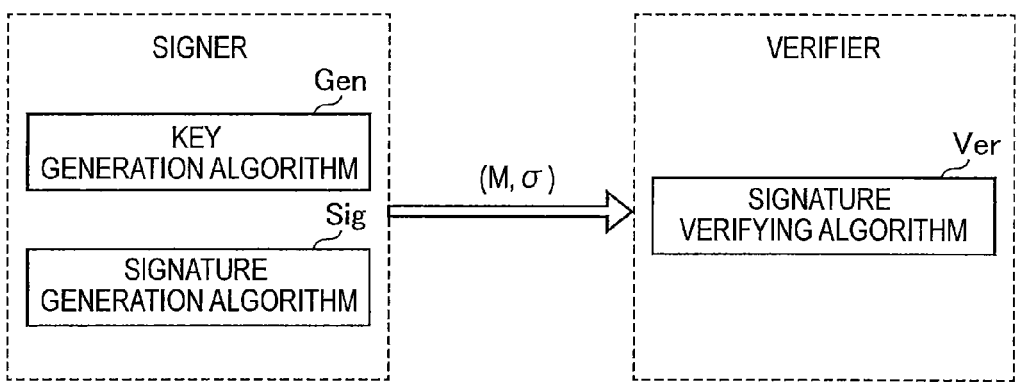
FIG. 2 is an explanatory diagram for describing an algorithm structure related to a digital signature scheme.

Next, algorithms for a digital signature scheme will be summarized with reference to FIG. 2. FIG. 2 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature q to attach to a message M. In other words, the signer is an entity that attaches a digital signature to a message M. Meanwhile, the verifier uses the signature verifying algorithm Ver to verify the digital signature attached to the message M. In other words, the verifier is an entity that verifies the digital signature q in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 28, for example. In other words, the key generation algorithm Gen, the signature generation algorithm Sig, and the signature verifying algorithm Ver are executed by a device such as a CPU 902 on the basis of a program recorded onto a device such as ROM 904, RAM 906, a storage unit 920, or a removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature q to attach to a message M. For example, the key generation algorithm Gen accepts a security parameter 1P (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow \text{Gen}(1^\lambda) \qquad (3)$$

(Signature Generation Algorithm Sig)

The signature generation algorithm Sig is used by the signer. The signature generation algorithm Sig is an algorithm that generates a digital signature q to be attached to a message M. The signature generation algorithm Sig is an algorithm that accepts a signature key sk and a message M as input, and outputs a digital signature q. The signature generation algorithm Sig may be expressed formally as in the following formula (4).

[Math 4]

$$\sigma \leftarrow \text{Sig}(sk, M) \qquad (4)$$

(Signature Verifying Algorithm Ver)

The signature verifying algorithm Ver is used by the verifier. The signature verifying algorithm Ver is an algorithm that verifies whether or not the digital signature q is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver may be expressed formally as in the following formula (5). At this point, the verifier decides that the digital signature q is invalid in the case where the signature verifying algorithm Ver outputs 0 (the case where the verification key pk rejects the message M and the digital signature q), and decides that the digital signature q is valid in the case where the signature verifying algorithm Ver outputs 1 (the case where the verification key pk accepts the message M and the digital signature q).

[Math 5]

$$0/1 \leftarrow \text{Ver}(pk, M, \sigma) \qquad (5)$$

The foregoing thus summarizes the algorithms in a digital signature scheme.

[1-3: N-pass Public-key Authentication Scheme]

Figure 3:
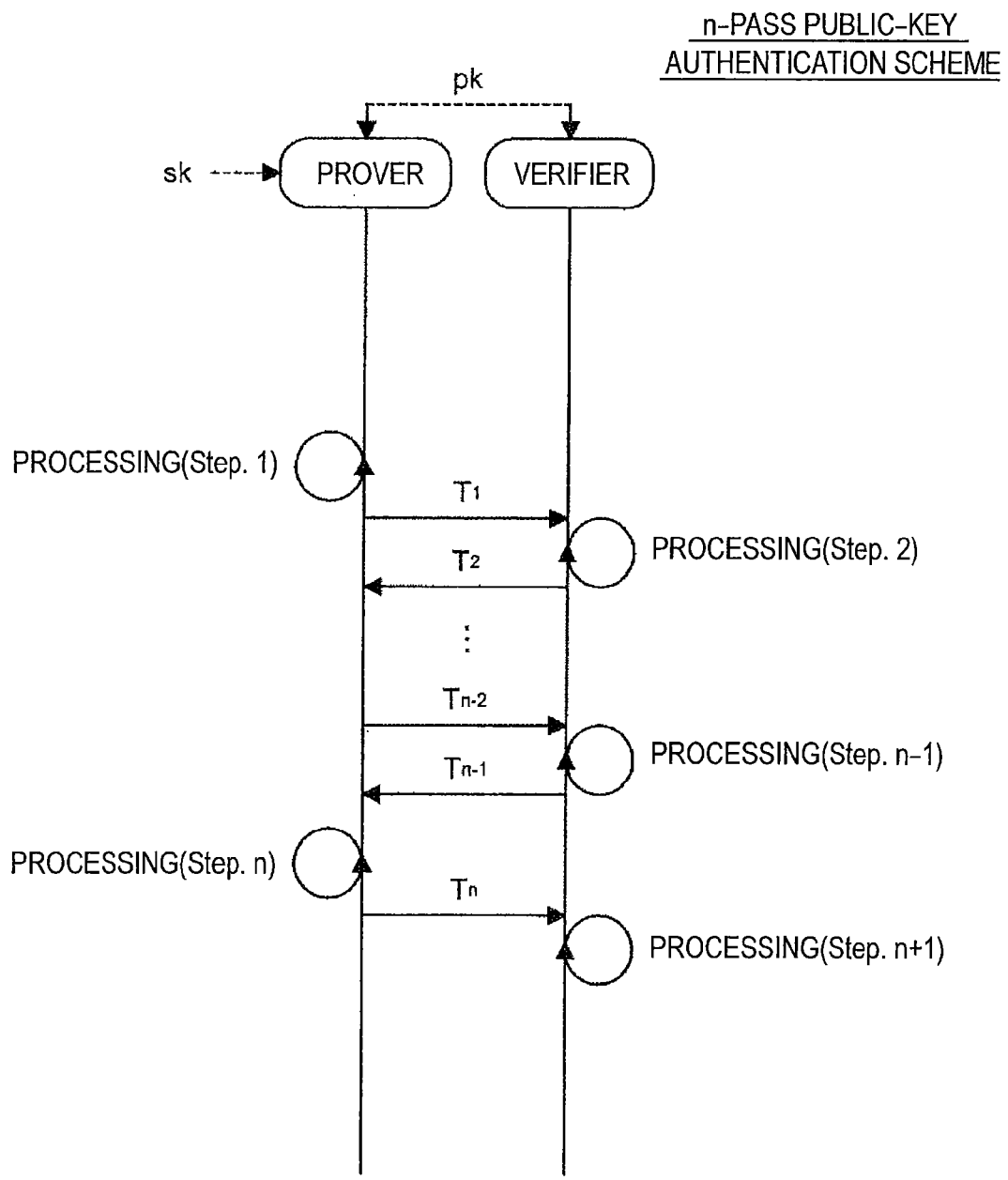
FIG. 3 is an explanatory diagram for describing an algorithm structure related to an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during an interactive protocol. In addition, the interactive protocol has to satisfy the two conditions of soundness and zero-knowledge. For this reason, during the interactive protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n (operation #k), and lastly, a process (operation #n+1) is executed. Transmitting and receiving information n times in this way is thus called an "n-pass" public-key authentication scheme.

The foregoing thus describes an n-pass public-key authentication scheme.

<2. Algorithm Structures Related to 3-pass Public-key Authentication Scheme>

Hereinafter, algorithms related to a 3-pass public-key authentication scheme will be described. Note that in the following description, a 3-pass public-key authentication scheme may also be referred to as a "3-pass scheme" in some cases.

[2-1: Example of Specific Algorithm Structure]

Figure 4:
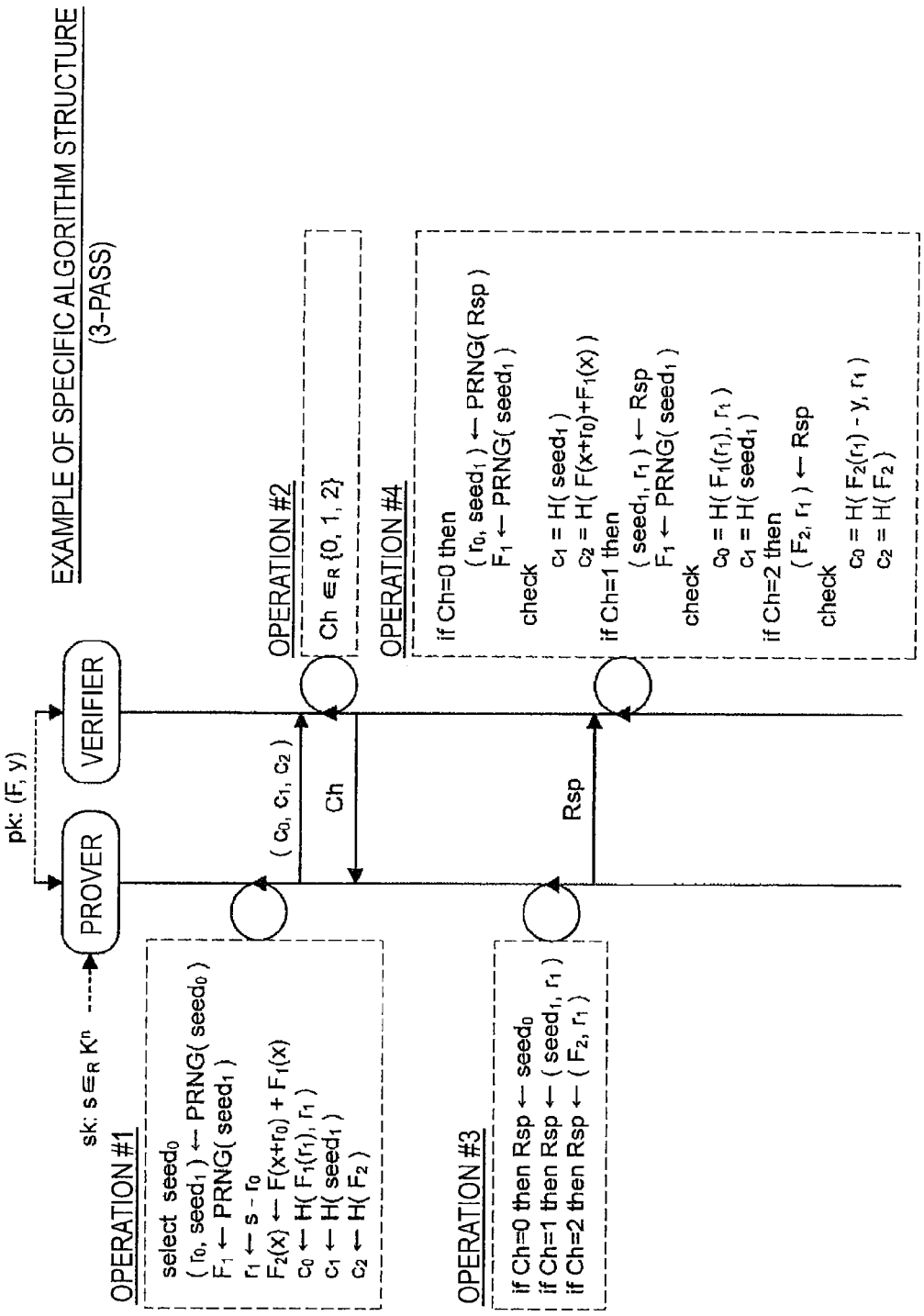
FIG. 4 is an explanatory diagram for describing an example of a specific algorithm structure related to a 3-pass public-key authentication scheme.

First, an example of a specific algorithm structure related to the 3-pass scheme will be introduced with reference to FIG. 4. FIG. 4 is an explanatory diagram for describing a specific algorithm structure related to the 3-pass scheme. An algorithm of the 3-pass scheme is made up of a key generation algorithm Gen, a prover algorithm P, and a verifier algorithm V. Hereinafter, each algorithm structure will be described.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as F(x).

(Prover Algorithm P, Verifier Algorithm V)

Next, a process performed by the prover algorithm P and a process performed by the verifier algorithm V during the interactive protocol will be described with reference to FIG. 4.

During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

First, the prover algorithm P selects any number of $seed_0$. Subsequently, the prover algorithm P generates a vector $r_0$ which is an element of the set $K^n$ and a number $seed_1$ by applying the number $seed_0$ to a pseudo-random number generator PRNG. That is, the prover algorithm P calculates $(r_0, seed_1) \leftarrow \text{PRNG}(seed_0)$. Subsequently, the prover algorithm P generates a multivariate polynomial $F_1(x)=(f_{l1}(x), \ldots, f_{lm}(x))$ by applying the number seed1 to the pseudo-random number generator PRNG. That is, the prover algorithm P calculates $F_1 \leftarrow \text{PRNG}(seed_1)$.

Operation #1 (continued):

Subsequently, the prover algorithm P calculates $r_1 \leftarrow s-r_0$. This calculation is equivalent to masking the secret key s with the vector $r_0$. Additionally, the prover algorithm P calculates $F_2(x) \leftarrow F(x+r_0)+F_1(x)$. This calculation is equivalent to masking the multivariate polynomial $F(x+r_0)$ for x with the multivariate polynomial $F_1(x)$.

Operation #1 (continued):

Subsequently, the prover algorithm P generates a hash value $c_0$ of $r_1$ and $F_1(r_1)$. That is, the prover algorithm P calculates $c_0 \leftarrow H(P_1(r_1), r_1)$. Also, the prover algorithm P generates a hash value $c_1$ of the number $seed_1$. That is, the prover algorithm P calculates $c_1 \leftarrow H(seed_1)$. Also, the prover algorithm P generates a hash value $c_2$ of a multivariate polynomial $F_2$. That is, the prover algorithm P calculates $c_2 \leftarrow H(F_2)$. The hash values $(c_0, c_1, c_2)$ are sent as a message to the verifier algorithm V. At this time, it should be noted that information on s, information on $r_0$, and information on $r_1$ are not at all leaked to the verifier.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$seed_0$. In the case where Ch=1, the prover algorithm P generates a response Rsp=$(seed_1, r_1)$. In the case where Ch=2, the prover algorithm P generates a response Rsp=$(F_2, r_1)$. The response Rsp generated in operation #3 is sent to the verifier algorithm V. At this time, it should be noted that the information on $r_1$ is not at all leaked to the verifier in the case where Ch=0, and the information on $r_0$ is not at all leaked to the verifier in the case where Ch=1 or 2.

Operation #4:

Upon receiving the response Rsp, the verifier algorithm V executes the following verification process using the received response Rsp.

In the case where Ch=0, the verifier algorithm V calculates $(r_0, seed_1) \leftarrow PRNG(Rsp)$. Also, the verifier algorithm V calculates $F_1 \leftarrow PRNG(seed_1)$. Then, the verifier algorithm V verifies whether or not the equality of $c_1 = H(seed_1)$ holds. In addition, the verifier algorithm V verifies whether or not the equality of $c_2 = H(F(x+r_0)+F_1(x))$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V sets $(seed_1, r_1) \leftarrow Rsp$. Also, the verifier algorithm V calculates $F_1 \leftarrow PRNG(seed_1)$. Then, the verifier algorithm V verifies whether or not the equality of $c_0 = H(F_1(r_1), r_1)$ holds. In addition, the verifier algorithm V verifies whether or not the equality of $c_1 = H(seed_1)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V sets $(F_2, r_1) \leftarrow Rsp$. Then, the verifier algorithm V verifies whether or not the equality of $c_0 = H(F_2(r_1)-y, r_1)$ holds. In addition, the verifier algorithm V verifies whether or not the equality of $c_2 = H(F_2)$ holds. The verifier algorithm V outputs the value 1 to indicate authentication success in the case where these verifications all succeed, and outputs the value 0 to indicate authentication failure in the case where a verification fails.

(Soundness)

Here, the description of the soundness of the algorithms related to the 3-pass scheme will be supplemented. The soundness of the algorithms related to the 3-pass scheme is ensured based on the logic that $F_2$, $F_1$, $r_0$, and $r_1$ satisfying the following formula (6) and formula (7) below can be calculated when the prover algorithm P returns an appropriate response Rsp for all of the challenges Ch=0, 1, and 2 selectable by the verifier algorithm V."

[Math 6]

$$F_2(x)=F(x+R_0)+F_1(x) \quad (6)$$

$$F_2(r_1)=-y=F_1(r_1) \quad (7)$$

By ensuring the foregoing soundness, the fact that successful forgery with a probability higher than ⅔ is not possible is ensured as long as the problem of solving the multi-order multivariate simultaneous equations is not solved. That is, to appropriately make the response to all of the challenges Ch=0, 1, 2 of the verifier, the falsifier has to calculate $F_2$, $F_1$, $r_0$, and $r_1$ satisfying the foregoing formula (6) and formula (7). In other words, the falsifier has to calculate s satisfying $F(s)=y$. However, there remains a probability of the falsifier making appropriate responses for two higher challenges among the challenges Ch=0, 1, 2 of the verifier. Therefore, the success probability of the false verification becomes ⅔. Further, by repeatedly executing the foregoing interactive protocol a sufficiently large number of times, the probability of a successful forgery becomes negligibly small.

(Hash Function H)

Here, the description of a hash function H will be supplemented. In the foregoing algorithms, $c_0$, $c_1$, $c_2$, and the like are calculates using the hash function H. However, a commitment function COM may be used instead of the hash function H. The commitment function COM is a function in which a character string S and a random number ρ are factors. An example of the commitment function includes a scheme published in the international conference CRYPTO 1996 by Shai Halevi and Silvio Micali.

For example, a case in which $c_0$, $c_1$, and $c_2$ are calculated using the commitment function COM will be considered. In this case, random numbers $\rho_0$, $\rho_1$, and $\rho_2$ are prepared before $c_0$, $c_1$, and $c_2$ are calculated, and $c_0$, $c_1$, and $c_2$ are generated by applying commitment functions $COM(\cdot, \rho_0)$, $COM(\cdot, \rho_1)$, and $COM(\cdot, \rho_2)$, instead of applying the hash function H). Further, $\rho_i$ necessary for the verifier to generate $c_i$ is set to be included in the response Rsp and be sent.

The example of the specific algorithm structure related to the 3-pass scheme has been introduced above.

[2-2: Efficient Algorithm Based on Quadratic Multivariate Polynomial]

Next, a method of making the algorithms related to the 3-pass scheme efficient will be described. Here, a case in which a pair of quadratic polynomials $(f_1(x), \ldots, f_m(x))$ are used as multivariate polynomials F will be described. Here, a quadratic polynomial $f_i(x)$ is assumed to be expressed as in the following formula (8).

[Math 7]

$$f_i(x_1, \ldots, x_n) = \sum_{j,k} a_{ijk} x_j x_k + \sum_j b_{ij} x_j \quad (8)$$

Also, the pair of quadratic polynomials $(f_1(x), \ldots, f_m(x))$ can be expressed as in the following formula (9). Here, $x=(x_1, \ldots, x_n)$. $A_1, \ldots, A_m$ is a n×n matrix. Further, each of $b_1, \ldots, b_m$ is an n x×1 vector.

[Math 8]

$$F(x) = \begin{pmatrix} f_1(x) \\ \vdots \\ f_m(x) \end{pmatrix} \qquad (9)$$

$$= \begin{pmatrix} x^T A_1 x + b_1^T x \\ \vdots \\ x^T A_m x + b_m^T x \end{pmatrix}$$

When this expression is used, a multivariate polynomial F can be expressed as in the following formula (10) and formula (11). From the following formula (12), it can easily be confirmed that this expression is satisfied.

[Math 9]

$$F(x+y) = F(x) + F(y) + G(x, y) \qquad (10)$$

$$G(x, y) = \begin{pmatrix} y^T(A_1^T + A_1)x \\ \vdots \\ y^T(A_m^T + A_m)x \end{pmatrix} \qquad (11)$$

$$\begin{aligned} f_l(x+y) &= (x+y)^T A_l (x+y) + b_l^T (x+y) \qquad (12) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l) x \end{aligned}$$

When dividing $F(x+y)$ into a first portion dependent on x, a second portion dependent on y, and a third portion dependent on both x and y in this way, the term $G(x, y)$ corresponding to the third portion becomes bilinear with respect to x and y. Using this property enables the construction of an efficient algorithm.

For example, use the vector $t_0$ that is an element of the set $K^n$ and the vector $e_0$ that is an element of the set $K^m$ to express the multivariate polynomial $F_1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in formula (13) below.

Here, when $t_1=r_0+t_0$, $e_1=F(r_0)+e_0$, the multivariate polynomial $F_2(x)=F(x+r_0)+F_1(x)$ can be expressed by the vector $t_1$ which is an element of the set $K^n$ and the vector $e_1$ that is an element of the set $K^m$. For this reason, when "$F_1(x)=G(x, t_0)+e_0$" is set, $F_1$ and $F_2$ can be expressed by using a vector in $K^n$ and a vector in $K^m$, and thus a data size necessary for communication can be considerably reduced. Specifically, communication efficiency can be improved to the degree of thousands to tens of thousands of times.

[Math 10]

$$\begin{aligned} F(x+r_0) + F_1(x) &= F(x) + F(r_0) + G(x, r_0) + G(x, t_0) + e_0 \qquad (13) \\ &= F(x) + G(x, r_0 + t_0) + F(r_0) + e_0 \end{aligned}$$

Through the foregoing modification, information on $r_0$ is not at all leaked from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an efficient algorithm related to the 3-pass scheme will be described with reference to FIGS. 5 and 6.

(2-2-1: Basic Structure (FIG. 5))

First, a basic structure of an efficient algorithm related to the 3-pass scheme will be described with reference to FIG. 5. However, further description of the structure of the key generation algorithm Gen will be omitted.

Figure 5:
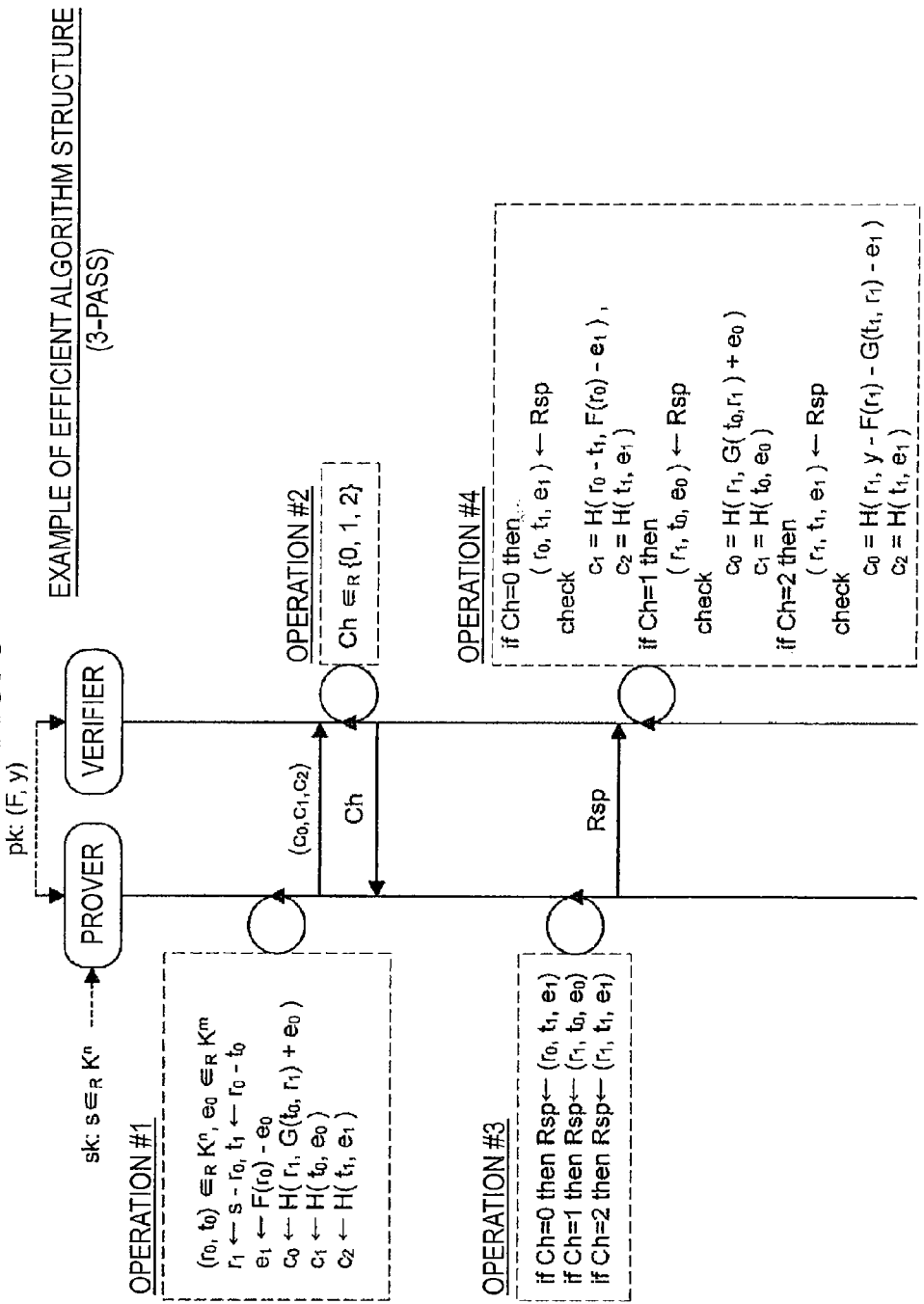
FIG. 5 is an explanatory diagram for describing an efficient algorithm related to the 3-pass public-key authentication scheme.

Operation #1:

As illustrated in FIG. 5, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0-t_0$. Subsequently, the prover algorithm P calculates $e_1 \leftarrow F(r_0) e_0$.

Operation #1 (continued):

Subsequently, the prover algorithm P calculates $c_0 \leftarrow H(r_1, G(t_0, r_1)+e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0 t_1, F(r_0) e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 3-pass scheme has been described above. By using the algorithms, the data size necessary for communication is considerably reduced.

(2-2-2: Parallelized Algorithm (FIG. 6))

Figure 6:
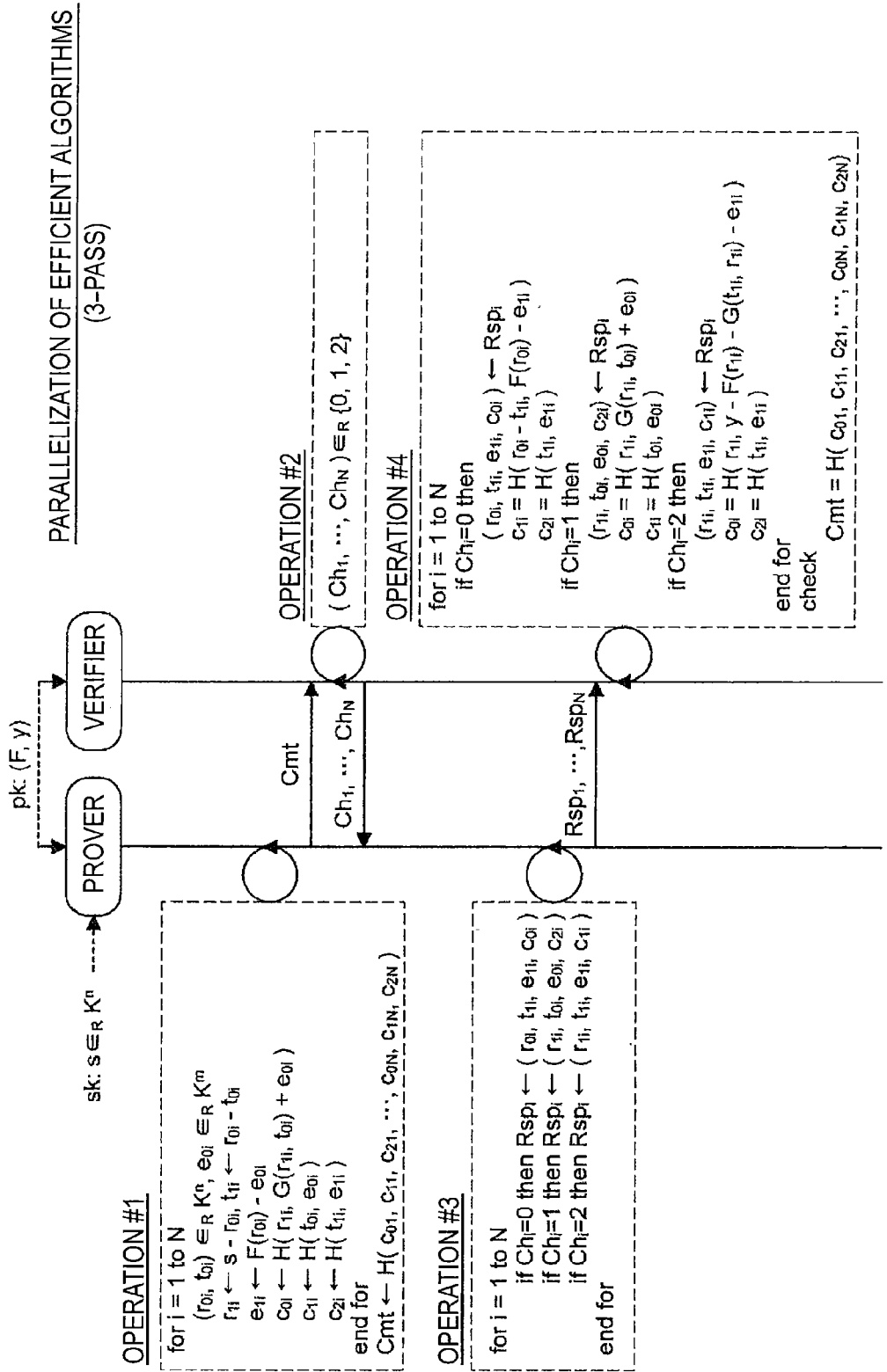
FIG. 6 is an explanatory diagram for describing parallelization of efficient algorithms related to the 3-pass public-key authentication scheme.

Next, a method of parallelizing the algorithms illustrated in FIG. 5 will be described with reference to FIG. 6. However, further description of the structure of the key generation algorithm Gen will be omitted.

As described above, applying the above session protocol makes it possible to keep the probability of a successful forgery to $2/3$ or less. Consequently, executing the session protocol twice makes it possible to keep the probability of a successful forgery to $(2/3)2$ or less. Furthermore, if the session protocol is executed N times, the probability of a successful forgery becomes $(2/3)N$, and if N is set to a sufficiently large number (N=140, for example), the probability of a successful forgery becomes negligibly small.

Conceivable methods of executing an interactive protocol multiple times include a serial method that sequentially repeats the exchange of message, challenge, and response multiple times, and a parallel method that exchanges multiple messages, challenges, and responses in a single exchange, for example. Here, algorithms that execute the above interactive protocol related to a 3-pass scheme in parallel (hereinafter designated parallelized algorithms) will now be described.

Operation #1:

The prover algorithm P first executes the following processes (1) to (6) for i=1 to N.

Process (1): The prover algorithm P randomly generates the vectors $r_{0i}, t_{0i}$ that are elements of the set $K^n$, and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{0i}$. Additionally, the prover algorithm P calculates $t_{1i} \leftarrow r_{0i}+t_{0i}$.

Process (3): The prover algorithm P calculates $e_{1i} \leftarrow F(r_{0i})-e_{0i}$.

Process (4): The prover algorithm P calculates $c_{0i} \leftarrow H(r_{1i}, G(r_{1i},t_{0i})+e_{0i})$ Process (5): The prover algorithm P calculates $c_{1i} \leftarrow H(t_{0i},e_{0i})$.

Process (6): The prover algorithm P calculates $c_{2i} \leftarrow H(t_{1i}, e_{1i})$.

Operation #1 (continued):

After executing the above processes (1) to (6) for i=1 to N, the prover algorithm P calculates $Cmt \leftarrow H(c_{01}, c_{11}, c_{21}, \ldots, c_{0N}, c_{1N}, c_{2N})$. The hash value Cmt generated in operation #1 is sent to the verifier algorithm V. In this way, the message $(c_{01}, c_{11}, c_{21}, \ldots, c_{0N}, c_{1N}, c_{2N})$ is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values $\{0, 1, 2\}$ representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i=(r_{0i}, t_{1i}, e_{1i}, c_{0i})$. In the case where $Ch_i=1$, the prover algorithm P generates a response $Rsp_i=(r_{1i}, t_{0i}, e_{0i}, c_{2i})$. In the case where $Ch_i=2$, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_1$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_1$. Subsequently, the verifier algorithm V calculates $c_{0i}=G(r_{1i}, t_{0i})+e_{0i}$. In addition, the verifier algorithm V calculates $c_{0i}=H(t_{0i}, c_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i}=H(r_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{01}, e_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The example of the structures of the parallelized efficient algorithms related to the 3-pass scheme has been described above. Also, the parallelized algorithms shown in FIG. 6 include the contrivance in which the message is converted into the hash value before being sent. The contrivance improves communication efficiency. Similarly, the structure may be modified such that the challenges $Ch_1, \ldots, Ch_N$ or the responses $Rsp_1, \ldots, Rsp_N$ are converted into hash values before being sent. Modifying the structure in this way enables a further improvement in the communication efficiency to be expected.

[2-3: Efficient Algorithm Based on High-Order Multivariate Polynomial (Scheme #1)]

The foregoing efficient algorithms use the property in that the polynomial G defined in the foregoing formula (10) becomes bilinear by expressing the multivariate polynomial F with the pair of quadratic polynomials $f_i$ defined in the foregoing formula (8). However, when the polynomial G is additively homomorphic, an efficient algorithm can be constructed likewise even when the polynomial G is not bilinear. (Construction of Efficient Algorithm Using Quadratic Polynomial $f_i$)

When the polynomial G is additively homomorphic, a relation of the following formula (14) to formula (16) is established using variables $r_0$, $r_1$, $t_0$, and $e_0$. Also, the following formula (14) is a formula obtained by dividing the secret key s into $s=r_0+r_1$ and developing the public key F(s). The following formula (14) to formula (16) can be divided into a first portion ($r_1$, $t_0$, $e_0$) reproducible with ($r_0$, $t_1$, $e_1$), a second portion ($r_1$, $t_1$, $e_1$) reproducible with ($r_1$, $t_0$, $e_0$), and a third portion reproducible with ($r_1$, $t_1$, $e_1$).

For example, "$r_0$, $t_1$" included in the following formula (15) and "F($r_0$), $e_1$" included in the following formula (16) are the first portion. Additionally, "$e_0$, G($t_0$, $r_1$)" included in the following formula (14), "$t_0$" included in the following formula (15), and "$e_0$" included in the following formula (16) are the second portion. Additionally, "$e_1$, F($r_1$), G($t_1$, $r_1$)" included in the following formula (14) is the third portion. In other words, the following formula (14) includes the second and third portions, the following formula (15) includes the first and second portions, and the following formula (16) includes the first and second portions.

As described above, the following formula (14) to formula (16) each include two kinds of portions. Additionally, from the definition of the secret key s and the relation among the following formula (14) to formula (16), it is ensured that the secret key s is not obtainable even when any one of ($r_0$, $t_1$, $e_1$), ($r_1$, $t_0$, $e_0$), and ($r_1$, $e_1$) is used. Using this property enables, for example, the construction of an efficient algorithm related to the 3-pass scheme shown in FIG. 5.

[Math 11]

$$F(r_0+r_1)=e_0+e_1+F(r_1)+G(t_0,r_1)+G(t_1,r_1) \quad (14)$$

$$r_0=t_0+t_1 \quad (15)$$

$$F(r_0)=e_0+e_1 \quad (16)$$

(Construction of Efficient Algorithm Using Cubic Polynomial $f_1$)

A method of constructing an efficient algorithm using a cubic polynomial $f_1$ of a ring R expressed as in the following formula (17) will be examined by developing the foregoing description of the case where the quadratic polynomial $f_1$. A multivariate polynomial $F=(f_1,\ldots,f_m)$ expressed with a pair of cubic polynomials $f_1$ satisfies the relation of the following formula (18). Here, $G_x(x, y)$ represents a linear term for x. Additionally, $G_y(x, y)$ represents a linear term for y. When $G=(g_{x1},\ldots,g_{xm})$ and $G_y=(g_{y1},\ldots,g_{ym})$ are expressed, $g_{x1}$ and $g_{y1}$ can be developed as in the following formula (19) and formula (20), respectively. Here, since the right second term of $g_{x1}$ is also linear for one of x and y, the right second term may include $g_{y1}$.

[Math 12]

$$f_l(x_1,\ldots,x_n) = \sum_{i,j,k} a_{lijk}x_ix_jx_k + \sum_{i,j} b_{lij}x_ix_j + \sum_i c_{li}x_i \quad (17)$$

$$F(x+y) - F(x) - F(y) = G_x(x,y) + G_y(x,y) \quad (18)$$

$$g_{xl}(x_1,\ldots,x_n,y_1,\ldots,y_n) = \sum_{i,j,k}(a_{lijk}+a_{likj}+a_{lkji})y_iy_jx_k + \sum_{i,j}(b_{lij}+b_{lji})x_iy_j \quad (19)$$

$$g_{yl}(x_1,\ldots,x_n,y_1,\ldots,y_n) = \sum_{i,j,k}(a_{lijk}+a_{likj}+a_{lkji})x_ix_jy_k \quad (20)$$

As understood from the foregoing formula (19) and formula (20), $G_x(x, y)$ and $G_y(x, y)$ become additively homomorphic for x and y. Thus, using this property, the public key F(s) is divided by introducing the new variables $r_0$, $r_1$, $t_0$, $u_0$, and $e_0$, as in the method of constructing the efficient algorithm using the quadratic polynomial $f_i$.

Since the polynomials $G_x$ and $G_y$ are additively homomorphic, a relation among the following formula (21) to formula (24) is established using variables $r_0$, $r_1$, $t_0$, $u_0$, and $e_0$. The following formula (21) to formula (24) can be divided into a first portion reproducible with ($r_0$, $t_0$, $u_0$, $e_0$), a second portion reproducible with ($r_0$, $u_1$, $e_1$), a third portion reproducible with ($r_1$, $t_0$, $e_0$), and a fourth portion reproducible with ($r_1$, $t_1$, $u_1$, $e_1$).

For example, "$r_0$, $t_0$" included in the following formula (22), "$u_0$" included in the following formula (23), and "F($r_0$), $G_y(r_0, u_0)$, $e_0$" included in the following formula (24) are the first portion. Additionally, "$G_y(r_0, u_1)$, $e_1$" included in the following formula (24) is the second portion. Additionally, "$e_0$, $G_x(r_0, r_1)$" included in the following formula (21) is the third portion. Additionally, "$e_1$, F($r_1$), $G_x(t_1, r_1)$" included in the following formula (21), "$t_1$" included in the following formula (22), and "$u_1$" included in the following formula (23) are the fourth portion.

In other words, the following formula (21) includes the third and fourth portions, the following formula (22) and the following formula (23) include the first and fourth portions, and the following formula (24) includes the first and second portions. In this way, the following formula (21) to formula (24) each include two kinds of portions.

From the definition of the secret key s and the relation among the following formula (21) to formula (24), it is ensured that the secret key s is not obtainable even when any one of ($r_0$, $t_0$, $u_0$, $e_0$), ($r_0$, $u_1$, $e_1$), ($r_1$, $t_0$, $e_0$), and ($r_1$, $t_1$, $u_1$, $e_1$) is used. Using this property enables, for example, the construction of an efficient algorithm (hereinafter, an extended algorithm) related to the 3-pass scheme using the cubic polynomial $f_1$ of the ring R.

[Math 13]

$$F(r_0+r_1)=e_0+e_1+F(r_1)+G_x(t_0,r_1)+G_x(t_0r_1) \quad (21)$$

$$r_0=t_0+t_1 \quad (22)$$

$$r_1=u_0+u_1 \quad (23)$$

$$F(r_0)+G_y(r_0,u_1)+G_y(r_0,u_0)=e_0+e_1 \quad (24)$$

Hereinafter, an example of a specific extended algorithm structure will be described. Two basic points regarding design of an extended algorithm are that a message expressed in the following formula (25) to formula (27) is sent to a verifier and that one of the first to fourth portions is verified. However, only in this verification, it may not be verified that "$r_1$" included in the third portion is identical with "$r_1$" included in the fourth portion. Similarly, it may not be verified that "$r_0$" included in the first portion is identical with "$r_0$" included in the second portion and that "$t_0$, $e_0$" included in the first portion is identical with "$t_0$, $e_0$" included in the third portion, either. Additionally, it may not be verified that "$u_1$, $e_1$" included in the second portion is identical with "$u_1$, $e_1$" included in the fourth portion, either. Accordingly, a structure example enabling this verification will be introduced below.

[Math 14]

$$c_0=H(G_x(t_0,r_1)+e_0) \quad (25)$$

$$c_1=H(t_0,u_0) \quad (26)$$

$$c_2=H(e_1-G_y(r_0,u_1)) \quad (27)$$

(2-3-1: Basic Structure (FIG. 7))

First, a basic structure of an extended algorithm related to the 3-pass scheme will be described with reference to FIG. 7. However, further description of the structure of the key generation algorithm Gen will be omitted.

Figure 7:
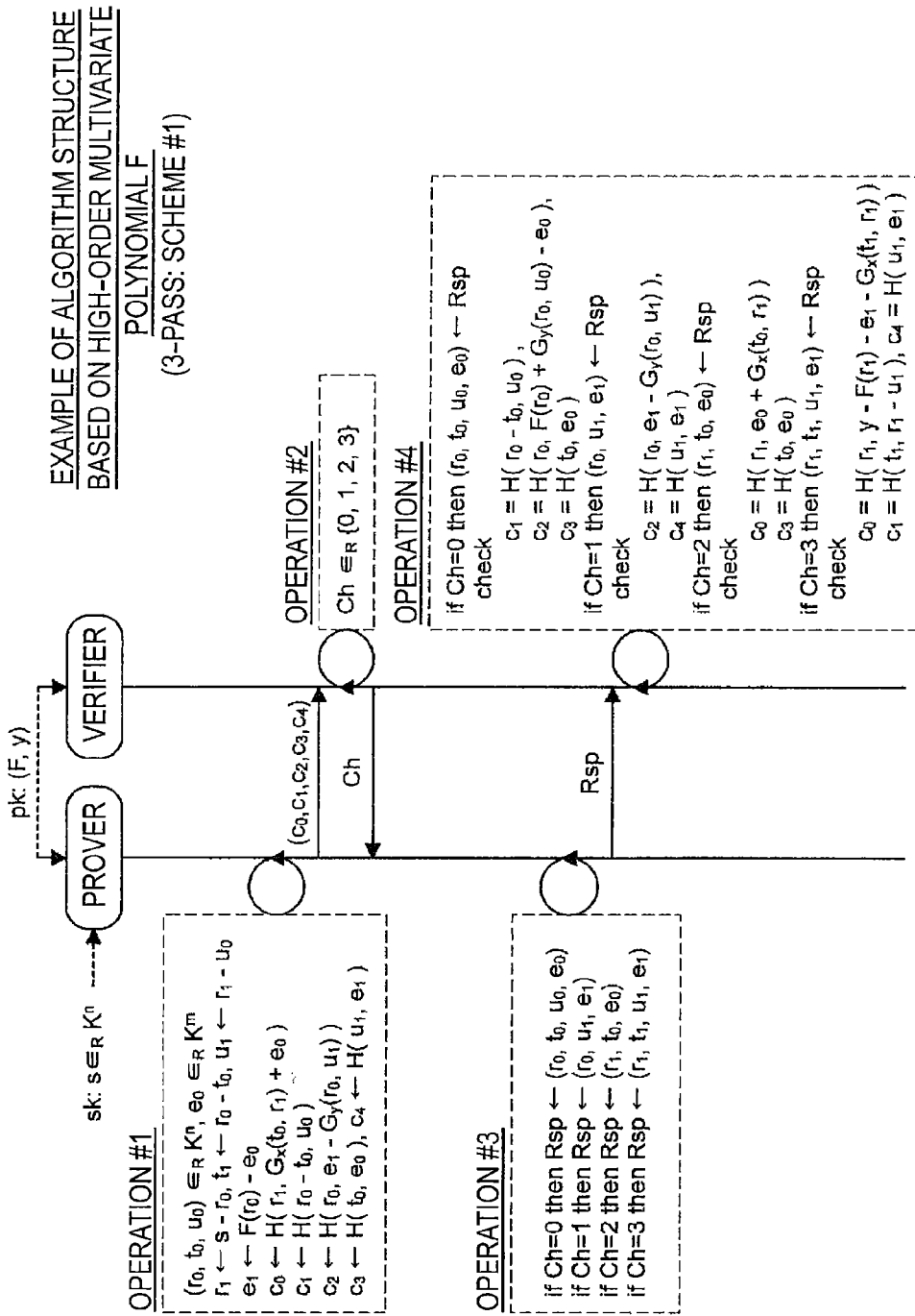
FIG. 7 is an explanatory diagram for describing an example of an algorithm of a public-key authentication scheme (scheme #1) using a 3-pass high-order multivariate polynomial.

Operation #1:

As illustrated in FIG. 7, the prover algorithm P randomly generates the vectors $r_0$, $t_0$ $u_0$ that are elements of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Subsequently, the prover algorithm P calculates $t_1 \leftarrow r_0+t_0$. Subsequently, the prover algorithm P calculates $u_1 \leftarrow r_1+u_0$. Subsequently, the prover algorithm P calculates $e_1 \leftarrow F(r_0)-c_0$.

Operation #1 (continued):

Subsequently, the prover algorithm P calculates $c_0 \leftarrow H(r_1, G_x(t_0, r_1)+e_0)$. Subsequently, the prover algorithm P calculates $c_1 \leftarrow H(r_0-t_0, u_0)$. Subsequently, the prover algorithm P calculates $c_2 \leftarrow H(r_0, e_1-G_y(r_0, u_1))$. Subsequently, the prover algorithm P calculates $c_3 \leftarrow H(t_0, e_0)$. Subsequently, the prover algorithm P calculates $c_4 \leftarrow H(u_1, e_1)$. Messages $(c_0, c_1, c_2, c_3, c_4)$ generated in operation #1 are sent to the verifier algorithm V.

Operation #2:

Upon receiving the messages $(c_0, c_1, c_2, c_3, c_4)$, the verifier algorithm V selects which verification pattern to use from among four verification patterns. For example, the verifier algorithm V may select a numerical value from among four numerical values $\{0, 1, 2, 3\}$ representing verification patterns, and set the selected numerical value in a challenge Ch. The challenge Ch is sent to the prover algorithm P.

Operation #3:

Upon receiving the challenge Ch, the prover algorithm P generates responses Rsp to send to the verifier algorithm V in response to each of the received challenge Ch. In the case where Ch=0, the prover algorithm P generates a response Rsp=$(r_0, t_0, u_0, e_0)$. In the case where Ch=1, the prover algorithm P generates a response Rsp=$(r_0, u_1, e_1)$. In the case where Ch=2, the prover algorithm P generates a response Rsp=$(r_1, t_0, e_0)$. In the case where Ch=3, the prover algorithm P generates a response Rsp=$(r_1, t_1, u_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_0, u_0)$ holds. Subsequently, the verifier algorithm V verifies whether or not the equality of $c_2=H(r_0, F(r_0)+G_y(r_0, u_0)-e_0)$ holds. Subsequently, the verifier algorithm V verifies whether or not the equality of $c_3=H(t_0, e_0)$ holds. The verifier algorithm V outputs the value 1 to indicate authentication success in the case where the verifications all succeed, and outputs the value 0 to indicate authentication failure in the case where a verification fails.

In the case where Ch=1, the verifier algorithm V verifies whether or not the equality of $c_2=H(r_0, e_1-G_y(r_0, u_1))$ holds. Subsequently, the verifier algorithm V verifies whether or not the equality of $c_4=H(u_1, e_1)$ holds. The verifier algorithm V outputs the value 1 to indicate authentication success in the case where the verifications all succeed, and outputs the value 0 to indicate authentication failure in the case where a verification fails.

In the case where Ch=2, the verifier algorithm V verifies whether or not the equality of $c_0=H(r_1, e_0-G_x(t_0, r_1))$ holds. Subsequently, the verifier algorithm V verifies whether or not the equality of $c_3=H(t_0, e_0)$ holds. The verifier algorithm V outputs the value 1 to indicate authentication success in the case where the verifications all succeed, and outputs the value 0 to indicate authentication failure in the case where a verification fails.

In the case where Ch=3, the verifier algorithm V verifies whether or not the equality of $c_0=H(r_1, y-F(r_1)-e_1-G_x(t_1, r_1))$ holds. Subsequently, the verifier algorithm V verifies whether or not the equality of $c_1=H(t_1, r_1, u_1)$ holds. Subsequently, the verifier algorithm V verifies whether or not the equality of $c_4=H(u_1, e_1)$ holds. The verifier algorithm V outputs the value 1 to indicate authentication success in the case where the verifications all succeed, and outputs the value 0 to indicate authentication failure in the case where a verification fails.

The example of the extended algorithm structure related to the 3-pass scheme has been described above. By using the algorithms, the data size necessary for communication is considerably reduced. Also, using the cubic polynomial enables realization of higher security.

(2-3-2: Parallelized Algorithm (FIG. 8))

Next, a method of parallelizing extended algorithms related to the 3-pass scheme will be described with reference to FIG. 8. However, further description of the structure of the key generation algorithm Gen will be omitted.

Figure 8:
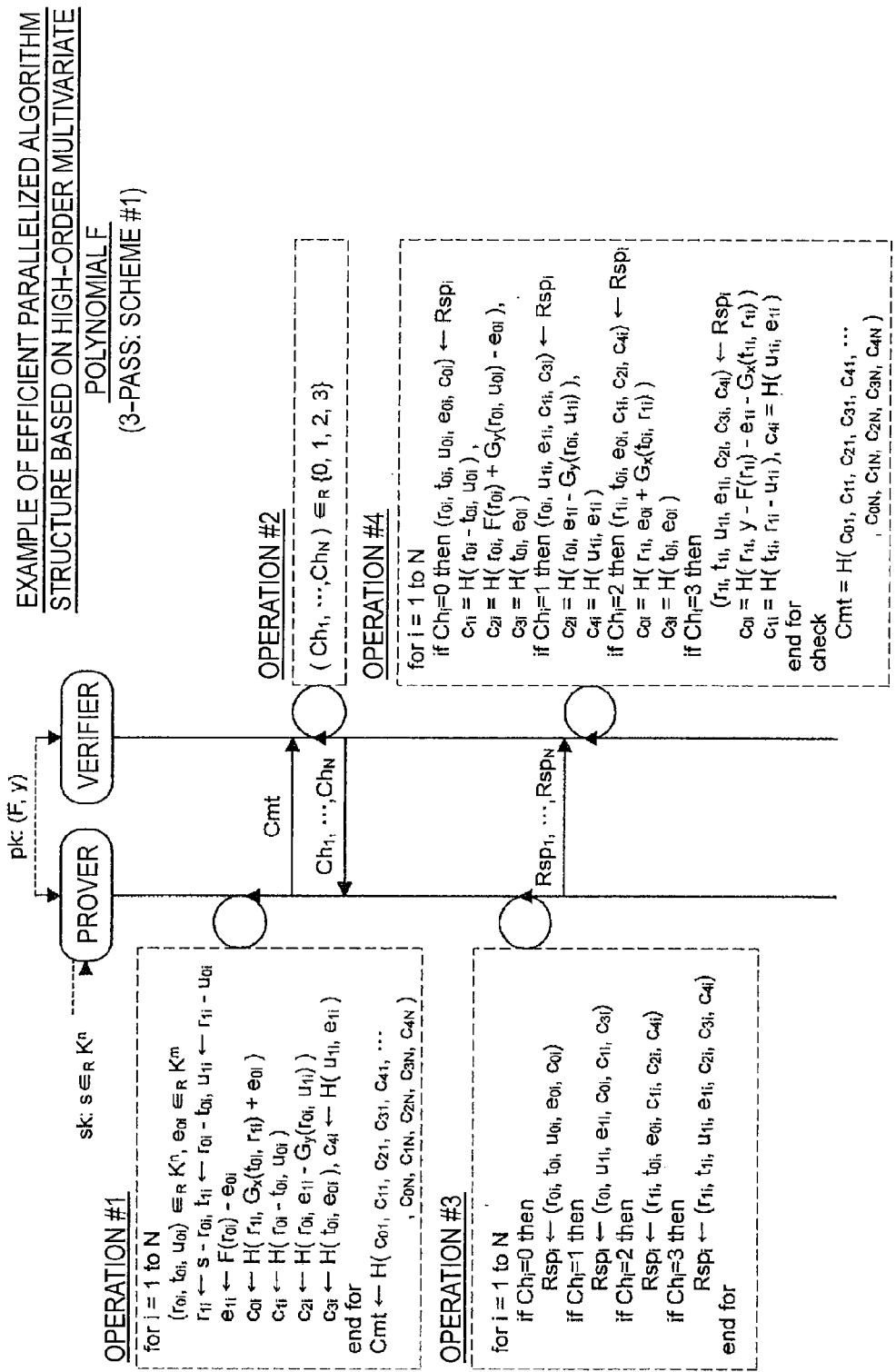
FIG. 8 is an explanatory diagram for describing an example of a parallelized algorithm of the public-key authentication scheme (scheme #1) using the 3-pass high-order multivariate polynomial.

Operation #1:

As illustrated in FIG. 8, the prover algorithm P executes the following processes for i=1 to N. First, the prover algorithm P randomly generates the vectors $r_{0i}, t_{0i}, u_{0i}$ that are elements of the set $K^n$, and the vector $e_{0i}$ that is an element of the set $K^m$. Subsequently, the prover algorithm P calculates $r_{1i} \leftarrow s-r_{0i}$. This calculation is equivalent to masking the secret key s with the vector $r_{0i}$. Subsequently, the prover algorithm P calculates $t_{1i} \leftarrow r_{0i}-t_{0i}$. Subsequently, the prover algorithm P calculates $u_{1i} \leftarrow t_{1i}-u_{0i}$. Subsequently, the prover algorithm P calculates $e_{1i} \leftarrow F(r_{0i})-e_{0i}$.

Operation #1 (continued):

Subsequently, the prover algorithm P calculates $c_{0i} \leftarrow G_x(t_{0i}, r_{1i})+e_{0i}$. Subsequently, the prover algorithm P calculates $c_{1i} \leftarrow H(r_{0i}, -t_{0i}, u_{0i})$. Subsequently, the prover algorithm P calculates $c_{2i} \leftarrow H(r_{0i}, e_{1i}-G_y(r_{0i}, u_{1i}))$. Subsequently, the prover algorithm P calculates $c_{3i} \leftarrow H(t_{0i}, e_{0i})$. Subsequently, the prover algorithm P calculates $c_{4i} \leftarrow H(u_{1i}, e_{1i})$. After generating $(c_{01}, c_{11}, c_{21}, c_{31}, c_{41}, \ldots, c_{0N}, c_{1N}, c_{2N}, c_{3N}, c_{4N})$, the prover algorithm P calculates the hash value Cmt$\leftarrow H(c_{01}, c_{11}, c_{21}, c_{31}, c_{41}, \ldots, c_{0N}, c_{1N}, c_{2N}, c_{3N}, c_{4N})$.

The hash value Cmt generated in operation #1 is sent to the verifier algorithm V.

Operation #2:

Upon receiving the hash value Cmt, the verifier algorithm V selects which verification pattern to use from among four verification patterns, for each of i=1 to N. For example, the verifier algorithm V may, for each of i=1 to N, select a numerical value from among four numerical values $\{0, 1, 2, 3\}$ representing verification patterns, and set the selected numerical value in a challenge $Ch_i$. The challenge $Ch_i$ (i=1 to N) is sent to the prover algorithm P.

Operation #3:

Upon receiving the challenge $Ch_1$ (i=1 to N), the prover algorithm P generates responses $Rsp_i$ for each of i=1 to N to send to the verifier algorithm V in response to each of the received challenge $Ch_i$. In the case where $Ch_i$=0, the prover algorithm P generates a response $Rsp_i=(r_{0i}, t_{0i}, u_{0i}, e_{0i}, c_{4i})$. In the case where $Ch_i$=1, the prover algorithm P generates a response $Rsp_i=(r_{0i}, u_{1i}, e_{1i}, c_{0i}, c_{1i}, c_{3i})$. In the case where $Ch_i=2$, the prover algorithm P generates a response $Rsp_i=(r_{1i}, t_{0i}, e_{0i}, c_{1i}, c_{2i}, c_{4i})$. In the case where $Ch_i=3$, the prover algorithm P generates a response $Rsp_i=(r_{1i}, t_{1i}, u_{1i}, e_{1i}, c_{2i}, c_{3i})$. The response $Rsp_i$ (i=1 to N) generated in operation #3 is sent to the verifier algorithm V.

Operation #4:

Upon receiving the response $Rsp_i$ (i=1 to N), the verifier algorithm V executes the following process for i=1 to N using the received response Rsp.

In the case where $Ch_i=0$, the verifier algorithm V calculates $c_{1i}=H(r_{0i}-t_{0i}, u_{0i})$. Subsequently, the verifier algorithm V calculates $c_{2i}=H(r_{0i}, F(r_{0i})+G_y(r_{0i}, u_{0i})-e_{0i})$. Subsequently, the verifier algorithm V calculates $c_{3i}=H(t_{0i}, e_{0i})$. The verifier algorithm V then stores $(c_{0i}, c_{1i}, c_{2i}, c_{3i}, c_{4i})$ In the case where $Ch_i=1$, the verifier algorithm V calculates $c_{2i}=H(r_{0i}, e_{1i}-G_y(r_{0i}, u_{1i}))$. Subsequently, the verifier algorithm V calculates $c_{4i}=H(u_{1i}, e_{1i})$. Subsequently, the verifier algorithm V calculates $c_{3i}=H(t_{0i}, e_{0i})$. The verifier algorithm V then stores $(c_{0i}, c_{1i}, c_{2i}, c_{3i}, c_{4i})$.

In the case where $Ch_i=2$, the verifier algorithm V calculates $c_{0i}=H(r_{1i}, G_x(t_{0i}, r_{1i})+e_{0i})$. Subsequently, the verifier algorithm V calculates $c_{3i}=H(t_{0i}, e_{0i})$. Subsequently, the verifier algorithm V calculates $c_{3i}=H(t_{0i}, e_{0i})$. The verifier algorithm V then stores $(c_{0i}, c_{1i}, c_{2i}, c_{3i}, c_{4i})$.

In the case where $Ch_i=3$, the verifier algorithm V calculates $c_{0i}=H(r_{1i}, y-F(r_{1i})-e_{1i}-G_x(t_{1i}, r_{1i}))$. Subsequently, the verifier algorithm V calculates $c_{11}=H(t_{1i}, r_{1i}-u_{1i})$. Subsequently, the verifier algorithm V calculates $c_{4i}=e_{1i}$. The verifier algorithm V then stores $(c_{0i}, c_{1i}, c_{2i}, c_{3i}, c_{4i})$.

After executing the above processes for i=1 to N, the verifier algorithm V verifies whether or not the equality of $Cmt=H(c_{01}, c_{11}, c_{21}, c_{31}, c_{41}, \ldots, c_{0N}, c_{1N}, c_{2N}, c_{3N}, c_{4N})$ holds. The verifier algorithm V outputs the value 1 to indicate authentication success in the case where the verification succeeds, and outputs the value 0 to indicate authentication failure in the case where a verification fails.

The parallelization of the extended algorithm structure related to the 3-pass scheme has been described above. By using the algorithms, the data size necessary for communication is considerably reduced. Also, using the cubic polynomial enables realization of higher security.

<3: Algorithm Structure Related to 5-Pass Public-Key Authentication Scheme>

Hereinafter, algorithms related to a 5-pass public-key authentication scheme will be described. Note that in the following description, a 5-pass public-key authentication scheme may also be referred to as a "5-pass scheme" in some cases.

In the case of the 3-pass scheme, the probability of the false verification is 2/3 per time of the interactive protocol. However, in the case of the 5-pass scheme, the probability of the false verification per time of the interactive protocol is 1/2+1/q. Here, q is an order of a ring to be used. Accordingly, when the order of the ring is sufficiently large, the probability of the false verification per time of the 5-pass scheme can be reduced, and thus the probability of the false verification can be sufficiently reduced by executing the interactive protocol a small number of times.

For example, when the probability of the false verification is desired to be equal to or less than $1/2^n$, the interactive protocol has to be executed $n/(\log 3-1)=1.701n$ times or more in the 3-pass scheme. On the other hand, when the probability of the false verification is desired to be equal to or less than $1/2^n$, the interactive protocol has to be executed $n/(1-\log(1+1/q))$ times or more in the 5-pass scheme. Accordingly, when q=24, a communication quantity necessary to realize the same security level is less in the 5-pass scheme than in the 3-pass scheme.

[3-1: Example of Specific Algorithm Structure (FIG. 9)]

Figure 9:
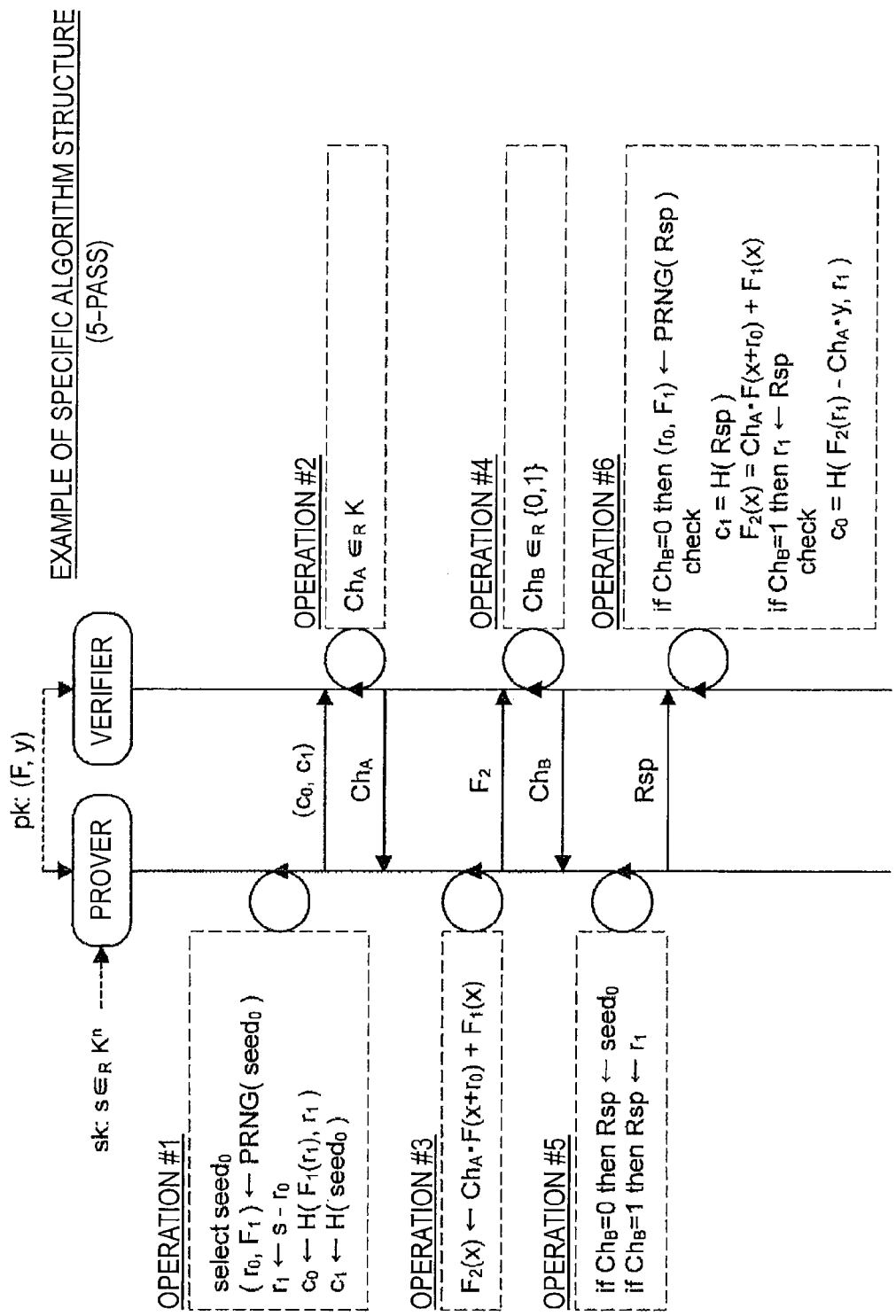
FIG. 9 is an explanatory diagram for describing an example of a specific algorithm structure related to a 5-pass public-key authentication scheme.

First, an example of a specific algorithm structure related to the 5-pass scheme will be introduced with reference to FIG. 9. FIG. 9 is an explanatory diagram for describing a specific algorithm structure related to the 5-pass scheme. An algorithm of the 5-pass scheme is made up of a key generation algorithm Gen, a prover algorithm P, and a verifier algorithm V. Hereinafter, each algorithm structure will be described.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the key generation algorithm Gen calculates $y=(y_1, \ldots, y_m) \leftarrow (f_1(s), \ldots, f_m(s))$. Also, the key generation algorithm Gen sets $(f_1, \ldots, f_m, y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as $F(x)$.

(Prover Algorithm P, Verifier Algorithm V)

Next, processes performed by the prover algorithm P and the verifier algorithm V during the interactive protocol will be described with reference to FIG. 9.

Operation #1:

As illustrated in FIG. 9, the prover algorithm P randomly selects a number $seed_0$. Subsequently, the prover algorithm P generates a vector $r_0$ which is an element of the set $K^n$ and a pair of multivariate polynomials $F_1(x)=(f_{11}(x), \ldots, f_{1m}(x))$ by applying the number $seed_0$ to a pseudo-random number generator PRNG. That is, the prover algorithm P calculates $(r_0, F_1) \leftarrow G(seed_0)$. Subsequently, the prover algorithm P calculates $r1 \leftarrow s-r_0$. This calculation is equivalent to masking the secret key s with the vector $r_0$.

Operation #1 (continued):

Subsequently, the prover algorithm P generates $F_1(r_1)$ and a hash value $c_0$ of $r_1$. That is, the prover algorithm P calculates $c_0 \leftarrow H(F_1(r_1), r_1)$. Also, the prover algorithm P generates a hash value $c_1$ of the number $seed_0$. That is, the prover algorithm P calculates $e_1 \leftarrow H(seed_0)$. The messages $(c_0, c_1)$ generated in operation #1 are sent to the verifier algorithm V.

Operation #2:

Upon receiving the messages $(c_0, c_1)$, the verifier algorithm V randomly selects one number $Ch_A$ from the origins of q rings K and sends the selected number $Ch_A$ to the prover algorithm P.

Operation #3:

Upon receiving the number $Ch_A$, the prover algorithm P calculates $F_2(x) \leftarrow Ch_A \cdot F(x+r_0)+F_1(x)$. This calculation is equivalent to masking the multivariate polynomial $F(x+r_0)$ for x with the multivariate polynomial $F_1(x)$. The multivariate polynomial $F_2$ generated in operation #3 is sent to the verifier algorithm V.

Operation #4:

Upon receiving the multivariate polynomial $F_2$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response Rsp=seed$_0$. In the case where Ch$_B$=1, the prover algorithm P generates a response Rsp=r$_1$. The response Rsp generated in operation #5 is sent to the verifier algorithm V.

Operation #6:

Upon receiving the response Rsp, the verifier algorithm V executes the following verification process using the received response Rsp.

In the case where Ch$_B$=0, the verifier algorithm V calculates (r$_0$, F$_1$)←PRNG(Rsp). Then, the verifier algorithm V verifies whether or not the equality of c$_1$=H(Rsp) holds. In addition, the verifier algorithm V verifies whether or not the equality of F$_2$(x)=Ch$_A$·F(F(x+r$_0$)+F$_1$(x) holds. The verifier algorithm V outputs the value 1 to indicate authentication success in the case where these verifications all succeed, and outputs the value 0 to indicate authentication failure in the case where a verification fails.

In the case where Ch$_B$=1, the verifier algorithm V sets r$_1$←Rsp. Also, the verifier algorithm V verifies whether or not the equality of c$_0$=H(F$_2$(r$_1$)−Ch$_A$·y, r$_1$) holds. The verifier algorithm V outputs the value 1 to indicate authentication success in the case where these verifications all succeed, and outputs the value 0 to indicate authentication failure in the case where a verification fails.

(Soundness)

The soundness of the 5-pass scheme is ensured from the fact that F$_1$, F$_2$, F$_2^1$, r$_0$, and r$_1$ satisfying the following formula (28) to formula (30) can be calculated from the content of a response when the prover algorithm P appropriately makes the response to the challenge Ch$_B$=0 and 1 with respect to (c$_0$, c$_1$) and two (Ch$_A$, Ch$_A$') selected by the verifier algorithm V

[Math 15]

$$F_2(x) = Ch_A \cdot F(x+r_0) + F_1(x) \quad (28)$$

$$F_2'(x) = Ch_A' \cdot F(x+r_0) + F_1(x) \quad (29)$$

$$F_2(r_1) - Ch_{A1} \cdot y = F_2'(r_1) - Ch_A' \cdot y \quad (30)$$

By ensuring the foregoing soundness of the 5-pass scheme, the fact that forgery with a probability higher than ½+1/q is not possible is ensured as long as the problem of solving the multi-order multivariate simultaneous equations is not solved. That is, to appropriately make the response to all of the challenges Ch$_A$=0 and 1 of the verifier, the falsifier has to calculate F$_1$, F$_2$, F$_2$', r$_0$, and r$_1$ satisfying the foregoing formula (28) and formula (30). In other words, the falsifier has to calculate s satisfying F(s)=y. Accordingly, the falsifier may not succeed the forgery with a probability higher than ½+1/q as long as the problem of solving the multi-order multivariate simultaneous equations is not solved. Further, by repeatedly executing the foregoing interactive protocol a sufficiently large number of times, the probability of a successful forgery becomes negligibly small.

(Hash Function H)

Here, the description of a hash function H will be supplemented. In the foregoing algorithms, c$_0$, c$_1$, and the like are calculates using the hash function H. However, a commitment function COM may be used instead of the hash function H. The commitment function COM is a function in which a character string S and a random number p are factors. An example of the commitment function includes a scheme published in the international conference CRYPTO 1996 by Shai Halevi and Silvio Micali.

For example, a case in which c$_0$ and c$_1$ are calculated using the commitment function COM will be considered. In this case, random numbers ρ$_0$ and ρ$_1$ are prepared before c$_0$ and c$_1$ are calculated, and c$_0$, c$_1$ are generated by applying commitment functions COM(•,ρ$_0$) and COM(•,ρ$_1$), instead of applying the hash function H(•). Further, ρ$_i$ necessary for the verifier to generate c$_i$ is set to be included in the response Rsp and be sent.

The example of the specific algorithm structure related to the 5-pass scheme has been described above.

[3-2: Efficient Algorithm Based on Quadratic Multivariate Polynomial]

Next, a method of making the algorithms related to the 5-pass scheme efficient will be described. Here, a case in which a pair of quadratic polynomials (f$_1$(x), ..., f$_m$(x)) are used as multivariate polynomials F will be described.

As in the efficient algorithms related to the 3-pass scheme, two vectors, i.e., the vector t$_0$ that is an element of the set K$^n$ and the vector e$_0$ that is an element of the set K$^m$ are used to express the multivariate polynomial F$_1$(x), which is used to mask the multivariate polynomial F(x+r$_0$), as F$_1$(x)=G(x, t$_0$)+e$_0$. When this expression is used, a relation expressed in the following formula (31) can be obtained for the multivariate polynomial F(x+r$_0$).

[Math 16]

$$\begin{aligned}Ch_A \cdot F(x+r_0) + F_1(x) &= Ch_A \cdot F(x) + Ch_A \cdot F(r_0) + Ch_A \cdot \\ &\quad G(x, r_0) + G(x, t_0) + e_0 \\ &= Ch_A \cdot F(x) + G(x, Ch_A \cdot r_0 + t_0) + \\ &\quad Ch_A \cdot F(r_0) + e_0\end{aligned} \quad (31)$$

For this reason, when t$_1$=Ch$_A$·r$_0$+t$_0$, e$_1$=Ch$_A$·F(r$_0$)+e$_0$, the multivariate polynomial F$_2$(x)=Ch$_A$·F(x+r$_0$)+F$_1$(x) after the masking can also be expressed by two vectors, i.e., the vector t$_1$ which is an element of the set K$^n$ and the vector e$_1$ that is an element of the set K$^m$. For this reason, when "F$_1$(x)=G(x, t$_0$)+e$_0$" is set, F$_1$ and F$_2$ can be expressed by using a vector in K$^n$ and a vector in K$^m$, and thus a data size necessary for communication can be considerably reduced. Specifically, communication cost can be reduced to the degree of thousands to tens of thousands of times.

Through the foregoing modification, information on r$_0$ is not at all leaked from F$_2$ (or F$_1$). For example, even when e$_1$ and t$_1$ (or e$_0$ and t$_0$) are given, the information on r$_0$ is not known at all as long as e$_0$ and t$_0$ (or e$_1$ and t$_1$) are not known. Accordingly, the zero knowledge is ensured. Hereinafter, an efficient algorithm related to the 5-pass scheme will be described with reference to FIGS. 10 and 11.

(3-2-1: Basic Structure (FIG. 10))

First, a basic structure of an efficient algorithm related to the 5-pass scheme will be described with reference to FIG. 10. However, further description of the structure of the key generation algorithm Gen will be omitted.

Figure 10:
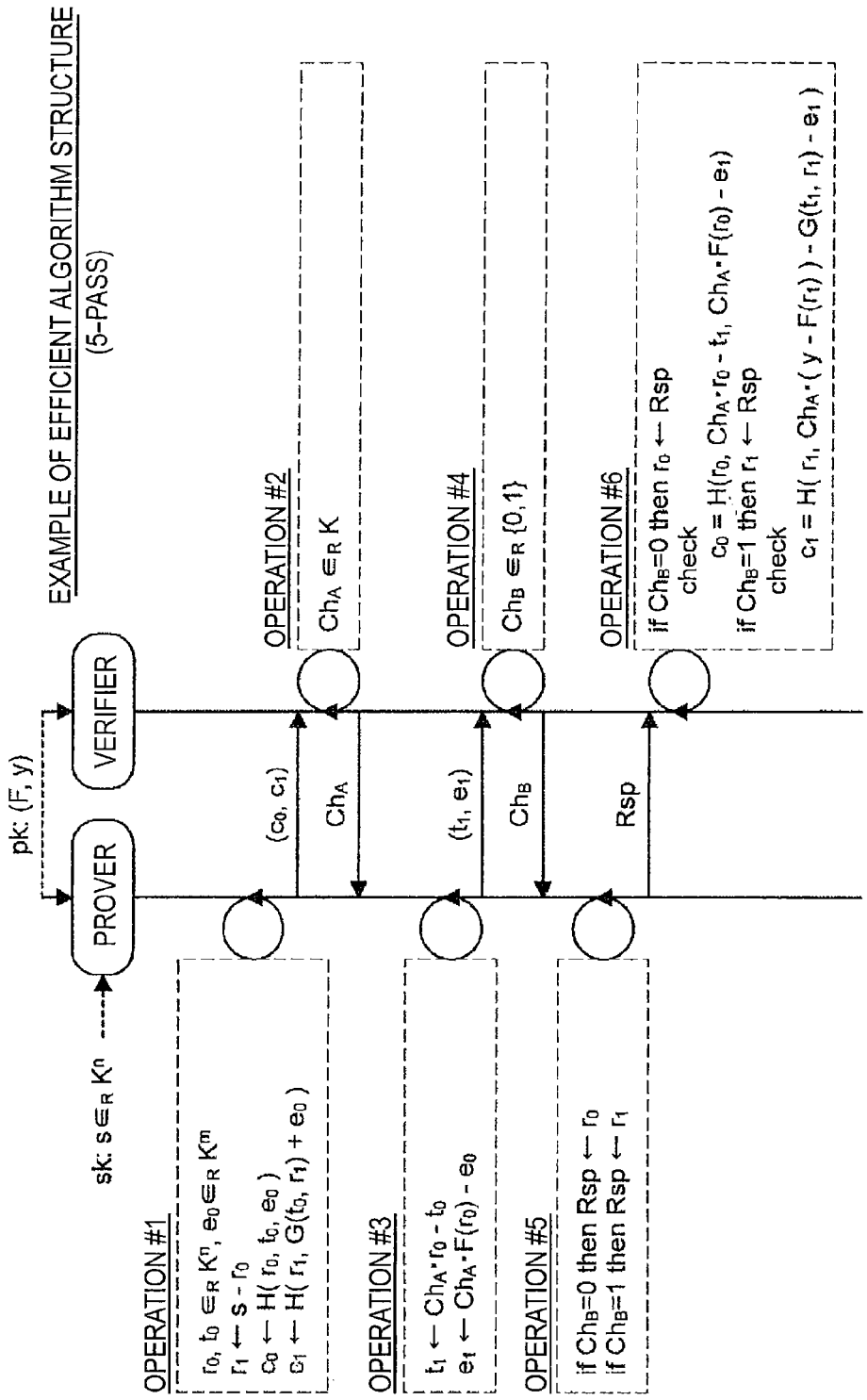
FIG. 10 is an explanatory diagram for describing an example of an efficient algorithm related to the 5-pass public-key authentication scheme.

Operation #1:

As illustrated in FIG. 10, the prover algorithm P randomly generates the vector r$_0$ that is an element of the set K$^n$, the vector t$_0$ that is an element of the set K$^n$, and the vector e$_0$ that is an element of the set K$^m$. Subsequently, the prover algorithm P calculates r$_1$←s−r$_0$. This calculation is equivalent to masking the secret key s with the vector r$_0$. Subsequently, the prover algorithm P calculates the hash value c$_0$ of the vectors r$_0$, t$_0$, e$_0$. That is, the prover algorithm P calculates c$_0$←H(r$_0$, t$_0$, e$_0$). Subsequently, the prover algorithm P generates G(t$_0$, r$_1$)+e$_0$ and the hash value c$_1$ of r$_1$. That is, the prover algorithm P calculates c$_0$←H(r$_1$, G(t$_0$, r$_1$)+e$_0$). The messages (c$_0$, c$_1$) generated in operation #1 is sent to the verifier algorithm V.

Operation #2:

Upon receiving the messages ($c_0$, $c_1$), the verifier algorithm V randomly selects one number $Ch_A$ from the origins of q rings K and sends the selected number $Ch_A$ to the prover algorithm P.

Operation #3:

Upon receiving the number $Ch_A$, the prover algorithm P calculates $t_1 \leftarrow Ch_A \cdot r_0 - t_0$. Additionally, the prover algorithm P calculates $e_1 \leftarrow Ch_A \cdot F(r_0) - e_0$. The prover algorithm P sends $t_1$ and $e_1$ to the verifier algorithm V.

Operation #4:

Upon receiving $t_1$ and $e_1$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response $Rsp=r_0$. In the case where $Ch_B=1$, the prover algorithm P generates a response $Rsp=r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V executes $r_0 \leftarrow Rsp$. Then, the verifier algorithm V verifies whether or not the equality of $c_0 = H(r_0, Ch_A \cdot r_0 - t_1, Ch_A \cdot F(r_0) - e_1)$ holds. The verifier algorithm V outputs the value 1 to indicate authentication success in the case where these verifications all succeed, and outputs the value 0 to indicate authentication failure in the case where a verification fails.

In the case where $Ch_B=1$, the verifier algorithm V executes $r_1 \leftarrow Rsp$. Then, the verifier algorithm V verifies whether or not the equality of $c_1 = H_1(r_1, Ch_A \cdot (y - F(n)) - G(t_1, r_1) - e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 5-pass scheme has been described above. By using the algorithms, the data size necessary for communication is considerably reduced.

(3-2-2: Parallelized Algorithm (FIG. 11))

Figure 11:
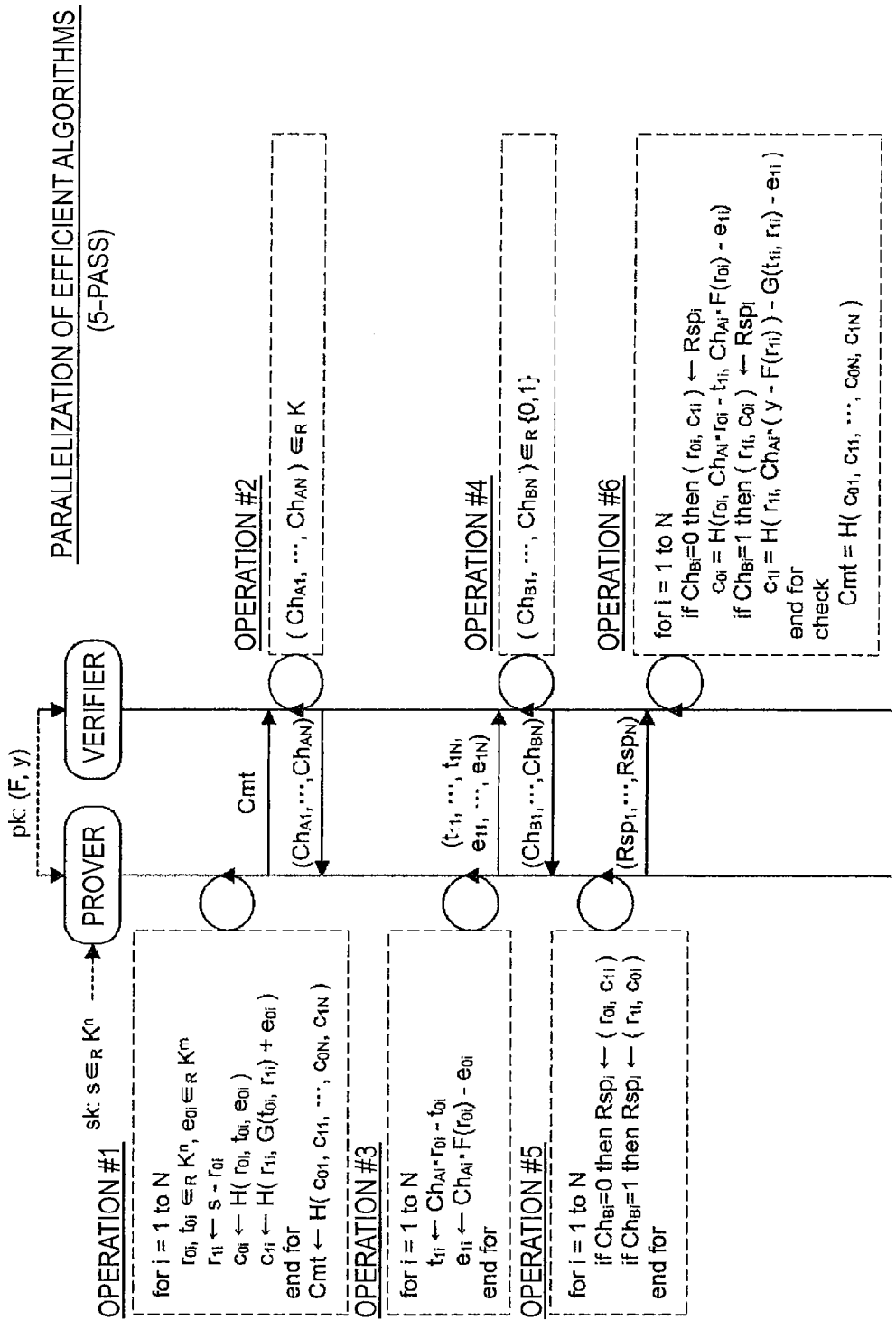
FIG. 11 is an explanatory diagram for describing parallelization of the efficient algorithm related to the 5-pass public-key authentication scheme.

Next, a method of parallelizing the efficient algorithms illustrated in FIG. 10 will be described with reference to FIG. 11. However, further description of the structure of the key generation algorithm Gen will be omitted.

As described above, applying the above interactive protocol related to the 5-pass scheme makes it possible to keep the probability of a successful forgery to ($\frac{1}{2}+1/q$) or less. Consequently, executing the interactive protocol twice makes it possible to keep the probability of a successful forgery to ($\frac{1}{2}+1/q$)$^2$ or less. Furthermore, if the interactive protocol is executed N times, the probability of a successful forgery becomes ($\frac{1}{2}+1/q$)$^N$, and if N is set to a sufficiently large number (N=80, for example), the probability of a successful forgery becomes negligibly small.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Here, algorithms that execute the above interactive protocol related to the 5-pass scheme in parallel (hereinafter designated parallelized algorithms) will now be described.

Operation #1:

The prover algorithm P first executes the following processes (1) to (4) for i=1 to N.

Process (1): The prover algorithm P randomly generates the vectors $r_{0i}$, $t_0$, that are elements of the set $K^n$, and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$.

Process (3): The prover algorithm P calculates $c_{0i} \leftarrow H(r_{0i}, t_{0i}, e_{0i})$.

Process (4): The prover algorithm P calculates $c_{1i} \leftarrow H(r_{1i}, G(t_{0i}, r_{1i}) + e_{0i})$.

After executing the above processes (1) to (4) for i=1 to N, the prover algorithm P executes the hash value $Cmt \leftarrow H(c_{01}, c_{11}, \ldots, c_{0N}, c_{1N})$. The hash value Cmt generated in operation #1 is sent to the verifier algorithm V.

Operation #2:

Upon receiving the hash value Cmt, the verifier algorithm V randomly selects one number $Ch_{Ai}$ from the origins of q rings K for i=1 to N and sends the selected number $Ch_{Ai}$ (i=1 to N) to the prover algorithm P.

Operation #3:

Upon receiving the number $Ch_{Ai}$ (i=1 to N), the prover algorithm P calculates $t_{1i} \leftarrow Ch_{Ai} \cdot r_{0i} - t_{0i}$ for i=1 to N. Additionally, the prover algorithm P calculates $e_{1i} \leftarrow Ch_{Ai} \cdot F(r_{0i}) - e_{0i}$ for i=1 to N. Then, the prover algorithm P sends $t_{11}, \ldots, t_{1N}$ and $e_{11}, \ldots, e_{1N}$ to the verifier algorithm V.

Operation #4:

Upon receiving $t_{11}, \ldots, t_{1N}$ and $e_{11}, \ldots, e_{1N}$, the verifier algorithm V selects which verification pattern to use from between two verification patterns for i=1 to N. For example, the verifier algorithm V may select a numerical value from between two numerical values $\{0, 1\}$ representing verification patterns, and set the selected numerical value in a challenge $Ch_{Bi}$. This challenge $Ch_{Bi}$ (i=1 to N) is sent to the prover algorithm P.

Operation #5:

Upon receiving the challenge $Ch_{Bi}$ (i=1 to N), the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i = (r_{0i}, c_{1i})$. In the case where $Ch_{Bi}=1$, the prover algorithm P generates a response $Rsp_i = (r_{1i}, c_{0i})$. The response $Rsp_i$ (i=1 to N) generated in operation #5 is sent to the verifier algorithm V.

Operation #6:

Upon receiving the response $Rsp_i$ (i=1 to N), the verifier algorithm V executes the following processes (1) and (2) using the received response $Rsp_i$ (i=1 to N).

Process (1): In the case where $Ch_{Bi}=0$, the verifier algorithm V executes $(r_{0i}, c_{1i}) \leftarrow Rsp_i$. Then, the verifier algorithm V calculates $c_{0i} = H(r_{0i} - Ch_{Ai} \cdot r_{0i} - t_{1i}, Ch_{Ai} \cdot F(r_{0i}) - e_1)$. The verifier algorithm V then stores $(c_{0i}, e_{1i})$.

Process (2): In the case where $Ch_{Bi}=1$, the verifier algorithm V executes $(r_{1i}, c_{0i}) \leftarrow Rsp_i$. Then, the verifier algorithm V calculates $c_{1i} = H(r_{1i} - Ch_{Ai} \cdot (y - F(r_{1i})) - G(t_{1i}, r_{1i}) - e_1)$. The verifier algorithm V then stores $(c_{0i}, c_{1i})$.

After executing the processes (1) and (2) for i=1 to N, the verifier algorithm V verifies whether or not the equality of $Cmt = H(c_{01}, c_{11}, \ldots, c_{0N}, c_{1N})$ holds. The verifier algorithm V outputs the value 1 to indicate authentication success in the case where these verifications succeed, and outputs the value 0 to indicate authentication failure in the case where a verification fails.

The example of the structures of the parallelized efficient algorithms related to the 5-pass scheme has been described above. Also, the parallelized algorithms shown in FIG. 11 include the contrivance in which the message is converted into the hash value before being sent. The contrivance improves communication efficiency. Similarly, the structure may be modified such that the challenges $Ch_{A1}, \ldots, Ch_{AN}$, $Ch_{B1}, \ldots, Ch_{BN}$ or the responses $Rsp_1, \ldots, Rsp_N$ are converted into hash values before being sent. Modifying the structure in this way enables a further improvement in the communication efficiency to be expected.

[3-3: Efficient Algorithm Based on High-Order Multivariate Polynomial (Scheme #1)]

The foregoing efficient algorithms use the property in that the polynomial G defined in the foregoing formula (10) becomes bilinear by expressing the multivariate polynomial F with the pair of quadratic polynomials $f_i$ defined in the foregoing formula (8). Here, the efficient algorithm illustrated in FIG. 10 uses the fact that the public key F(s) can be divided into a portion in which a term which is $Ch_A$ times is dependent on $Ch_A$ and another portion. However, even in the case of the 5-pass scheme, when the polynomial G is linear for at least one of x and y, an efficient algorithm can be constructed likewise even when the polynomial G is not bilinear.

(Construction of Efficient Algorithm Using Cubic Polynomial $f_i$)

A method of constructing an efficient algorithm using a cubic polynomial $f_1$ of a ring R will be examined as in the case of the 3-pass scheme. When a cubic polynomial $f_1$ is expressed as in the foregoing formula (17), the fact that $G_x(x, y)$ and $G_y(x, y)$ become linear for x and y can be understood from formula (19) and formula (20).

Thus, using the foregoing property, the public key F(s) is divided into a term which is $Ch_A$ times by introducing new variables $r_0, r_1, t_0, u_0$, and $e_0$. Since polynomials $G_x$ and $G_y$ are linear for x and y, a relation among the following formula (32) to formula (35) is established using the variables $r_0, r_1, t_0, u_0$, and $e_0$. The following formula (32) to formula (35) can be divided into a first portion dependent on $Ch_A$ and a second portion not dependent on $Ch_A$. Here, the first portion can be reproduced with $(r_1, t_1, u_1, e_1)$. The second portion can be reproduced with $(r_0, t_1, u_1, e_1)$.

For example, "$e_0$, $G_x(t_0, r_1)$" included in the following formula (32), "$t_0$" included in the following formula (33), "$u_0$" included in the following formula (34), and "$e_0$, $G_y(r_0, u_0)$" included in the following formula (35) are the first portions. On the other hand, "$Ch_{Ai} \cdot F(r_0+r_1)$, $e_1$, $Ch_A \cdot F(r_1)$, $G_x(t_1, r_1)$" included in the following formula (32), "$Ch_A \cdot r_0$, $t_1$" included in the following formula (33), "$Ch_A \cdot r_1$, $u_1$" included in the following formula (34), and "$Ch_A \cdot F(r_0)$, $G_y(r_0, u_1)$, $e_1$" included in the following formula (35) are the second portions.

From the definition of the secret key s and the relation among the following formula (32) to formula (35), the fact the secret key s is not obtainable is ensured even when any one of $(r_1, t_1, u_1, e_1)$ and $(r_0, t_1, u_1, e_1)$ is used. Using this property enables, for example, the construction of an efficient algorithm (hereinafter, an extended algorithm) related to the 5-pass scheme using the cubic polynomial $f_1$ of the ring R.

[Math 17]

$$CH_A \cdot F(r_0+r_1) = e_0 + e_1 + Ch_A \cdot F(r_1) + G_x(t_0, r_1) + G_x(t_1, r_1) \quad (32)$$

$$Ch_A \cdot r_0 = t_0 + t_1 \quad (33)$$

$$Ch_A \cdot r_1 = u_0 + u_1 \quad (34)$$

$$Ch_A \cdot F(r_0) + G_y(r_0, u_1) + G_y(r_0, u_0) = e_0 + e_1 \quad (35)$$

Hereinafter, an example of a specific extended algorithm structure will be described. Two basic points regarding design of an extended algorithm are that a message expressed in the following formula (36) and formula (37) is sent to a verifier and that a portion (first portion) dependent on $Ch_A$ is verified for $Ch_A$ selected by the verifier. Here, since "$r_0$ and $r_1$ used at the time of generation of a message are prevented from being substituted with other $r_0$ and $r_1$ at the time of verification," an example of a structure to which the verification on $r_0$ and $r_1$ is added will be introduced below.

[Math 18]

$$c_0 = H(t_0, e_0 - G_y(r_0, u_0)) \quad (36)$$

$$c_1 = H(u_0, G_x(t_0, r_1) + e_0) \quad (37)$$

(3-3-1: Basic Structure (FIG. 12))

First, a basic structure of an extended algorithm related to the 5-pass scheme will be described with reference to FIG. 12. However, further description of the structure of the key generation algorithm Gen will be omitted.

Figure 12:
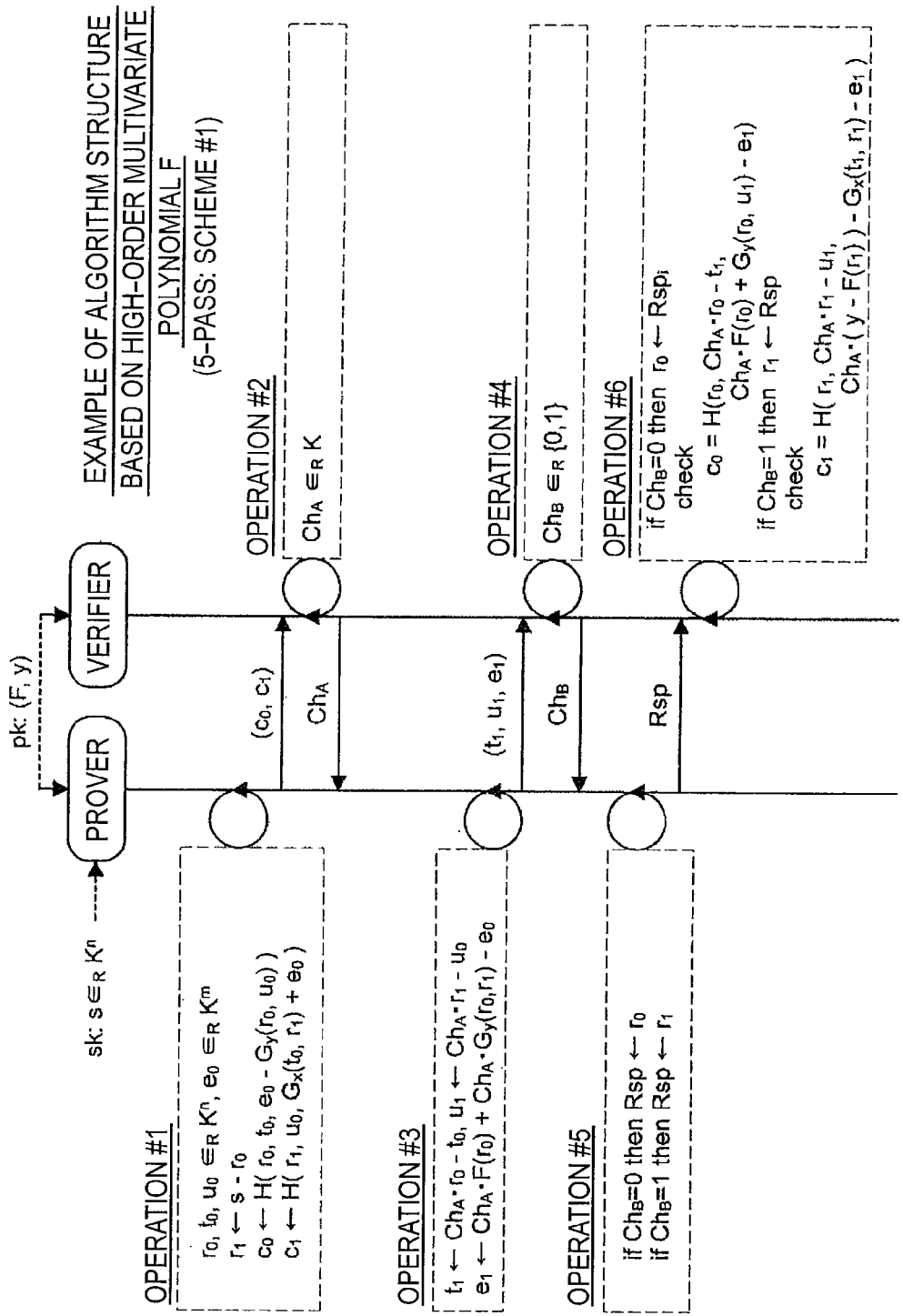
FIG. 12 is an explanatory diagram for describing an example of an algorithm of the public-key authentication scheme (scheme #1) using the 5-pass high-order multivariate polynomial.

Operation #1:

As illustrated in FIG. 12, the prover algorithm P randomly generates the vectors $r_0, t_0, u_0$ that are elements of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Subsequently, the prover algorithm P calculates $c_0 \leftarrow H(r_0, t_0, e_0 - G_y(r_0, u_0))$. Subsequently, the prover algorithm P calculates $c_1 \leftarrow H(r_1, u_0, G_x(t_0, r_1) + e_0)$ Messages $(c_0, c_1)$ generated in operation #1 are sent to the verifier algorithm V.

Operation #2:

Upon receiving the messages $(c_0, c_1)$, the verifier algorithm V randomly selects a number $Ch_A$. The number $Ch_A$ is sent to the prover algorithm P.

Operation #3:

Upon receiving the number $Ch_A$, the prover algorithm P calculates $t_1 \leftarrow Ch_A \cdot r_0 - t_0$. Subsequently, the prover algorithm P calculates $u_1 \leftarrow Ch_A \cdot r_1 - u_0$. Subsequently, the prover algorithm P calculates $e_1 \leftarrow Ch_A \cdot F(r_0) + Ch_A \cdot G_y(r_0, r_1) - e_0$. Then, $(t_1, u_1, e_1)$ generated in operation #3 is sent to the verifier algorithm V.

Operation #4:

Upon receiving $(t_1, u_1, e_1)$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B = 0$, the prover algorithm P generates a response $Rsp = r_0$. In the case where $Ch_B = 1$, the prover algorithm P generates a response $Rsp = r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V verifies whether or not the equality of $c_0=H(r0, Ch_A \cdot r_0 - t_1, Ch_A \cdot F(r_0) + G_y(r_0, u_1) - e_1)$ holds. The verifier algorithm V outputs the value 1 to indicate authentication success in the case where these verifications succeed, and outputs the value 0 to indicate authentication failure in the case where a verification fails.

In the case where $Ch_B=1$, the verifier algorithm V verifies whether or not the equality of $c_1=H(r_1, Ch_A \cdot r_1 - u_1, Ch_A \cdot (y-F(r_1)) - G_x(t_1, r_1) - e_1)$ holds. The verifier algorithm V outputs the value 1 to indicate authentication success in the case where these verifications succeed, and outputs the value 0 to indicate authentication failure in the case where a verification fails.

The example of the extended algorithm structure related to the 5-pass scheme has been described above. By using the algorithms, the data size necessary for communication is considerably reduced. Also, using the cubic polynomial enables realization of higher security.

(3-3-2: Parallelized Algorithm (FIG. 13))

Next, a method of parallelizing extended algorithms related to the 5-pass scheme will be described with reference to FIG. 13. However, further description of the structure of the key generation algorithm Gen will be omitted.

Figure 13:
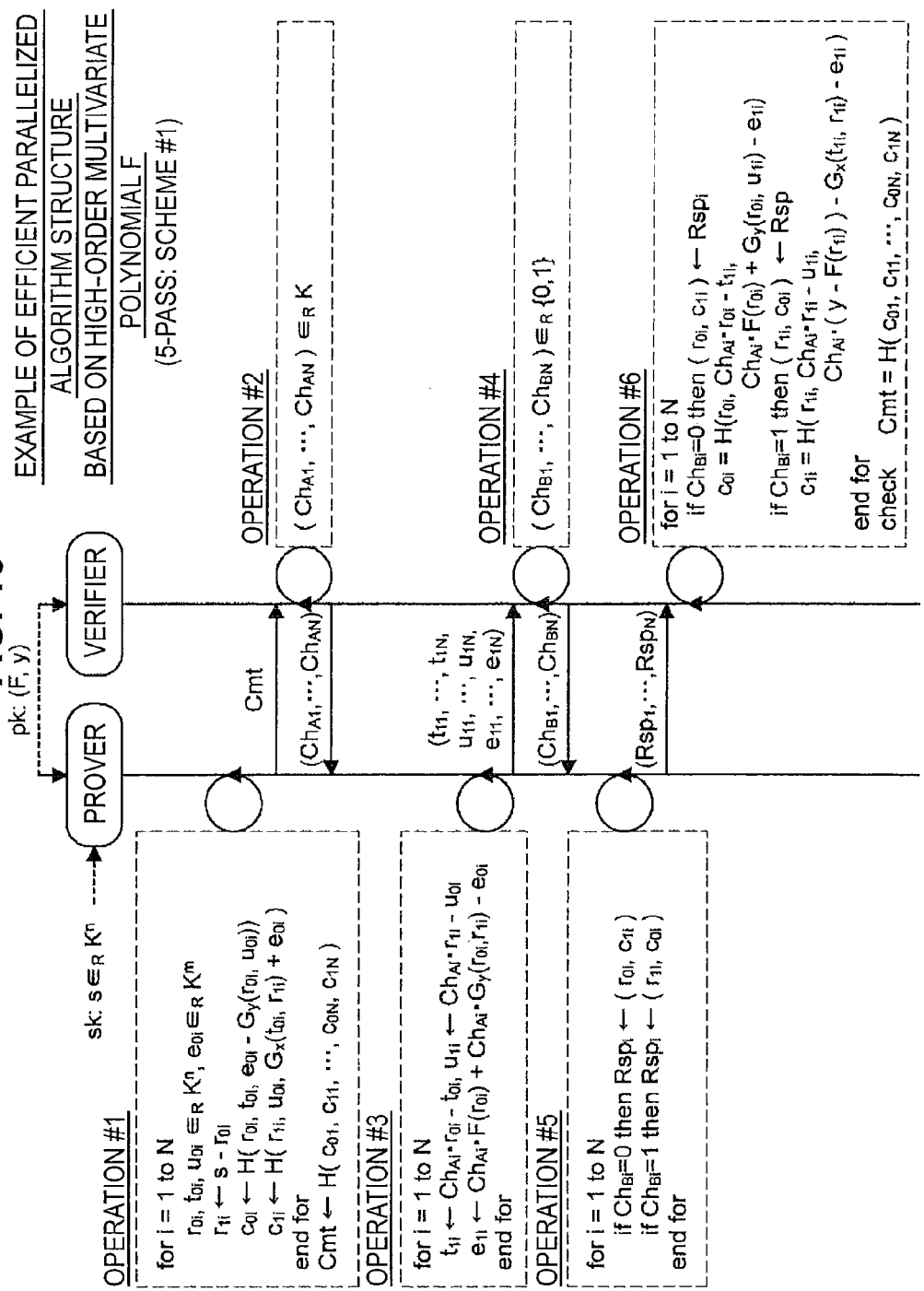
FIG. 13 is an explanatory diagram for describing an example of a parallelized algorithm of the public-key authentication scheme (scheme #1) using the 5-pass high-order multivariate polynomial.

Operation #1:

As illustrated in FIG. 13, the prover algorithm P executes the following processes for i=1 to N. First, the prover algorithm P randomly generates the vectors $r_{0i}$, $t_{0i}$, $u_0$, that are elements of the set $K^n$, and the vector $e_{0i}$ that is an element of the set $K^m$. Subsequently, the prover algorithm P calculates $r_{1i} \leftarrow s - r_{0i}$. This calculation is equivalent to masking the secret key s with the vector $r_{0i}$. Subsequently, the prover algorithm P calculates $c_{0i} \leftarrow H(r_{0i}, t_{0i}, e_{0i}, -G_y(r_{0i}, u_{0i}))$. Subsequently, the prover algorithm P calculates $c_{1i} \leftarrow H(r_{1i}, u_{0i} - G_x(t_{0i}, r_{1i}) + e_{0i})$.

Operation #1 (continued):

After calculating $(c_{01}, c_{11}, \ldots, c_{0N}, c_{1N})$, the prover algorithm P calculates $Cmt \leftarrow H(c_{01}, c_{11}, \ldots, c_{0N}, c_{1N})$. The hash value Cmt generated in operation #1 is sent to the verifier algorithm V.

Operation #2:

Upon receiving the hash value Cmt, the verifier algorithm V randomly selects numbers $Ch_{A1}, \ldots, Ch_{AN}$. The numbers $Ch_{A1}, \ldots, Ch_{AN}$ are sent to the prover algorithm P.

Operation #3:

Upon receiving the numbers $Ch_{A1}, \ldots, Ch_{AN}$, the prover algorithm P executes the following process for i=1 to N. First, the prover algorithm P calculates $t_{1i} \leftarrow Ch_{Ai} \cdot r_{0i} - t_{0i}$. Subsequently, the prover algorithm P calculates $u_{1i} \leftarrow Ch_{Ai} \cdot r_{1i} - u_{0i}$. Subsequently, the prover algorithm P calculates $e_{1i} \leftarrow Ch_{Ai} \cdot F(r_{0i}) + Ch_{Ai} \cdot G_y(r_{0i}, r_{1i}) - e_{0i}$.

Then, $(t_{11}, u_{11}, e_{11}, \ldots, t_{1N}, u_{1N}, e_{1N})$ generated in operation #3 is sent to the verifier algorithm V.

Operation #4:

Upon receiving $(t_{11}, u_{11}, e_{11}, \ldots, t_{1N}, u_{1N}, e_{1N})$, the verifier algorithm V selects which verification pattern to use from between two verification patterns for i=1 to N. For example, the verifier algorithm V may select a numerical value from between two numerical values {0, 1} representing verification patterns for i=1 to N, and set the selected numerical value in a challenge $Ch_{Bi}$. The challenges $Ch_{B1}$ to $Ch_{BN}$ are sent to the prover algorithm P.

Operation #5:

Upon receiving the challenges $Ch_{B1}$ to $Ch_{BN}$, the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i=(r_{0i}, c_{1i})$. In the case where $Ch_{Bi}=1$, the prover algorithm P generates a response $Rsp_i=(r_{0i}, c_{0i})$. The response $Rsp_i$ generated in operation #5 is sent to the verifier algorithm V.

Operation #6:

Upon receiving the response $Rsp_i$ (i=1 to N), the verifier algorithm V executes the following processes using the received response $Rsp_i$ for i=1 to N.

In the case where $Ch_{Bi}=0$, the verifier algorithm V calculates $c_{0i}=H(r_{0i} - Ch_{Ai} \cdot r_{0i} - t_{1i}, Ch_{Ai} \cdot F(r_{0i}) + G_y(r_{0i}, u_{1i}) - e_1)$. The verifier algorithm V then stores $(c_{0i}, c_{1i})$.

In the case where $Ch_{Bi}=1$, the verifier algorithm V calculates $c_{1i}=H(r_{1i}, Ch_{Ai} \cdot r_{1i} - u_{1i}, Ch_{Ai} \cdot (y-F(r_{1i})) - G_x(t_{1i}, r_{1i}) - e_1)$. The verifier algorithm V then stores $(c_{0i}, c_{1i})$.

After executing the foregoing processes for i=1 to N, the verifier algorithm V verifies whether or not the equality of $Cmt=H(c_{01}, c_{11}, \ldots, c_{0N}, c_{1N})$ holds. The verifier algorithm V outputs the value 1 to indicate authentication success in the case where these verifications succeed, and outputs the value 0 to indicate authentication failure in the case where a verification fails.

The parallelization of the extended algorithm structure related to the 5-pass scheme has been described above. By using the algorithms, the data size necessary for communication is considerably reduced. Also, using the cubic polynomial enables realization of higher security.

[3-4: Efficient Algorithm Based on High-Order Multivariate Polynomial (Scheme #2)]

Hitherto, the method of constructing the efficient algorithm using the cubic polynomial $f_1$ of the ring R has been described. Here, a method of constructing an extended algorithm using a high-order polynomial $f_1$ defined in a ring R of a characteristic q and an order $q^k$ will be considered. The high-order polynomial $f_1$ is expressed as in, for example, the following formula (38). When the high-order polynomial $f_1$ is used, a component $g_1$ of the polynomial G defined as $G(x, y)=F(x+y)-F(x)-F(y)=(g_1, \ldots, g_m)$ is expressed as in the following formula (39).

[Math 19]

$$f_l(x_1, \ldots, x_n) = \sum_{i,j,z,w} a_{lijzw} x_i^{q^z} x_j^{q^w} + \sum_{i,z} b_{liz} x_i^{q^z} \quad (38)$$

$$g_l(x_1, \ldots, x_n, y_1, \ldots, y_n) = \sum_{i,j,z,w} (a_{lijzw} + a_{ljizw}) x_i^{q^z} y_j^{q^w} \quad (39)$$

$$= \sum_z g_{lz}(x_1, \ldots, x_n, y_1, \ldots, y_n)$$

A relation shown in the following formula (40) is established for $Ch_A$ that is an element of the set R. Additionally, a relation shown in the following formula (41) is also established. Thus, using this property (hereinafter, referred to as quasi-linearity), the public key F(s) is divided into a term which is $Ch_A$ times by introducing new variables $r_0, r_1, t_{0z}$, and $e_0$. Since G has the quasi-linearity, a relation among the following formula (42) to formula (44) is established using the variables $r_0, r_1, t_{0z}$, and $e_0$. The following formula (42) to formula (44) can be divided into a first portion dependent on $Ch_A$ and a second portion not dependent on $Ch_A$. Here, the first portion can be reproduced with $(r_1, t_{1z}, e_1)$. The second portion can be reproduced with $(r_0, t_{1z}, e_1)$.

For example, "$e_0, \Sigma G_z(t_{0z}, r_1)$" included in the following formula (42), "$t_{0z}$" included in the following formula (43), and "$e_0$" included in the following formula (44) are the first portions. On the other hand, "$Ch_A \cdot F(r_0+r_1), e_1, Ch_A \cdot F(r_1)$, "$\Sigma G_z(t_{1z}, r_1)$" included in the following formula (42), "$Ch_A^{q(-z)} \cdot r_0, t_{1z}$" (where $q(z)=q^z$ and the same applies below) included in the following formula (43), and "$Ch_A \cdot F(r_0), e_1$" included in the following formula (44) are the second portions.

From the definition of the secret key s and the relation among the following formula (42) to formula (44), the fact that the secret key s is not obtainable is ensured even when any one of $(r_1, t_1, e_1)$ and $(r_0, t_{1z}, e_1)$ is used. Using this property enables, for example, the construction of an efficient algorithm (hereinafter, a high-order extended algorithm) related to the 5-pass scheme using the high-order polynomial $f_1$ of the ring R.

[Math 20]

$$Ch_A \cdot G(x, y) = \sum_z G_z(Ch_A^{q-z} x, y) \quad (40)$$

$$G(x_1 + x_2, y) = G(x_1, y) + G(x_2, y) \quad (41)$$

$$Ch_A \cdot F(r_0 + r_1) = e_0 + e_1 + Ch_A \cdot F(r_1) \sum_z G_z(t_{0z}, r_1) + \sum_z G_z(t_{1z}, r_1) \quad (42)$$

$$(Ch_A)^{q-z} \cdot r_0 = t_{0z} + t_{1z} \quad (43)$$

$$Ch_A \cdot F(r_0) = e_0 + e_1 \quad (44)$$

Hereinafter, an example of a specific high-order extended algorithm structure will be described. Two basic points regarding design of a high-order extended algorithm are that a message expressed in the following formula (45) and formula (46) is sent to a verifier and that a portion (first portion) dependent on $Ch_A$ is verified for $Ch_A$ selected by the verifier. Here, since "$r_0$ and $r_1$ used at the time of generation of a message are prevented from being substituted with other $r_0$ and $r_1$ at the time of verification," an example of a structure to which the verification on $r_0$ and $r_1$ is added will be introduced below.

[Math 21]

$$c_0 = H(t_{01}, \ldots, t_{0k}, e_0) \quad (45)$$

$$c_1 = H\left(\sum_z G_z(t_{0z}, r_1) + e_0\right) \quad (46)$$

(3-4-1: Basic Structure (FIG. 14))

First, a basic structure of a high-order extended algorithm related to the 5-pass scheme will be described with reference to FIG. 14. However, further description of the structure of the key generation algorithm Gen will be omitted.

Figure 14:
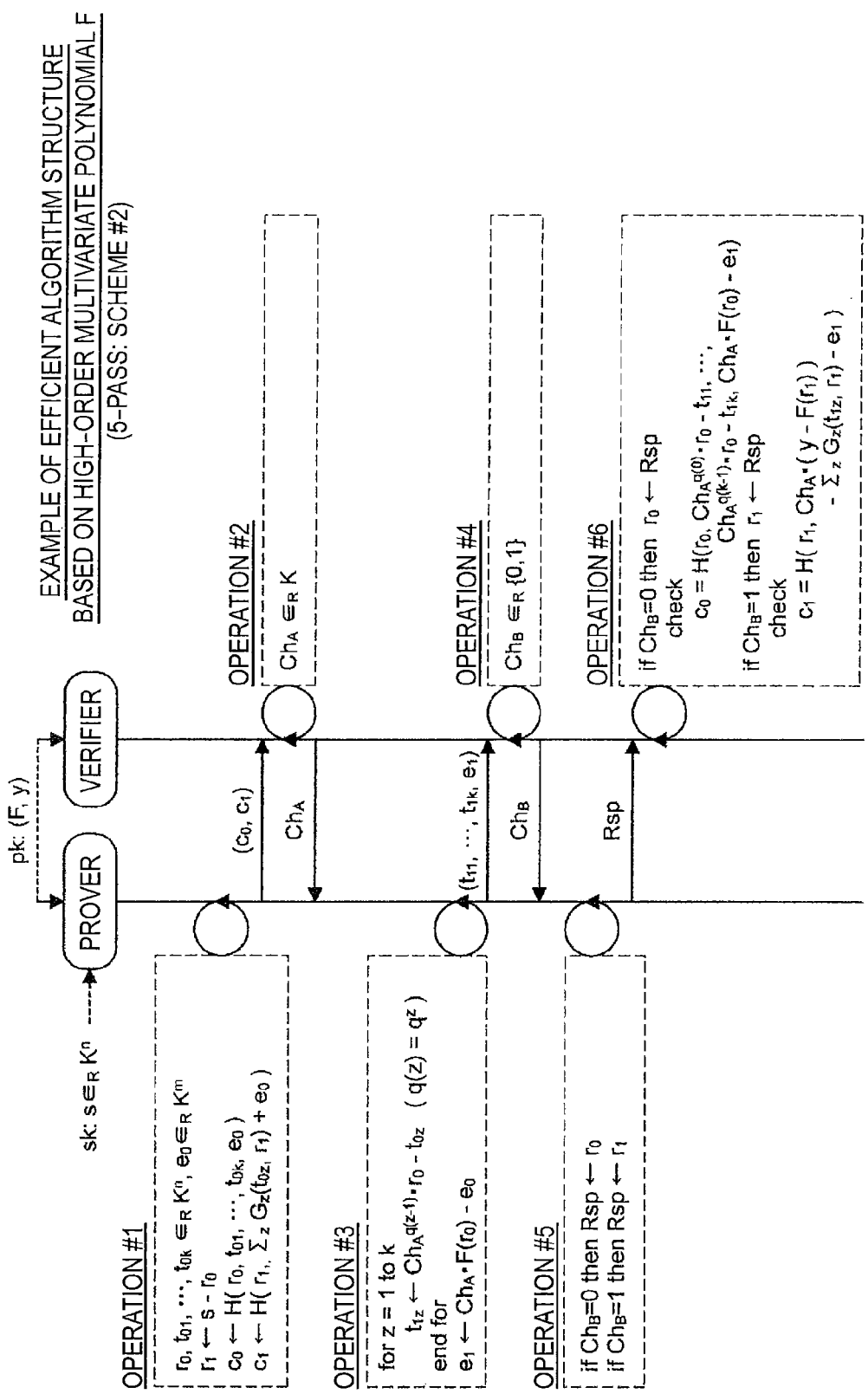
FIG. 14 is an explanatory diagram for describing an example of an algorithm of the public-key authentication scheme (scheme #2) using the 5-pass high-order multivariate polynomial.

Operation #1:

As illustrated in FIG. 14, the prover algorithm P randomly generates the vectors $r_0, t_{01}, t_{0k}$ that are elements of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Subsequently, the prover algorithm P calculates $c_0 \leftarrow H(r_0, t_{01}, \ldots, t_{0k}, e_0)$ Subsequently, the prover algorithm P calculates $c_1 \leftarrow H(r_1, \Sigma_z G_z(t_{0z}, r_1) + e_0)$ (where $\Sigma_z$ represents a sum for z=1 to k). Messages $(c_0, c_1)$ generated in operation #1 are sent to the verifier algorithm V.

Operation #2:

Upon receiving the messages $(c_0, c_1)$, the verifier algorithm V randomly selects a number $Ch_A$. The number $Ch_A$ is sent to the prover algorithm P.

Operation #3:

Upon receiving the number $Ch_A$, the prover algorithm P calculates $t_{1z} \leftarrow (Ch_A)^{q(z-1)} \cdot r_0 - t_{0z}$ for z=1 to k. Subsequently, the prover algorithm P calculates $e_1 \leftarrow Ch_A \cdot F(r_0) - e_0$. Then, $(t_{11}, \ldots, t_{1k}, e_1)$ generated in operation #3 is sent to the verifier algorithm V.

Operation #4:

Upon receiving $(t_{11}, \ldots, t_{1k}, e_1)$, the verifier algorithm V selects which verification pattern to use from between two verification patterns. For example, the verifier algorithm V may select a numerical value from between two numerical values {0, 1} representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response Rsp=$r_0$. In the case where $Ch_B=1$, the prover algorithm P generates a response Rsp=$r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V verifies whether or not the equality of $c_0 = H(r0, (Ch_A)^{q(0)} \cdot r_0 - t_{11}, \ldots, (Ch_A)^{q(k-1)} \cdot r_0 - t_{1k}, Ch_A \cdot F(r_0) - e_1)$ holds. The verifier algorithm V outputs the value 1 to indicate authentication success in the case where these verifications succeed, and outputs the value 0 to indicate authentication failure in the case where a verification fails.

In the case where $Ch_B=1$, the verifier algorithm V verifies whether or not the equality of $c_1 = H(r_1, Ch_A \cdot (y - F(r_1)) - \Sigma_z G_z(t_{1z}, r_1))$ holds. The verifier algorithm V outputs the value 1 to indicate authentication success in the case where these verifications succeed, and outputs the value 0 to indicate authentication failure in the case where a verification fails.

The example of the high-order extended algorithm structure related to the 5-pass scheme has been described above. By using the algorithms, the data size necessary for communication is considerably reduced. Also, by using the high-order polynomial, higher security is realized.

(3-4-2: Parallelized Algorithm (Structure Example 1) (FIG. 15))

Next, a method of parallelizing high-order extended algorithms related to the 5-pass scheme will be described with reference to FIG. 15. However, further description of the structure of the key generation algorithm Gen will be omitted.

Figure 15:
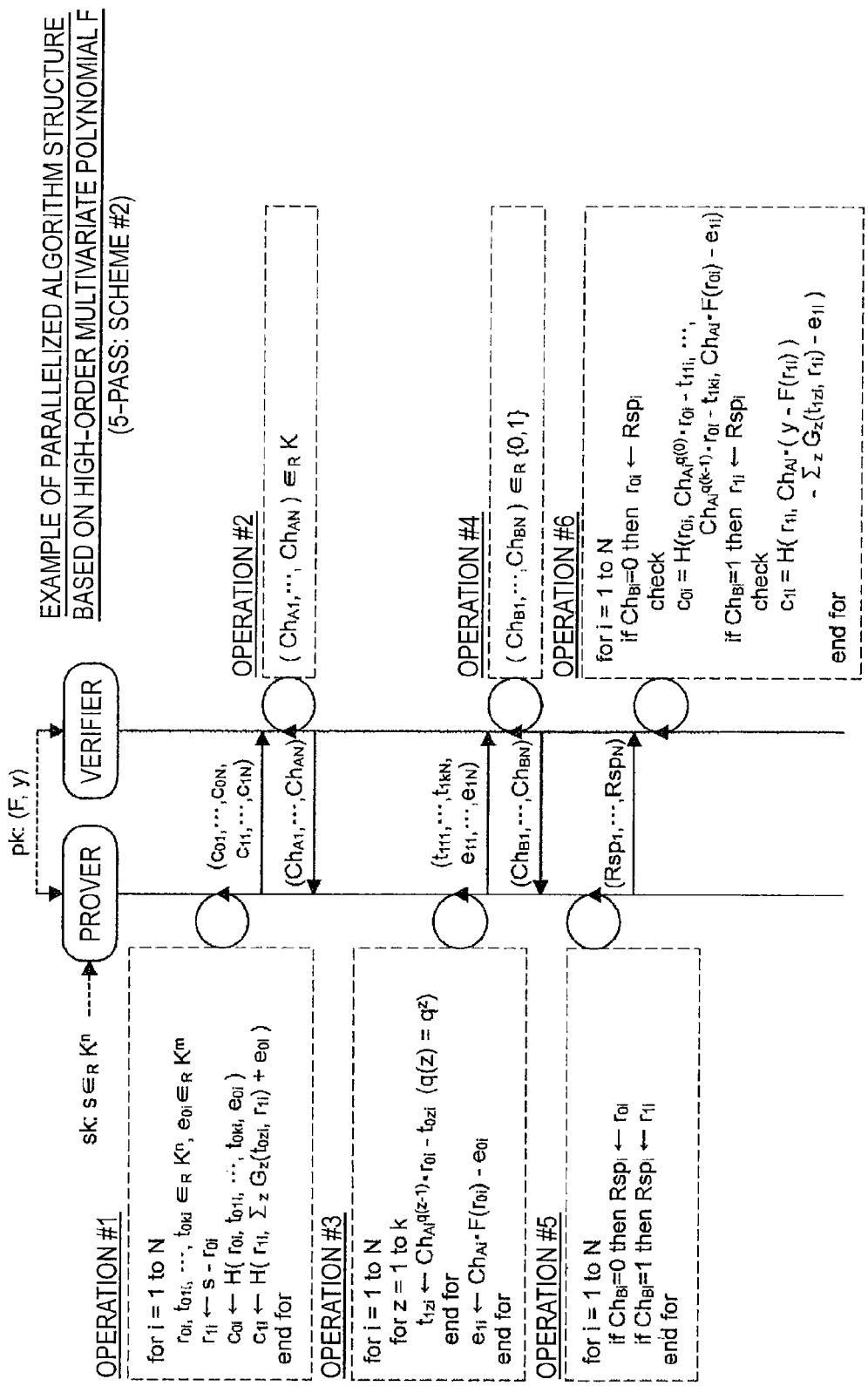
FIG. 15 is an explanatory diagram for describing an example of a parallelized algorithm of the public-key authentication scheme (scheme #2) using the 5-pass high-order multivariate polynomial.

Operation #1:

As illustrated in FIG. 15, the prover algorithm P executes the following processes for i=1 to N. First, the prover algorithm P randomly generates the vectors $r_{0i}, t_{01i}, t_{0ki}$ that are elements of the set $K^n$, and the vector $e_{0i}$ that is an element of the set $K^m$. Subsequently, the prover algorithm P calculates $r_{1i} \leftarrow s - r_{0i}$. This calculation is equivalent to masking the secret key s with the vector $r_{0i}$. Subsequently, the prover algorithm P calculates $c_{0i} \leftarrow H(r_{0i}, t_{01i}, \ldots, t_{0ki}, e_{0i})$. Subsequently, the prover algorithm P calculates $e_{1i} \leftarrow H(r_{1i}, \Sigma_z G_z(t_{0zi}, r_{1i}) + e_{0i})$ (where $\Sigma_z$ represents a sum for z=1 to k). The messages $(c_{0i}, c_{1i})$ (where i=1 to N) generated in operation #1 are sent to the verifier algorithm V.

Operation #2:

Upon receiving the messages ($c_{0i}$, $c_{1i}$) (where i=1 to N), the verifier algorithm V randomly selects numbers $Ch_{A1}$, ..., $Ch_{AN}$. The numbers $Ch_{A1}$, ..., $Ch_{AN}$ are sent to the prover algorithm P.

Operation #3:

Upon receiving the numbers $Ch_{A1}$, ..., $Ch_{AN}$, the prover algorithm P calculates $t_{1z} \leftarrow (Ch_{Ai})^{q(z-1)} \cdot r_{0i} - t_{0zi}$ for i=1 to N and z=1 to k. Subsequently, the prover algorithm P calculates $e_{1i} \leftarrow Ch_{Ai} \cdot F(r_{0i}) - e_{0i}$. Then, ($t_{11i}$, ..., $t_{1ki}$, $e_{1i}$) (where i=1 to N) generated in operation #3 is sent to the verifier algorithm V.

Operation #4:

Upon receiving ($t_{11i}$, ..., $t_{1ki}$, $e_{1i}$) (where i=1 to N), the verifier algorithm V selects which verification pattern to use from between two verification patterns for i=1 to N. For example, the verifier algorithm V may select a numerical value from between two numerical values {0, 1} representing verification patterns for i=1 to N, and set the selected numerical value in a challenge $Ch_{Bi}$. The challenge $Ch_{Bi}$ (where i=1 to N) is sent to the prover algorithm P.

Operation #5:

Upon receiving the challenge $Ch_{Bi}$ (where i=1 to N), the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i = r_{0i}$. In the case where $Ch_{Bi}=1$, the prover algorithm P generates a response $Rsp_i = r_{1i}$. The response $Rsp_i$ (where i=1 to N) generated in operation #5 is sent to the verifier algorithm V.

Operation #6:

Upon receiving the response $Rsp_i$ (i=1 to N), the verifier algorithm V executes the following verification processes using the received response $Rsp_i$ for i=1 to N.

In the case where $Ch_{Bi}=0$, the verifier algorithm V verifies whether or not the equality of $c_{0i} = H(r_0(Ch_{Ai})^{q(0)} \cdot r_{0i} - t_{11i}, (Ch_{Ai})^{q(k-1)} \cdot r_{0i} \cdot t_{1ki}, Ch_{Ai} \cdot F(r_{0i}) - e_{1i})$ holds. In the case where $Ch_{Bi}=1$, the verifier algorithm V verifies whether or not the equality of $e_{1i} = H(r_{1i}, Ch_{Ai} \cdot (y - F(r_{1i}) - \Sigma_z G_z(t_{1zi}, r_{1i}))$ holds.

The verifier algorithm V outputs the value 1 to indicate authentication success in the case where these verifications all succeed, and outputs the value 0 to indicate authentication failure in the case where a verification fails.

The parallelization of the high-order extended algorithm related to the 5-pass scheme has been described above. By using the algorithms, the data size necessary for communication is considerably reduced. Also, by using the high-order polynomial, higher security is realized.

(3-4-3: Parallelized Algorithm (Structure Example 2: High Efficiency) (FIG. 16))

However, in the parallelized structure of the high-order extended algorithm illustrated in FIG. 15, the messages ($c_{0i}$, $c_{1i}$) (where i=1 to N) have been sent at the first pass without change. However, in consideration of communication efficiency, it is preferable that the messages ($c_{0i}$, $c_{1i}$) (where i=1 to N) be collectively sent with one hash value. In order to collectively send the messages ($c_{0i}$, $c_{1i}$) (where i=1 to N) with one hash value at the first pass, the algorithm structure may be modified as illustrated in FIG. 16.

Figure 16:
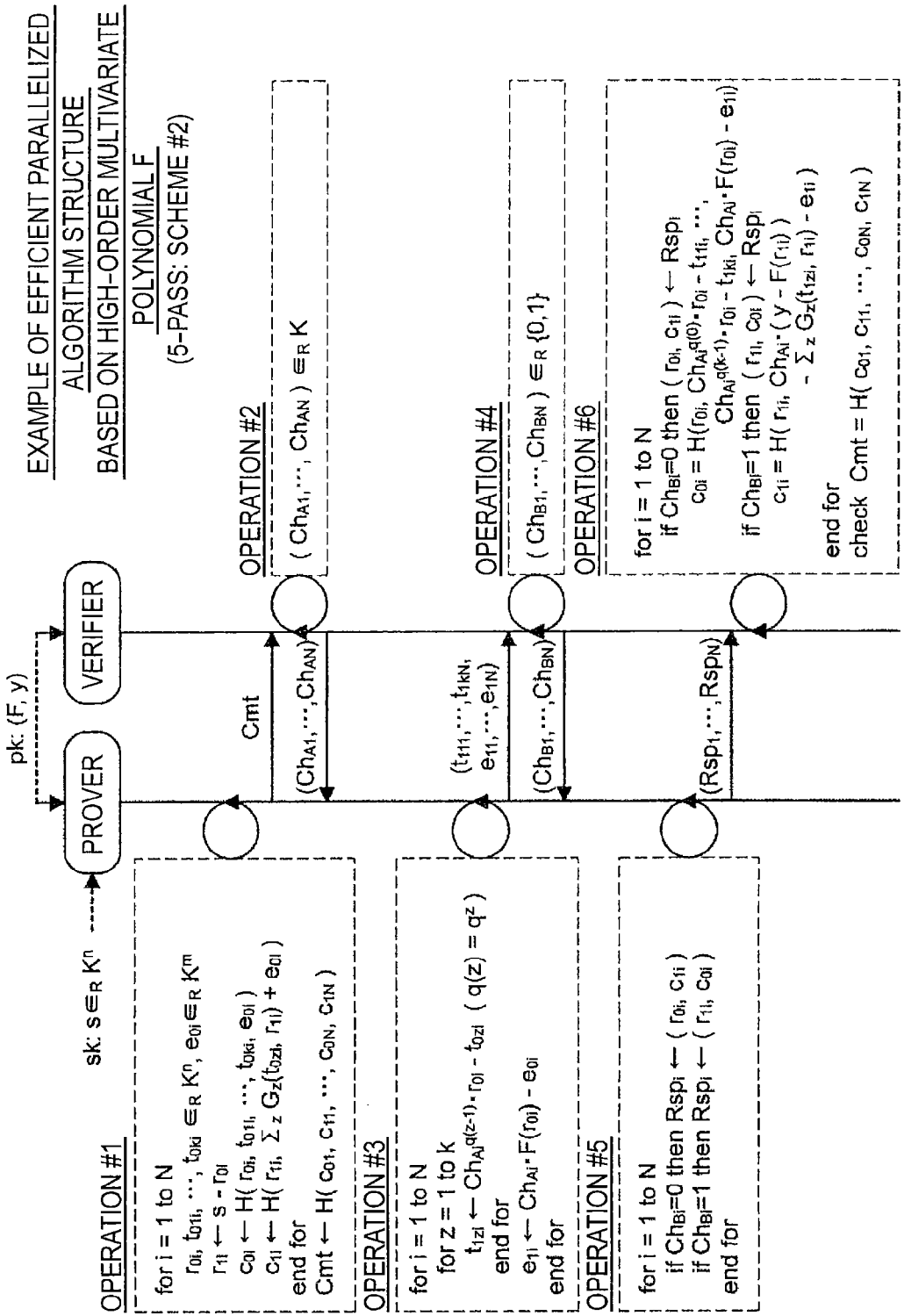
FIG. 16 is an explanatory diagram for describing an example of an efficient parallelized algorithm of the public-key authentication scheme (scheme #2) using the 5-pass high-order multivariate polynomial.

In the example of the structure of FIG. 16, the prover algorithm P calculates the hash value $Cmt \leftarrow H(c_{01}, c_{11}, \ldots, c_{0N}, c_{1N})$ in operation #1. Upon generating a response $Rsp_i$ in operation #5, the prover algorithm P generates a response $Rsp_i = (r_{0i}, c_{1i})$ in the case where $Ch_{Bi}=0$ and generates a response $Rsp_i = (r_{1i}, c_{0i})$ in the case where $Ch_{Bi}=1$. On the other hand, the verifier algorithm V generates ($c_{01}$, $c_{11}$, ..., $c_{0N}$, $c_{1N}$) from ($Ch_{Ai}$, $Ch_{Bi}$, $Rsp_i$) (where i=1 to N) in operation #6 and verifies whether or not the equality of $Cmt = H(c_{01}, c_{11}, \ldots, c_{0N}, c_{1N})$ holds. Performing such modification enables a further improvement in the communication efficiency.

The efficient parallelized algorithm based on the high-order extended algorithms has been described above.

(3-4-4: Parallelized Algorithm (Structure Example 2: Higher Efficiency) (FIG. 17))

However, in the parallelized structure of the high-order extended algorithm illustrated in FIG. 15, the messages ($c_{0i}$, $c_{1i}$) (where i=1 to N) have been sent at the first pass without change. Additionally, ($t_{11i}$, ..., $t_{1ki}$, $e_{1i}$) (where i=1 to N) have been sent at the third pass without change. However, in consideration of communication efficiency, it is preferable that the messages ($c_{0i}$, $c_{1i}$) (where i=1 to N) be collectively sent with one hash value. Additionally, it is preferable that ($t_{11i}$, ..., $t_{1ki}$, $e_{1i}$) (where i=1 to N) be collectively sent with one hash value. In order to collectively send the messages ($c_{0i}$, $c_{1i}$) (where i=1 to N) with one hash value at the first pass and collectively send ($t_{11i}$, ..., $t_{1ki}$, $e_{1i}$) (where i=1 to N) with one hash value at the third pass, the algorithm structure may be modified as illustrated in FIG. 17.

Figure 17:
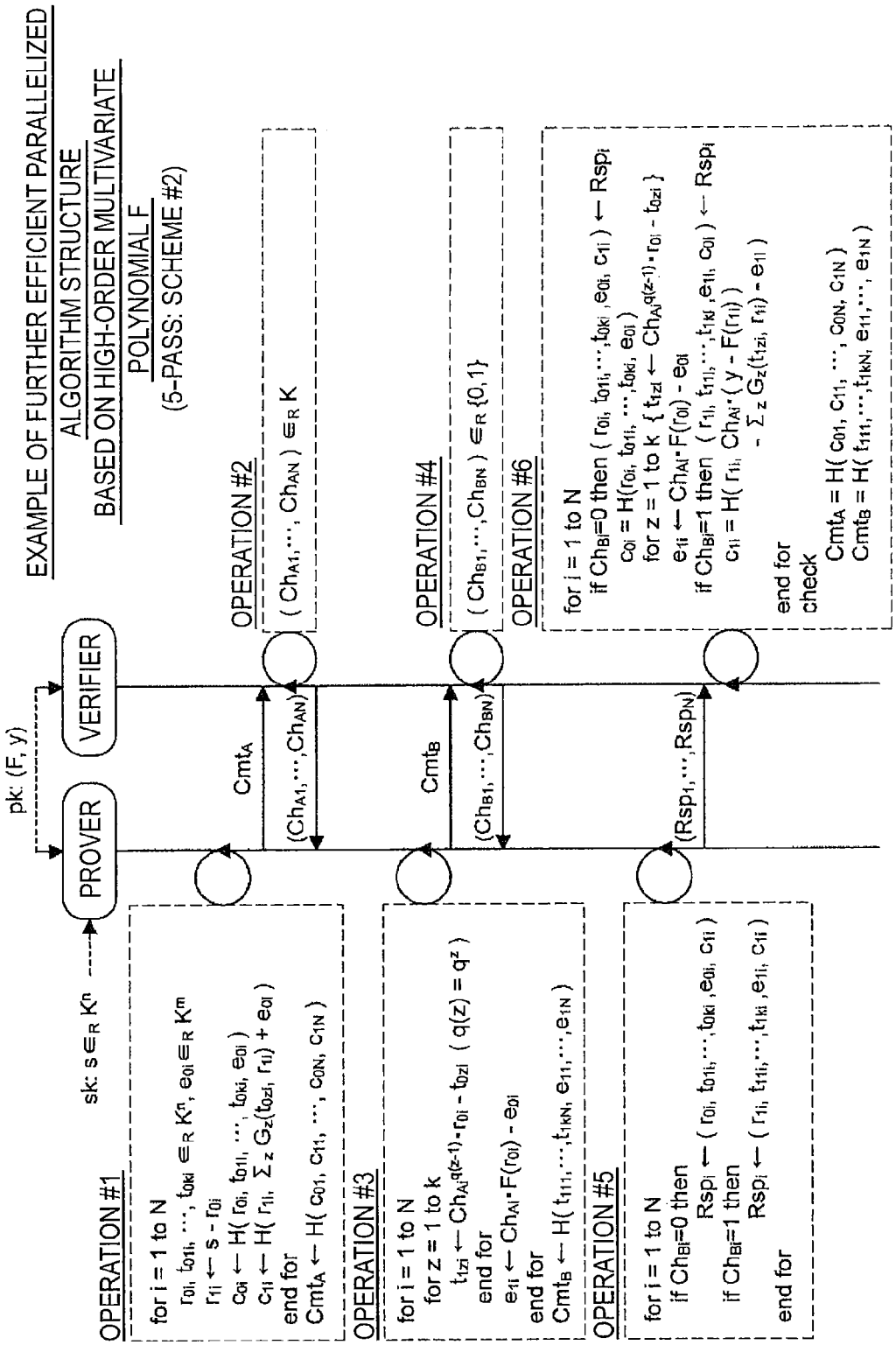
FIG. 17 is an explanatory diagram for describing an example of a further efficient parallelized algorithm of the public-key authentication scheme (scheme #2) using the 5-pass high-order multivariate polynomial.

In the example of the structure of FIG. 17, the prover algorithm P calculates the hash value $Cmt \leftarrow H(c_{01}, c_{11}, \ldots, c_{0N}, c_{1N})$ in operation #1. The prover algorithm P calculates the hash value $Cmt_B \leftarrow H(t_{111}, \ldots, t_{1kN}, e_{11}, e_{1N})$ in operation #3. Upon generating a response $Rsp_i$ in operation #5, the prover algorithm P generates a response $Rsp_i = (r_{0i}, t_{001i}, \ldots, t_{0ki}, e_{0i}, c_{1i})$ in the case where $Ch_{Bi}=0$ and generates a response $Rsp_i = (r_{1i}, t_{11i}, \ldots, e_{1ki}, c_{0i})$ in the case where $Ch_{Bi}=1$.

On the other hand, the verifier algorithm V generates ($c_{01}$, $c_{11}$, ..., $c_{0N}$, $c_{1N}$) from ($Ch_{Ai}$, $Ch_{Bi}$, $Rsp_i$) (where i=1 to N) and ($t_{111}$, ..., $t_{1kN}$, $e_{11}$, $e_{1N}$) in operation #6 and verifies whether or not the equality of $Cmt_A = (c_{01}, c_{11}, \ldots, c_{0N}, c_{1N})$ and $Cmt_B = (t_{111}, \ldots, t_{1kN}, e_{11}, \ldots, e_{1N})$ holds. Performing such modification enables a further improvement in the communication efficiency.

The further efficient parallelized algorithm based on the high-order extended algorithms has been described above.

By applying the high-order extended algorithm described above, an efficient public-key authentication scheme having higher security can be realized. For example, when (q, n, m, N)=(24, 45, 30, 88) in an extended algorithm related to the 5-pass scheme, the size of a public key is 120 bits, the size of a secret key is 180 bits, and the size of communication data is 27512 bits.

For example, when the condition of (q, n, m, N)=(22, 42, 40, 118) is satisfied in the case of a high-order extended algorithm related to the 5-pass scheme, the security is ensured to the same degree. Under this condition, the size of a public key is 80 bits, the size of a secret key is 84 bits, and the size of communication data is 27814 bits. That is, by applying a high-order extended algorithm, the size of communication data can be maintained to the same degree and the size of a public key and the size of a secret key can be considerably reduced.

The condition may be modified to (q, n, m, N)=(23, 28, 27, 97). In this case, the size of a public key is 81 bits, the size of a secret key is 84 bits, and the size of communication data is 27145 bits. Further, the condition may be modified to (q, n, m, N)=(24, 21, 20, 88). In this case, the size of a public key is 80 bits, the size of a secret key is 84 bits, and the size of communication data is 28392 bits. Under any condition, considerable efficiency is achieved.

<4: Modification of Digital Signature Scheme>

Here, a method of modifying the foregoing public-key authentication scheme into a digital signature scheme will be introduced.

When a prover in a model of a public-key authentication scheme matches a signer in a digital signature scheme, an approximation to the model of the digital signature scheme can easily be understood in that only a prover can convince a verifier. Based on this idea, a method of modifying the above-described public-key authentication scheme into a digital signature scheme will be descried.

[4-1: Modification of 3-Pass Public-Key Authentication Scheme into Digital Signature Scheme]

First, modification of a public-key authentication scheme of 3-pass into a digital signature scheme will be described.

(4-1-1: Digital Signature Algorithm (Structure Example 1) (FIG. 18))

Figure 18:
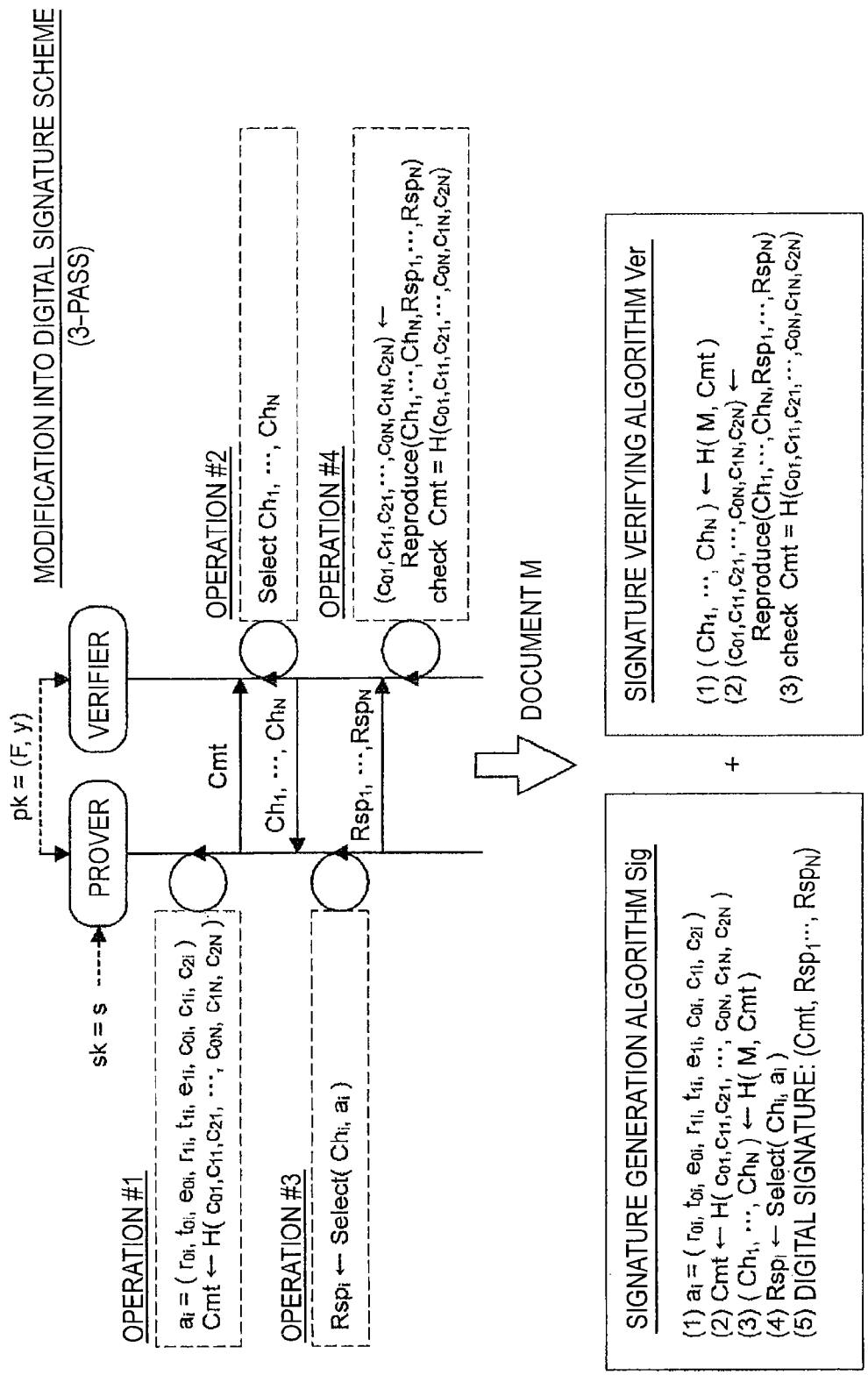
FIG. 18 is an explanatory diagram for describing a method of modifying an efficient algorithm related to the 3-pass public-key authentication scheme into an algorithm of a digital signature scheme.

As illustrated in FIG. 18, an efficient algorithm (for example, see FIGS. 6 and 8) related to the 3-pass scheme is expressed with interactivity of three times and four operations, i.e., operation #1 to operation #4.

Operation #1 includes a process (1) of generating $a_i=(r_{0i}, t_{0i}, e_{0i}, r_{1i}, t_{1i}, e_{1i}, c_{0i}, c_{1i}, c_{2i})$ and a process (2) of calculating Cmt←$H(c_{01}, c_{11}, c_{21}, \ldots, c_{0N}, c_{1N}, c_{2N})$. Cmt generated in operation #1 by the prover algorithm P is sent to the verifier algorithm V.

Operation #2 includes a process of selecting $Ch_1, \ldots, Ch_N$. $Ch_1, \ldots, Ch_N$ selected in operation #2 by the verifier algorithm V are sent to the prover algorithm P.

Operation #3 includes a process of generating $Rsp_1, \ldots, Rsp_N$ using $Ch_1, \ldots, Ch_N$ and $a_1 \ldots, a_N$. This process is expressed as $Rsp_i$←Select$(Ch_i, a_i)$. $Rsp_1, \ldots, Rsp_N$ generated in operation #3 by the prover algorithm P are sent to the verifier algorithm V.

Operation #4 includes a process (1) of reproducing $c_{01}, c_{11}, c_{21}, \ldots, c_{0N}, c_{1N}, c_{2N}$ using $Ch_1, \ldots, Ch_N$ and $Rsp_1, \ldots, Rsp_N$ and a process (2) of verifying Cmt=$H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

The algorithm of the public-key authentication scheme expressed with the foregoing operation #1 to operation #4 is modified into a signature generation algorithm Sig and a signature verifying algorithm Ver illustrated in FIG. 18.

(Signature Generation Algorithm Sig)

First, the structure of the signature generation algorithm Sig will be described. The signature generation algorithm Sig includes the following processes (1) to (5).

Process (1): The signature generation algorithm Sig generates $a_i=(r_{0i}, t_{0i}, e_{0i}, r_{1i}, t_{1i}, e_{1i}, c_{0i}, c_{1i}, c_{2i})$.

Process (2): The signature generation algorithm Sig calculates Cmt←$H(c_{01}, c_{11}, c_{21}, \ldots, c_{0N}, c_{1N}, c_{2N})$.

Process (3): The signature generation algorithm Sig calculates $(Ch_1, \ldots, Ch_N)$←$H(M, Cmt)$. Here, M is a document to which a signature is attached.

Process (4): The signature generation algorithm Sig calculates $Rsp_i$←Select$(Ch_i, a_i)$.

Process (5): The signature generation algorithm Sig sets (Cmt, $Rsp_1, \ldots, Rsp_N$) as a signature.

(Signature Verifying Algorithm Ver)

Next, the structure of the signature verifying algorithm Ver will be described. The signature verifying algorithm Ver includes the following processes (1) to (3).

Process (1): The signature verifying algorithm Ver calculates $(Ch_1, \ldots, Ch_N)$←$H(M, Cmt)$.

Process (2): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (3): The signature verifying algorithm Ver verifies Cmt=$H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

As described above, by matching the prover in the model of the public-key authentication scheme with the signer in the digital signature scheme, the algorithm of the public-key authentication scheme can be modified into the algorithm of the digital signature scheme.

(4-1-2: Digital Signature Algorithm (Structure Example 2: High Efficiency) (FIG. 19))

However, when the structure of the signature generation algorithm Sig illustrated in FIG. 18 is focused on, it can be realized that calculation of a hash value has been performed in the processes (2) and (3). Further, when the structure of the signature verifying algorithm Ver is focused on, it can be realized that the same calculation of a hash value as the process (3) of the signature generation algorithm Sig has been performed in the process (1). When the configurations of the signature generation algorithm Sig and the signature verifying algorithm Ver are improved focusing on these processes, as illustrated in FIG. 19, calculation efficiency can be further improved.

(Signature Generation Algorithm Sig)

First, the structure of the improved signature generation algorithm Sig will be described with reference to FIG. 19. The signature generation algorithm Sig includes the following processes (1) to (4).

Process (1): The signature generation algorithm Sig generates $a_i=(r_{0i}, t_{0i}, e_{0i}, r_{1i}, t_{1i}, e_{1i}, c_{0i}, c_{1i}, c_{2i})$ Process (2): The signature generation algorithm Sig calculates $(Ch_1, \ldots, Ch_N)$←$H(M, c_{01}, c_{11}, c_{21}, \ldots, c_{0N}, c_{1N}, c_{2N})$. Here, M is a document to which a signature is attached.

Process (3): The signature generation algorithm Sig calculates $Rsp_i$←Select$(Ch_i, a_i)$.

Process (4): The signature generation algorithm Sig sets $(Ch_1, \ldots, Ch_N, Rsp_1, \ldots, Rsp_N)$ as a signature.

(Signature Verifying Algorithm Ver)

Next, the structure of the improved signature verifying algorithm Ver will be described. The signature verifying algorithm Ver includes the following processes (1) and (2).

Process (1): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (2): The signature verifying algorithm Ver verifies $(Ch_1, \ldots, Ch_N)$=$H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

By improving the structures of the signature generation algorithm Sig and the signature verifying algorithm Ve, as described above, the calculation of a hash value in each algorithm is reduced by one time and calculation efficiency is thus improved.

[4-2: Modification of 5-Pass Public-Key Authentication Scheme into Digital Signature Scheme]

Next, a modification of the public-key authentication scheme related to the 5-pass into a digital signature scheme will be described.

(4-2-1: Digital Signature Algorithm (Structure Example 1) (FIG. 20))

As illustrated in FIG. 20, an efficient algorithm (for example, see FIGS. 11, 13, and 16) related to the 5-pass scheme is expressed with interactivity of five times and six operations, i.e., operation #1 to operation #6.

Operation #1 includes a process (1) of generating $a_i=(r_{0i}, t_{0i}, e_{0i}, r_{1i}, t_{1i}, e_{1i}, c_{0i}, c_{1i})$ for i=1 to N and a process (2) of calculating Cmt←$H(c_{01}, c_{11}, \ldots, c_{0N}, c_{1N})$. Cmt generated in operation #1 by the prover algorithm P is sent to the verifier algorithm V.

Operation #2 includes a process of selecting $Ch_{A1}, \ldots, Ch_{AN}$. $Ch_{A1}, \ldots, Ch_{AN}$ selected in operation #2 by the verifier algorithm V are sent to the prover algorithm P.

Operation #3 includes a process of generating $b_i=(t_{1i}, e_{1i})$ for i=1 to N. Here, $b_1, \ldots, b_N$ generated in operation #3 by the prover algorithm P are sent to the verifier algorithm V.

Operation #4 includes a process of selecting $ChB1, \ldots, Ch_{BN}$. $ChB1, \ldots, Ch_{BN}$ selected in operation #4 by the verifier algorithm V are sent to the prover algorithm P.

Operation #5 includes a process of generating $Rsp_1, \ldots, Rsp_N$ using $Ch_{B1}, \ldots, Ch_{BN}, a_1, \ldots, a_N, b_1, \ldots, b_N$. This process is expressed as $Rsp_i \leftarrow \text{Select}(Ch_{Bi}, a_i, b_i)$. $Rsp_1, \ldots, Rsp_N$ generated in operation #5 by the prover algorithm P are sent to the verifier algorithm V.

Operation #6 includes a process (1) of reproducing $c_{01}, c_{11}, \ldots, c_{0N}, c_{1N}$ using $Ch_{A1}, \ldots, Ch_{AN}, Ch_{B1}, \ldots, Ch_{BN}, Rsp_1, \ldots, Rsp_N$ and a process (2) of verifying $Cmt=H(c_{01}, c_{11}, \ldots, c_{0N}, c_{1N})$ using the reproduced $c_{01}, c_{11}, \ldots, c_{0N}, c_{1N}$.

The algorithm of the public-key authentication scheme expressed with the foregoing operation #1 to operation #6 is modified into a signature generation algorithm Sig and a signature verifying algorithm Ver illustrated in FIG. 20.

(Signature Generation Algorithm Sig)

First, the structure of the signature generation algorithm Sig will be described. The signature generation algorithm Sig includes the following processes (1) to (7).

Process (1): The signature generation algorithm Sig generates $a_i=(r_{0i}, t_{0i}, e_{0i}, r_{1i}, t_{1i}, e_{1i}, c_{0i}, c_{1i})$.

Process (2): The signature generation algorithm Sig calculates $Cmt \leftarrow H(c_{01}, c_{11}, \ldots, c_{0N}, c_{1N})$ Process (3): The signature generation algorithm Sig calculates $(Ch_{A1}, \ldots, Ch_{AN}) \leftarrow H(M, Cmt)$. Here, M is a document to which a signature is attached.

Process (4): The signature generation algorithm Sig generates $b_i=(t_{1i}, e_{1i})$ for i=1 to N.

Process (5): The signature generation algorithm Sig calculates $(Ch_{B1}, \ldots, Ch_{BN}) \leftarrow H(M, Cmt, Ch_{A1}, \ldots, Ch_{AN}, b_1, \ldots, b_N)$. Additionally, modification into $(Ch_{B1}, \ldots, Ch_{BN}) \leftarrow H(Ch_{A1}, \ldots, Ch_{AN}, b_1, \ldots, b_N)$. may be performed.

Process (6): The signature generation algorithm Sig calculates $Rsp_i \leftarrow \text{Select}(Ch_{Bi}, a_i, b_i)$.

Process (7): The signature generation algorithm Sig sets $(Cmt, b_1, \ldots, b_N, Rsp_1, \ldots, Rsp_N)$ as a digital signature.

(Signature Verifying Algorithm Ver)

Next, the structure of the signature verifying algorithm Ver will be described. The signature verifying algorithm Ver includes the following processes (1) to (4).

Process (1): The signature verifying algorithm Ver calculates $(Ch_{A1}, \ldots, Ch_{AN})=H(M, Cmt)$.

Process (2): The signature verifying algorithm Ver calculates $(Ch_{B1}, \ldots, Ch_{BN})=H(M, Cmt, Ch_{A1}, \ldots, Ch_{AN}, b_1, \ldots, b_N)$. When modification into $(Ch_{B1}, \ldots, Ch_{BN})=H(Ch_{A1}, \ldots, Ch_{AN}, b_1, \ldots, b_N)$ is performed in the process (5) performed by the signature verifying algorithm Ver, the signature verifying algorithm Ver calculates $(Ch_{B1}, \ldots, Ch_{BN})=H(Ch_{A1}, \ldots, Ch_{AN}, b_1, \ldots, b_N)$.

Process (3): The signature verifying algorithm Ver generates $c_{01}, c_{11}, \ldots, c_{0N}, c_{1N}$ using $Ch_{A1}, \ldots, Ch_{AN}, Ch_{B1}, \ldots, Ch_{BN}, Rsp_1, \ldots, Rsp_N$.

Process (4): The signature verifying algorithm Ver verifies $Cmt=H(c_{01}, c_{11}, \ldots, c_{0N}, c_{1N})$ using the reproduced $c_{01}, c_{11}, \ldots, c_{0N}, c_{1N}$.

As described above, by matching the prover in the model of the public-key authentication scheme with the signer in the digital signature scheme, the algorithm of the public-key authentication scheme can be modified into the algorithm of the digital signature scheme.

(4-2-2: Digital Signature Algorithm (Structure Example 2: High Efficiency) (FIG. 21))

As illustrated in FIG. 21, a further efficient algorithm (for example, see FIG. 17) related to the 5-pass scheme is expressed with interactivity of five times and six operation #1 to operation #6.

Operation #1 includes a process (1) of generating $a_i=(r_{0i}, t_{0i}, e_{0i}, r_{1i}, t_{1i}, e_{1i}, c_{0i}, c_{1i})$ for i=1 to N and a process (2) of calculating $Cmt_A \leftarrow H(c_{01}, c_{11}, \ldots, c_{0N}, c_{1N})$. $Cmt_A$ generated in operation #1 by the prover algorithm P is sent to the verifier algorithm V.

Operation #2 includes a process of selecting $Ch_{A1}, \ldots, Ch_{AN}$. $Ch_{A1}, \ldots, Ch_{AN}$ selected in operation #2 by the verifier algorithm V are sent to the prover algorithm P.

Operation #3 includes a process (1) of generating $bi=(t_{1i}, e_{1i})$ and a process (2) of calculating $Cmt_B \leftarrow H(b_1, \ldots, b_N)$ for i=1 to N. $Cmt_B$ generated in operation #3 by the prover algorithm P are sent to the verifier algorithm V.

Operation #4 includes a process of selecting $Ch_{B1}, \ldots, Ch_{BN}$. $Ch_{B1}, \ldots, Ch_{BN}$ selected in operation #4 by the verifier algorithm V are sent to the prover algorithm P.

Operation #5 includes a process of generating $Rsp_1, \ldots, Rsp_N$ using $Ch_{B1}, \ldots, Ch_{BN}, a_1 \ldots, a_N, b_1 \ldots b_N$. This process is expressed as $Rsp_i \leftarrow \text{Select}(Ch_{Bi}, a_i, b_i)$. $Rsp_1, \ldots, Rsp_N$ generated in operation #5 by the prover algorithm P are sent to the verifier algorithm V.

Operation #6 includes a process (1) of reproducing $c_{01}, c_{11}, \ldots, c_{0N}, c_{1N}, b_1 \ldots, b_N$ using $Ch_{A1}, \ldots, Ch_{AN}, Ch_{B1}, Ch_{BN}, Rsp_1, \ldots, Rsp_N$, a process (2) of verifying $Cmt_A=H(c_{01}, c_{11}, \ldots, c_{0N}, c_{1N})$ using the reproduced $c_{01}, c_{11}, \ldots, c_{0N}, c_{1N}$, and a process (3) of verifying $Cmt_B=H(b_1 \ldots b_N)$ using the reproduced $b_1 \ldots b_N$.

The algorithm of the public-key authentication scheme expressed with the foregoing operation #1 to operation #6 is modified into a signature generation algorithm Sig and a signature verifying algorithm Ver illustrated in FIG. 21.

(Signature Generation Algorithm Sig)

First, the structure of the signature generation algorithm Sig will be described. The signature generation algorithm Sig includes the following processes (1) to (8).

Process (1): The signature generation algorithm Sig generates $a_i=(r_{0i}, t_{0i}, e_{0i}, r_{1i}, t_{1i}, e_{1i}, c_{0i}, c_{1i})$.

Process (2): The signature generation algorithm Sig calculates $Cmt_A \leftarrow H(c_{01}, c_{11}, \ldots, c_{0N}, c_{1N})$ Process (3): The signature generation algorithm Sig calculates $(Ch_{A1}, \ldots, Ch_{AN}) \leftarrow H(M, Cmt_A)$. Here, M is a document to which a signature is attached.

Process (4): The signature generation algorithm Sig generates $b_i=(t_{1i}, e_{1i})$ for i=1 to N.

Process (5): The signature generation algorithm Sig calculates $Cmt_B \leftarrow H(b_1 \ldots b_N)$.

Process (6): The signature generation algorithm Sig calculates $(Ch_{B1}, \ldots, Ch_{BN}) \leftarrow H(M, Cmt, Ch_{A1}, \ldots, Ch_{AN}, Cmt_B)$. Additionally, modification into $(Ch_{B1}, \ldots, Ch_{BN}) \leftarrow H(Ch_{A1}, \ldots, Ch_{AN}, Cmt_B)$. may be performed.

Process (7): The signature generation algorithm Sig calculates $Rsp_i \leftarrow \text{Select}(Ch_{Bi}, a_i, b_i)$.

Process (8): The signature generation algorithm Sig sets $(Cmt_A, Cmt_B, Rsp_1, \ldots, Rsp_N)$ as a digital signature.

(Signature Verifying Algorithm Ver)

Next, the structure of the signature verifying algorithm Ver will be described. The signature verifying algorithm Ver includes the following processes (1) to (5).

Process (1): The signature verifying algorithm Ver calculates $(Ch_{A1}, \ldots, Ch_{AN})=H(M, Cmt_A)$.

Process (2): The signature verifying algorithm Ver calculates $(Ch_{B1}, \ldots, Ch_{BN})=H(M, Cmt_A, Ch_{A1}, \ldots, Ch_{AN},$ $b_1, \ldots, b_N, Cmt_B$). When modification into $(Ch_{B1}, \ldots, Ch_{BN})=H(Ch_{A1}, \ldots, Ch_{AN}, Cmt_B)$ is performed in the process (6) performed by the signature verifying algorithm Ver, the signature verifying algorithm Ver calculates $(Ch_{B1}, \ldots, Ch_{BN})=H(Ch_{A1}, \ldots, Ch_{AN}, Cmt_B)$.

Process (3): The signature verifying algorithm Ver generates $c_{01}, c_{11}, \ldots, c_{0N}, c_{1N}, b_1, \ldots, b_N$ using $Ch_{A1}, \ldots, Ch_{AN}, Ch_{B1}, \ldots, Ch_{BN}, Rsp_1, \ldots, Rsp_N$ Process (4): The signature verifying algorithm Ver verifies $Cmt_A = H(c_{01}, c_{11}, \ldots, c_{0N}, c_{1N})$ using the reproduced $c_{01}, c_{11}, \ldots, c_{0N}, c_{1N}$.

Process (5): The signature verifying algorithm Ver verifies $Cmt_B = H(b_1, \ldots, b_N)$ using the reproduced $b_1, \ldots, b_N$.

As described above, by matching the prover in the model of the public-key authentication scheme with the signer in the digital signature scheme, the algorithm of the public-key authentication scheme can be modified into the algorithm of the digital signature scheme.

<5: Hybrid Type Algorithm>

The necessity to perform the interactive protocol a plurality of times so that the probability of a successful forgery becomes negligibly small has already been described. Further, the serial method and the parallel method have been introduced as the method of performing the interactive protocol a plurality of times. In particular, the parallel method has been described giving an example of the specific parallelized algorithm. Here, a hybrid type algorithm in which a serial method and a parallel method are combined will be introduced.

[5-1: Hybrid Type Algorithm Related to of 3-Pass Public-Key Authentication Scheme]

First, a hybrid type algorithm related to the 3-pass public-key authentication scheme will be described.

(5-1-1: Parallel Serial Algorithm (FIG. 22))

One example of a hybrid type structure (hereinafter, referred to as a parallel serial structure) will be described with reference to FIG. 22. FIG. 22 is a diagram illustrating an algorithm having a basic structure and an algorithm having a parallel serial structure.

In the case of the basic structure, a message Cmt is sent from a prover to a verifier at the first pass. At the second pass, a challenge Ch is sent from the verifier to the prover. At the third pass, a response Rsp is sent from the prover to the verifier.

On the other hand, in the case of the parallel serial structure, messages $(Cmt_1, \ldots, Cmt_N)$ of N times are sent from the prover to the verifier at the first pass. At the second pass, a challenge $Ch_1$ of one time is sent from the verifier to the prover. At the third pass, a response $Rsp_1$ of one time is sent from the prover to the verifier. Thereafter, challenges $Ch_2, \ldots, Ch_N$ and responses $Rsp_2, \ldots, Rsp_N$ are exchanged sequentially between the prover and the verifier.

In the case of the parallel serial structure based on the algorithm of the public-key authentication scheme described above, the security against a passive attach is ensured. Further, the number of interactivities is merely 2N+1 times. Further, when messages of N times sent at the first pass are collected with one hash value, the communication efficiency can be improved.

(5-1-2: Serial Parallel Algorithm (FIG. 23))

Another example of the hybrid type structure (hereinafter, referred to as a serial parallel structure) will be described with reference to FIG. 23. FIG. 23 is a diagram illustrating an algorithm having a basic structure and an algorithm having a serial parallel structure.

In the case of the basic structure, a message Cmt is sent from a prover to a verifier at the first pass. At the second pass, a challenge Ch is sent from the verifier to the prover. At the third pass, a response Rsp is sent from the prover to the verifier.

In the case of the serial parallel structure, a message $Cmt_1$ of one time is sent from the prover to the verifier at the first pass. At the second pass, a challenge $Ch_1$ of one time is sent from the verifier to the prover. Thereafter, messages $Cmt_2, \ldots, Cmt_N$ and challenges $Ch_2, \ldots, Ch_N$ are exchanged sequentially between the prover and the verifier. After the challenge $Ch_N$ is sent from the verifier to the prover, responses $Rsp2, \ldots, Rsp_N$ of the N times are sent from the prover to the verifier.

In the case of the serial parallel structure based on the algorithm of the public-key authentication scheme described above, the security against an active attach is ensured. Further, the number of interactivities is merely 2N+1 times.

[5-2: Hybrid Type Algorithm Related to of 5-Pass Public-Key Authentication Scheme]

Next, a hybrid type algorithm related to the 5-pass public-key authentication scheme will be described.

(5-2-1: Parallel Serial Algorithm (Structure Example #1) (FIG. 24))

First, one example of a hybrid type structure (hereinafter, referred to as parallel serial structure #1) will be described with reference to FIG. 24. FIG. 24 is a diagram illustrating an algorithm having a basic structure and an algorithm having parallel serial structure #1.

In the case of the basic structure, a message $Cmt_A$ is sent from a prover to a verifier at the first pass. At the second pass, a number $Ch_A$ is sent from the verifier to the prover. At the third pass, a vector $Cmt_B$ is sent from the prover to the verifier. At the fourth pass, a challenge $Ch_B$ is sent from the verifier to the prover. At the fifth pass, a response Rsp is sent from the prover to the verifier.

In the case of parallel serial structure #1, messages $(Cmt_{A1}, \ldots, Cmt_{AN})$ of the N times are sent from the prover to the verifier at the first pass. At the second pass, a number $Ch_{A1}$ of one time is sent from the verifier to the prover. At the third pass, a vector $Cmt_{B1}$ of one time is sent from the prover to the verifier. At the fourth pass, a challenge $Ch_{B1}$ of one time is sent from the verifier to the prover. At the fifth pass, a response $Rsp_1$ of one time is sent from the prover to the verifier. Thereafter, $Ch_{A2}, \ldots, Ch_{AN}, Cmt_{B2}, \ldots, Cmt_{BN}, Ch_{B2}, \ldots, Ch_{BN}$, and responses $Rsp_2, \ldots, Rsp_N$ are exchanged sequentially between the prover and the verifier.

In the case of parallel serial structure #1, the security against a passive attach is ensured. Further, the number of interactivities is merely 4N+1 times. Further, when the messages of N times sent at the first pass are collected with one hash value, the communication efficiency can be improved.

(5-2-2: Parallel Serial Algorithm (Structure Example #2) (FIG. 25))

Figure 25:
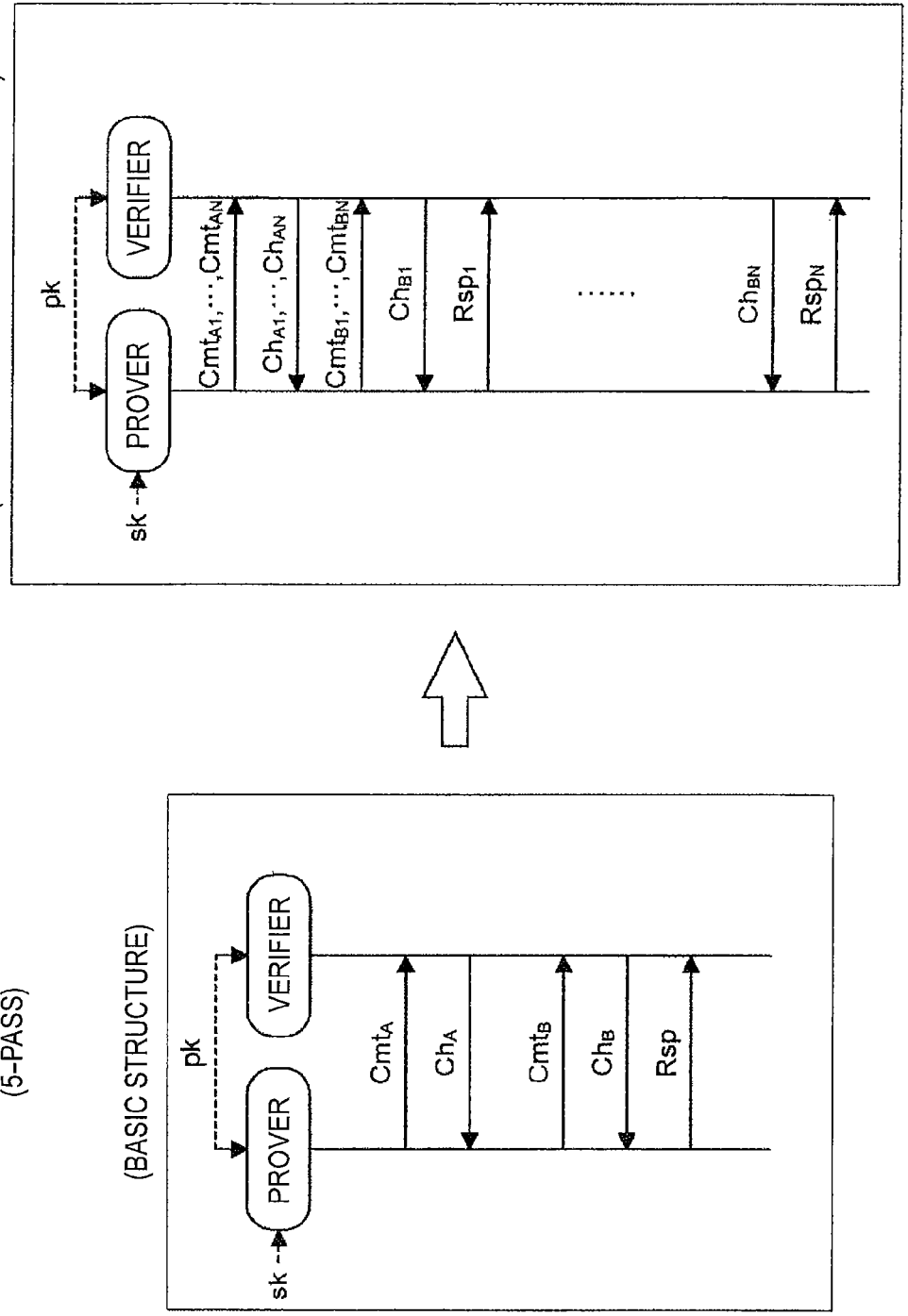
FIG. 25 is an explanatory diagram for describing a parallel serial structure (parallel serial structure #2) of the efficient algorithm related to the 5-pass public-key authentication scheme.

Next, another example of the hybrid type structure (hereinafter, referred to as parallel serial structure #2) will be described with reference to FIG. 25. FIG. 25 is a diagram illustrating an algorithm having a basic structure and an algorithm having parallel serial structure #2.

In the case of parallel serial structure #2, messages $(Cmt_{A1}, \ldots, Cmt_{AN})$ of the N times are sent from the prover to the verifier at the first pass. At the second pass, numbers $(Ch_{A1}, \ldots, Ch_{AN})$ of the N times are sent from the verifier to the prover. At the third pass, vectors $(Cmt_{B1}, \ldots, Cmt_{BN})$ of the N times are sent from the prover to the verifier. At the fourth pass, a challenge $Ch_{B1}$ of one time is sent from the verifier to the prover. At the fifth pass, a response $Rsp_1$ of one time is sent from the prover to the verifier. Thereafter, $Ch_{B2}, \ldots, Ch_{BN}$, responses $Rsp_2, \ldots, Rsp_N$ are exchanged sequentially between the prover and the verifier.

In the case of parallel serial structure #2, the security against a passive attach is ensured. Further, the number of interactivities is merely 2N+3 times. Further, when the messages of N times sent at the first pass, the vectors of the N times sent at the third pass, and the like are collected with one hash value, the communication efficiency can be improved.

(5-2-3: Serial Parallel Algorithm (Structure Example #1) (FIG. 26))

Next, another example of the hybrid type structure (hereinafter, referred to as serial parallel structure #1) will be described with reference to FIG. 26. FIG. 26 is a diagram illustrating an algorithm having a basic structure and an algorithm having serial parallel structure #1.

In the case of serial parallel structure #1, a message $Cmt_{A1}$ of one time is sent from the prover to the verifier at the first pass. At the second pass, a number $Ch_{A1}$ of one time is sent from the verifier to the prover. At the third pass, a vector $Cmt_{B1}$ of one time is sent from the prover to the verifier. At the fourth pass, a challenge $Ch_{B1}$ of one time is sent from the verifier to the prover. Thereafter, $Cmt_{A2}, \ldots, Cmt_{AN}$, $Ch_{A2}, \ldots, Ch_{AN}, Cmt_{B2}, \ldots, Cmt_{BN}, Ch_{B2}, \ldots, Ch_{BN}$ are exchanged sequentially between the prover and the verifier. Finally, responses $(Rsp_1, Rsp_N)$ of the N times are sent from the prover to the verifier.

In the case of serial parallel structure #1, the security against an active attach is ensured. Further, the number of interactivities is merely 4N+1 times.

(5-2-4: Serial Parallel Algorithm (Structure Example #2) (FIG. 27))

Next, another example of the hybrid type structure (hereinafter, referred to as serial parallel structure #2) will be described with reference to FIG. 27. FIG. 27 is a diagram illustrating an algorithm having a basic structure and an algorithm having serial parallel structure #2.

In the case of serial parallel structure #2, a message $Cmt_{A1}$ of one time is sent from the prover to the verifier at the first pass. At the second pass, a number $Ch_{A1}$ of one time is sent from the verifier to the prover. Thereafter, $Cmt_{A2}, \ldots, Cmt_{AN}$, $Ch_{A2}, \ldots, Ch_{AN}$ are exchanged sequentially between the prover and the verifier. After the exchange of $Ch_{AN}$ is completed, vectors $(Cmt_{B1}, \ldots, Cmt_{BN})$ of the N times are sent from the prover to the verifier. Subsequently, challenges $(Ch_{B1}, \ldots, Ch_{B1})$ of the N times are sent from the verifier to the prover. Finally, responses $(Rsp_1, \ldots, Rsp_N)$ of the N times are sent from the prover to the verifier.

In the case of serial parallel structure #2, the security against an active attach is ensured. Further, the number of interactivities is merely 2N+3 times.

The hybrid type algorithms related to the 5-pass public-key authentication scheme have been described above.

<6: Supplement>

Here, the description of the foregoing public-key authentication scheme will be supplemented.

[6-1: Method of Setting System Parameter]

Here, the description of a method of setting a parameter will be supplemented.

(Coefficients of Multivariate Polynomials)

How to set coefficients of the multivariate polynomials and a random number seed (hereinafter, referred to as coefficients and the like of the multivariate polynomials) used to generate the coefficients have not been described above. The coefficients and the like of the multivariate polynomials may be parameters common to a system or may be parameters different for each user.

However, when the coefficients and the like of the multivariate polynomials are set to parameters common to a system, it may be necessary to update the setting of the entire system if weakness for the multivariate polynomials is found. Additionally, average robustness (difficulty of solving) is analyzed for the multivariate polynomials having randomly selected coefficients, but it is difficult to ensure sufficient robustness for the multivariate polynomials having certain specific coefficients.

Accordingly, the inventors of the present technology have devised a structure in which coefficients of multivariate polynomials are generated by using a character string or the like selected by each user in a seed of a pseudo-random number generator and generating the coefficients of the multivariate polynomials. For example, conceivable methods include a method of using an e-mail address of a user in a seed and a method of using a character string in which an e-mail address, an update date, and the like are combined in a seed. When such methods are used, an influence is limited only to a user using the multivariate polynomials having the coefficients even if weakness is found in the multivariate polynomials having the coefficients generated from a given character string. Additionally, since the multivariate polynomials are changed merely by changing a character string, the weakness can easily be resolved.

The method of setting system parameters has been described above. In the foregoing description, a character string has been given as an example, but a different number string or a different sign string may be used for each user.

(Number m of Polynomial and Number n of Variable)

The interactive protocol described above ensures the security against a passive attack. However, when the interactive protocol is performed repeatedly in parallel, a condition to be described below is necessary in order to prove that the security against an active attack is reliably ensured.

The foregoing interactive protocol is an algorithm for verifying to a verifier that "a prover knows s satisfying y=F(s) for y" by using a pair of keys (a public key y and a secret key s). For this reason, when interactivity accepted in verification is performed, a probability of information, which indicates that "the prover uses s at the time of interactivity," known to the verifier is undeniable. Additionally, collision resistance is not ensured for the multivariate polynomial F. For this reason, when the foregoing interactive protocol is performed repeatedly in parallel, it is difficult to prove that the security against an active attack is reliably ensured without any condition.

Accordingly, the inventors of the present technology have examined a method of causing information indicating that "a prover uses s at the time of interactivity" not to be known to a verifier even when interactivity accepted in verification is performed. Additionally, the inventors of the present technology have devised a method of enabling the security against an active attack to be ensured even when the foregoing interactive protocol is performed repeatedly in parallel. This method is a method of setting the number m of multivariate polynomials $f_1, \ldots, f_m$ used as public keys to a value sufficiently smaller than the number n of variables. For example, m and n are set such that $2^{m-n} \ll 1$ (for example, when n=160 and m=80, $2^{-80} \ll 1$).

In the schemes that base their safety on the difficulty of solving multi-order multivariate simultaneous equations, it is difficult to generate another secret key $s_2$ corresponding to a public key pk even when a secret key $s_1$ and the public key pk corresponding thereto are given. For this reason, when it is ensured that two or more secret keys s exist for the public key pk, the information indicating that "a prover uses s at the time of interactivity" can be caused not to be known to a verifier even when interactivity accepted in verification is performed. That is, when this ensuring is established, the security against an active attack can be ensured even when the interactive protocol is performed repeatedly in parallel.

Figure 29:
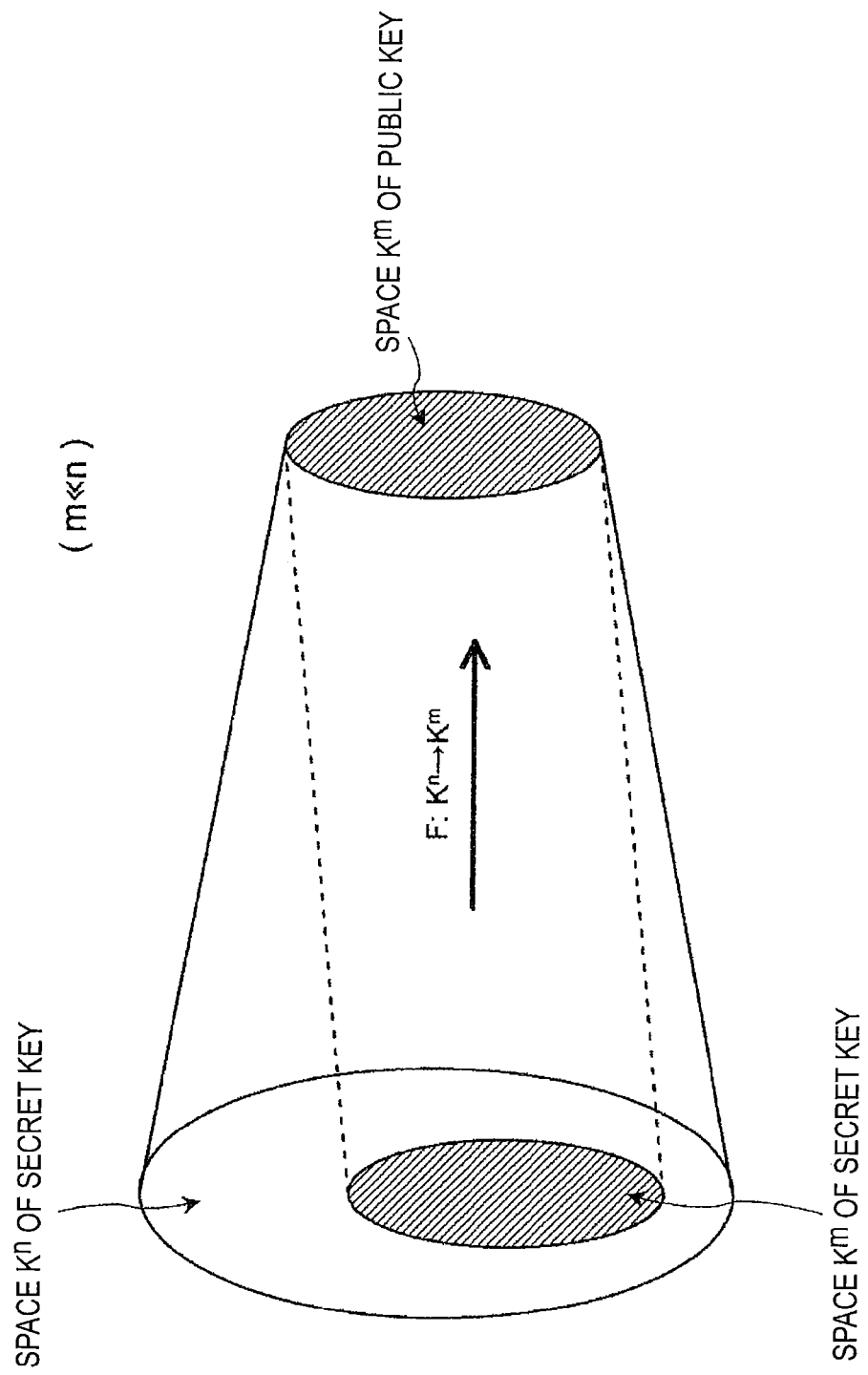
FIG. 29 is an explanatory diagram for describing a very suitable method of setting a parameter used in the public-key authentication scheme according to the first and second embodiments of the present technology and the advantageous effects.

When a function $F: K^n \to K^m$ including the number m of multi-order polynomials with n variables (where n>m) is considered with reference to FIG. 29, the number of elements of the domain of definition having no second pre-image is $|K|^m-1$ at the most. For this reason, when $|K|^{m-n}$ is set to be sufficiently small, a selection probability of elements of the domain of definition having no second pre-image can be made negligibly small. That is, when the number m of multi-order polynomials $f_1, \ldots, f_m$ with n variables is set to a value sufficiently smaller than the number n of variables, it can be ensured that two or more secret keys s exist for the public key pk. Consequently, even when interactivity accepted in verification is performed, the information indicating that "a prover uses s at the time of interactivity" can be caused not to be known to a verifier. Thus, the security against an active attack is ensured even when the interactive protocol is performed repeatedly in parallel.

As described above, by imposing the setting condition in which the number m of multi-order polynomials $f_1, \ldots, f_m$ with n variables is set to a value sufficiently smaller than the number n of variables (where n>m and preferably $2^{m-n} \ll 1$), the security can be ensured when the interactive protocol is performed repeatedly in parallel.

[6-2: Method of Responding to Irregular Challenge]

Here, a method of responding to an irregular challenge will be examined.

(6-2-1: Responding Method By Prover)

A probability of a verifier giving a false challenge in the interactive protocol will be considered. For example, in the case of the 3-pass scheme, a prover sends messages $(c_0, c_1, c_2)$ to the verifier and the verifier sends a challenge Ch=0 to the prover. Thereafter, a response Rsp corresponding to the challenge Ch=0 is sent from the prover to the verifier. So far, normal interactivity has been performed.

Thereafter, it will be assumed that the verifier further challenges a response Rsp corresponding to a challenge Ch=1 to the prover. If the prover sends the response Rsp responding to the challenge Ch=1 to the verifier in response to the challenge, a secret key may be leaked to the verifier. The leakage of the secret key can occur in practice. For example, the verifier may feign to send the challenge Ch=0 rather than the challenge Ch=1 at the second pass and may further challenge the response Rsp responding to the challenge Ch=1. On the other hand, the prover may misunderstand that bits of the challenge Ch sent at the second pass turn into different bits due to a communication error.

Accordingly, the inventors of the present technology have devised, as a method of avoiding leakage of a secret key, a method of terminating interactivity or resuming the interactivity from the first pass using a new random number when a prover challenges a response corresponding to challenges Ch of two or more methods with respect to a message of one time. When this method is applied, a secret key is not leaked even when a verifier feigns and challenges a response corresponding to challenges Ch of two or more methods.

(6-2-2: Responding Method by Verifier)

Next, a probability of a prover feigning and challenging resending of a challenge Ch will be considered. For example, assumes that a prover sends messages $(c_0, c_1, c_2)$ to a verifier in the 3-pass scheme, the verifier sends the challenge Ch=0 to the prover, and then the prover challenges resending of the challenge Ch. When the verifier randomly reselects the challenge Ch in response to the challenge, there is a probability of the challenge Ch=1, which is different from the previously sent challenge Ch=0, being selected. In this case, the challenge Ch=1 is sent from the verifier to the prover. It is assumed that the prover can send the response Rsp corresponding to the challenge Ch=1 to the verifier.

In this case, the prover can respond to the challenge Ch=1, but may not respond to the challenge Ch=0. That is, a probability of the prover deceiving the verifier is undeniable. For example, the prover may challenge resending of the challenge Ch to the verifier since the prover loses the challenge Ch. On the other hand, the verifier may consider the previously sent challenge to be lost due to a communication error and resend the challenge Ch in response to the challenge of the prover. Then, when the resent challenge Ch is different from the previous sent challenge Ch, the forgery may succeed.

As understood from this example, the prover may face a risk of forgery since the challenge Ch is randomly selected. Accordingly, in order not to present a risk of forgery, the inventors of the present technology have devised a method of improving the interactive protocol by causing the verifier to terminate interactivity or resending the challenge Ch which is the same as the previous challenge rather than generating a new random number when the prover re-challenges sending of the challenge Ch with respect to a message of one time. Applying this method enables elimination of a risk of forgery using a challenge to resend a challenge Ch.

The safe method of responding to an irregular challenge has been described above. In the foregoing description, the basic structure of the 3-pass has been exemplified. However, the security can be improved by also applying the same idea to the serial repetition structure, a parallel repetition structure, or a hybrid type repetition structure. Of course, the same can also apply to the algorithms related to the 5-pass.

<7: Example of Hardware Configuration>

Each algorithm described above can be performed by using, for example, the hardware configuration of the information processing apparatus shown in FIG. 28. That is, processing of each algorithm can be realized by controlling the hardware shown in FIG. 28 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 28, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<8: Summary>

Lastly, the technical contents according to the embodiment of the present technology will be briefly described. The technical contents stated here can be applied to various information processing apparatuses, such as a personal computer, a mobile phone, a game machine, an information terminal, an information appliance, a car navigation system, and the like. Further, the function of the information processing apparatus described below can be realized by using a single information processing apparatus or using a plurality of information processing apparatuses. Furthermore, a data storage means and an arithmetic processing means which are used for performing a process by the information processing apparatus described below may be mounted on the information processing apparatus, or may be mounted on a device connected via a network.

The functional configuration of the foregoing information processing apparatus is realized as follows. For example, an information processing apparatus described in the following (1) has a function of executing an algorithm related to an efficient public-key authentication scheme that bases its safety on the difficulty of solving multi-order multivariate simultaneous equations.

(1)

An information processing apparatus including:

a message generation unit that generates a message based on a pair of multi-order multivariate polynomials $F=(f_1, \ldots, f_m)$ and a vector s that is an element of a set $K^n$;

a message supply unit that supplies the message to a verifier storing the pair of multi-order multivariate polynomials F and vectors $y=(y_1, \ldots, y_m)=(f_1(s), \ldots, f_m(s))$;

an intermediate information generation unit that generates third information based on first information randomly selected by the verifier and second information obtained at a time of generation of the message;

an intermediate information supply unit that supplies the third information to the verifier; and a response supply unit that supplies the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_l=(x_{l1}, \ldots, x_{ln})$ (where l=1, 2) is configured as a term proportional to $(x_{1,i})^{q(z)}$ (where 1≤i≤n, $q(z)=q^z$, and 1≤z≤k).

(2)

The information processing apparatus according to (1), wherein the message generation unit generates the messages of N times (where N≥2), wherein the message supply unit supplies the verifier with the messages of the N times with interactivity of one time;

wherein the intermediate information generation unit generates the third information of the N times based on the first information selected by the verifier for the messages of the N times and the second information of the N times obtained at the time of the generation of the messages, wherein the intermediate information supply unit supplies the verifier with the third information of the N times with interactivity of one time, and wherein the response supply unit supplies the verifier with the response information of the N times corresponding to the verification pattern selected by the verifier for the messages of the N times, with interactivity of one time.

(3)

The information processing apparatus according to (2), wherein the message generation unit generates the messages of the N times (where N≥2) and generates one hash value from the messages of the N times, wherein the message supply unit supplies the hash value to the verifier, wherein the intermediate information generation unit generates the third information of the N times based on the first information selected by the verifier for each of the messages of the N times and the second information of the N times obtained at the time of the generation of the messages, wherein the intermediate information supply unit supplies the verifier with the third information of the N times with interactivity of one time, and wherein the response supply unit supplies the verifier with the response information of the N times corresponding to the verification pattern selected by the verifier for each of the messages of the N times and some of messages not obtained even in execution of the calculation prepared in advance for the verification pattern corresponding to the response information based on the public keys and the response information, with interactivity of one time.

(4)
An information processing apparatus including:
an information storage unit that stores a pair of multi-order multivariate polynomials $F=(f_1, \ldots, f_m)$ and vectors $y=(y_1, \ldots, y_m)=(f_1(s), \ldots, f_m(s))$;
a message acquisition unit that acquires a message generated based on the pair of multi-order multivariate polynomials F and a vector s which is an element of a set $K^n$;
an information supply unit that supplies randomly selected first information to a prover that supplies the message;
an intermediate information acquisition unit that acquires third information generated by the prover based on the first information and second information obtained at a time of generation of the message;
a pattern information supply unit that supplies the prover with information on one verification pattern randomly selected from among k (where k≥3) verification patterns;
a response acquisition unit that acquires response information corresponding to the selected verification pattern from the prover; and
a verification unit that verifies whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1i})^{q(z)}$ (where 1≤i≤n, $q(z)=q^z$, and 1≤z≤k).

(5)
The information processing apparatus according to (4),
wherein the message acquisition unit acquires the messages of N (where N≥2) times with interactivity of one time,
wherein the information supply unit randomly selects the first information for each of the messages of the N times and supplies the prover with the selected first information of the N times with interactivity of one time,
wherein the intermediate information acquisition unit acquires the third information of the N times generated by the prover based on the first information of the N times and the second information of the N times obtained at the time of the generation of the messages of the N times, wherein the pattern information supply unit selects the verification pattern for each of the messages of the N times and supplies the prover with information on the selected verification patterns of the N times with interactivity of one time, wherein the response acquisition unit acquires the response information of the N times corresponding to the selected verification patterns of the N times from the prover with interactivity of one time, and wherein the verification unit determines that the prover stores the vector s, when verification succeeds for all of the messages of the N times.

(6)
The information processing apparatus according to (5),
wherein the message acquisition unit acquires one hash value generated from the messages of the N times (where N≥2),
wherein the information supply unit randomly selects the first information for each of the messages of the N times and supplies with the prover with the selected first information of the N times with interactivity of one time,
wherein the intermediate information acquisition unit acquires the third information of the N times generated by the prover based on the first information of the N times and the second information of the N times obtained at the time of the generation of the messages of the N times,
wherein the pattern information supply unit selects the verification pattern for each of the messages of the N times and supplies the prover with the information on the selected verification patterns of the N times with interactivity of one time,
wherein the response acquisition unit acquires, from the prover, the response information corresponding to the selected verification pattern and some of the messages not obtained even in execution of the calculation prepared in advance for the verification pattern corresponding to the response information based on the public keys, the first information, the third information, and the response information, and
wherein the verification unit verifies whether or not the prover stores the vector s based on the hash value, some of the messages, the public keys, and the response information and determines that the prover stores the vector s, when the verification succeeds for all of the messages of the N times.

(7)
An information processing method including:
generating a message based on a pair of multi-order multivariate polynomials $F=(f_1, \ldots, f_m)$ and a vector s that is an element of a set $K^n$;
supplying the message to a verifier storing the pair of multi-order multivariate polynomials F and vectors $y=(y_1, y_{ln})=(f_1(s), \ldots, f_m(s))$;
generating third information based on first information randomly selected by the verifier and second information obtained at a time of generation of the message;
supplying the third information to the verifier; and
supplying the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_l=(x_{l1}, x_{ln})$ (where l=1, 2) is configured as a term proportional to $(x_{1i})^{q(z)}$ (where $1 \le i \le n$, $q(z)=q^z$, and $1 \le z \le k$).

(8)

An information processing method including: by an information processing apparatus storing a pair of multi-order multivariate polynomials $F=(f_1, \ldots, f_m)$ and vectors $y=(y_1, \ldots, y_m)$ $(f_1(s), \ldots, f_m(s))$, acquiring a message generated based on the pair of multi-order multivariate polynomials F and a vector s which is an element of a set $K^n$;

supplying randomly selected first information to a prover that supplies the message;

acquiring third information generated by the prover based on the first information and second information obtained at a time of generation of the message;

supplying the prover with information on one verification pattern randomly selected from among k (where k≥3) verification patterns; and acquiring response information corresponding to the selected verification pattern from the prover;

verifying whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_l=(x_{l1}, \ldots, x_{ln})$ (where l=1, 2) is configured as a term proportional to $(x_{1i})^{q(z)}$ (where $1 \le i \le n$, $q(z)=q^z$, and $1 \le z \le k$).

(9)

A program causing a computer to realize:

a message generation function of generating a message based on a pair of multi-order multivariate polynomials $F=(f_1, \ldots, f_m)$ and a vector s that is an element of a set $K^n$;

a message supply function of supplying the message to a verifier storing the pair of multi-order multivariate polynomials F and vectors $y=(y_1, \ldots, y_m)=(f_1(s), \ldots, f_m(s))$;

an intermediate information generation function of generating third information based on first information randomly selected by the verifier and second information obtained at a time of generation of the message;

an intermediate information supply function of supplying the third information to the verifier; and a response supply function of supplying the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_l=(x_{l1}, \ldots, x_{ln})$ (where l=1, 2) is configured as a term proportional to $(x_{1i})^{q(z)}$ (where $1 \le i \le n$, $q(z)=q^z$, and $1 \le z \le k$).

(10)

A program causing a computer to realize:

an information storage function of storing a pair of multi-order multivariate polynomials $F=(f_1, \ldots, f_m)$ and vectors $y=(y_1, \ldots, y_m)=(f_1(s), \ldots, f_m(s))$;

a message acquisition function of acquiring a message generated based on the pair of multi-order multivariate polynomials F and a vector s which is an element of a set $K^n$;

an information supply function of supplying randomly selected first information to a prover that supplies the message;

an intermediate information acquisition function of acquiring third information generated by the prover based on the first information and second information obtained at a time of generation of the message;

a pattern information supply function of supplying the prover with information on one verification pattern randomly selected from among k (where k≥3) verification patterns; and a response acquisition unit of acquiring response information corresponding to the selected verification pattern from the prover;

a verification function that verifies whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_l=(x_{l1}, \ldots, x_{ln})$ (where l=1, 2) is configured as a term proportional to $(x_{1i})^{q(z)}$ (where $1 \le i \le n$, $q(z)=q^z$, and $1 \le z \le k$).

(11)

A computer-readable recording medium having a program recorded thereon, the program causing a computer to realize:

a message generation function of generating a message based on a pair of multi-order multivariate polynomials $F=(f_1, \ldots, f_m)$ and a vector s that is an element of a set $K^n$;

a message supply function of supplying the message to a verifier storing the pair of multi-order multivariate polynomials F and vectors $y=(y_1, \ldots, y_m)=(f_1(s), \ldots, f_m(s))$;

an intermediate information generation function of generating third information based on first information randomly selected by the verifier and second information obtained at a time of generation of the message;

an intermediate information supply function of supplying the third information to the verifier; and a response supply function of supplying the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1i})^{q(z)}$ (where 1≤i≤n, $q(z)=q^z$, and 1≤z≤k).

(12) A computer-readable recording medium having a program recorded thereon, the program causing a computer to realize:

an information storage function of storing a pair of multi-order multivariate polynomials $F=(f_1, \ldots, f_m)$ and vectors $y=(y_1, \ldots, y_m)=(f_1(s), \ldots, f_m(s))$;

a message acquisition function of acquiring a message generated based on the pair of multi-order multivariate polynomials F and a vector s that is an element of a set $K^n$;

an information supply function of supplying randomly selected first information to a prover that supplies the message;

an intermediate information acquisition function of acquiring third information generated by the prover based on the first information and second information obtained at a time of generation of the message;

a pattern information supply function of supplying the prover with information on one verification pattern randomly selected from among k (where k≥3) verification patterns;

a response acquisition unit of acquiring response information corresponding to the selected verification pattern from the prover; and a verification function of verifying whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1i})^{q(z)}$ (where 1≤i≤n, $q(z)=q^z$, and 1≤z≤k).

(13) The apparatus according to any one of (1) to (6), wherein m and n described above have a relation of m<n.

(14) The apparatus according to (13), wherein m and n described above have a relation of $2^{m-n} \ll 1$.

(Remark)

The foregoing prover algorithm P is an example of the message generation unit, the message supply unit, the response supply unit, the intermediate information generation unit, and the intermediate information supply unit. Additionally, the foregoing verifier algorithm V is an example of the information storage unit, the message acquisition unit, the pattern information supply unit, the response acquisition unit, the verification unit, and the intermediate information acquisition unit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

Gen key generation algorithm
P prover algorithm
V verifier algorithm
Sig signature generation algorithm
Ver signature verifying algorithm

The invention claimed is:

1. An information processing apparatus comprising:
circuitry configured to
  generate a message based on a pair of multi-order multivariate polynomials $F=(f_1, \ldots, f_m)$ and a vector s that is an element of a set $K^n$;
  supply the message to a verifier storing the pair of multi-order multivariate polynomials F and vectors $y=(y_1, \ldots, y_m)=(f_1(s), \ldots, f_m(s))$;
  generate third information based on first information randomly selected by the verifier and second information obtained at a time of generation of the message;
  supply the third information to the verifier; and
  supply the verifier with response information corresponding to a verification pattern which the verifier selects from among k (where k≥2) verification patterns,
wherein the vector s is a secret key,
wherein the pair of multi-order multivariate polynomials F and the vectors y are public keys,
wherein the message is information obtained by executing calculation prepared in advance for the verification pattern corresponding to the response information based on the public keys, the first information, the third information, and the response information, and
wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1i})^{q(z)}$ (where 1≤i≤n, $q(z)=q^z$, and 1≤z≤k).

2. The information processing apparatus according to claim 1, wherein the circuitry
generates the messages of N times (where N≥2),
supplies the verifier with the messages of the N times with interactivity of one time;
generates the third information of the N times based on the first information selected by the verifier for the messages of the N times and the second information of the N times obtained at the time of the generation of the messages,
supplies the verifier with the third information of the N times with interactivity of one time, and supplies the verifier with the response information of the N times corresponding to the verification pattern selected by the verifier for the messages of the N times, with interactivity of one time.

3. The information processing apparatus according to claim 2, wherein the circuitry
generates the messages of the N times (where N≥2) and generates one hash value from the messages of the N times,
supplies the hash value to the verifier,
generates the third information of the N times based on the first information selected by the verifier for each of the messages of the N times and the second information of the N times obtained at the time of the generation of the messages,
supplies the verifier with the third information of the N times with interactivity of one time, and
supplies the verifier with the response information of the N times corresponding to the verification pattern selected by the verifier for each of the messages of the N times and some of messages not obtained even in execution of the calculation prepared in advance for the verification pattern corresponding to the response information based on the public keys and the response information, with interactivity of one time.

4. The information processing apparatus according to claim 1, wherein the circuitry is configured to supply the message, the third information, and the response information to circuitry of the verifier via a communication link.

5. An information processing apparatus comprising:
circuitry configured to
store a pair of multi-order multivariate polynomials $F=(f_1, \ldots, f_m)$ and vectors $y=(y_1, \ldots, y_m)=(f_1(s), \ldots, f_m(s))$;
acquire a message generated based on the pair of multi-order multivariate polynomials F and a vector s which is an element of a set $K^n$;
supply randomly selected first information to a prover that supplies the message;
acquire third information generated by the prover based on the first information and second information obtained at a time of generation of the message;
supply the prover with information on one verification pattern randomly selected from among k (where k≥3) verification patterns;
acquire response information corresponding to the selected verification pattern from the prover; and
verify whether or not the prover stores the vector s based on the message, the first information, the third information, the pair of multi-order multivariate polynomials F, and the response information,
wherein the vector s is a secret key,
wherein the pair of multi-order multivariate polynomials F and the vectors y are public keys,
wherein the message is information obtained by executing calculation prepared in advance for the verification pattern corresponding to the response information based on the public keys, the first information, the third information, and the response information, and
wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2)=F(x_1+x_2)-F(x_1)-F(x_2)$ with respect to vectors $x_1=(x_{l1}, \ldots, x_{ln})$ (where l=1, 2) is configured as a term proportional to $(x_{1i})^{q(z)}$ (where 1≤i≤n, $q(z)=q^z$, and 1≤z≤k).

6. The information processing apparatus according to claim 5, wherein the circuitry
acquires the messages of N (where N≥2) times with interactivity of one time,
randomly selects the first information for each of the messages of the N times and supplies the prover with the selected first information of the N times with interactivity of one time,
acquires the third information of the N times generated by the prover based on the first information of the N times and the second information of the N times obtained at the time of the generation of the messages of the N times,
selects the verification pattern for each of the messages of the N times and supplies the prover with information on the selected verification patterns of the N times with interactivity of one time,
acquires the response information of the N times corresponding to the selected verification patterns of the N times from the prover with interactivity of one time, and
determines that the prover stores the vector s, when verification succeeds for all of the messages of the N times.

7. The information processing apparatus according to claim 6, wherein the circuitry
acquires one hash value generated from the messages of the N times (where N≥2),
randomly selects the first information for each of the messages of the N times and supplies with the prover with the selected first information of the N times with interactivity of one time,
acquires the third information of the N times generated by the prover based on the first information of the N times and the second information of the N times obtained at the time of the generation of the messages of the N times,
selects the verification pattern for each of the messages of the N times and supplies the prover with the information on the selected verification patterns of the N times with interactivity of one time,
acquires, from the prover, the response information corresponding to the selected verification pattern and some of the messages not obtained even in execution of the calculation prepared in advance for the verification pattern corresponding to the response information based on the public keys, the first information, the third information, and the response information, and
verifies whether or not the prover stores the vector s based on the hash value, some of the messages, the public keys, and the response information and determines that the prover stores the vector s, when the verification succeeds for all of the messages of the N times.

8. The information processing apparatus according to claim 5, wherein the circuitry is configured to supply the randomly selected first information and the information on the one verification pattern to circuitry of the prover via a communication link.

9. An information processing method comprising:
generating a message based on a pair of multi-order multivariate polynomials $F=(f_1, \ldots, f_m)$ and a vector s that is an element of a set $K^n$;
supplying, by circuitry of an information processing apparatus, the message to a verifier storing the pair of multi-order multivariate polynomials F and vectors $y=(y_1, \ldots, y_m)=(f_1(s), \ldots, f_m(s))$;
generating, by the circuitry, third information based on first information randomly selected by the verifier and second information obtained at a time of generation of the message;

supplying, by the circuitry, the third information to the verifier; and supplying, by the circuitry, the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2) = F(x_1 + x_2) - F(x_1) - F(x_2)$ with respect to vectors $x_1 = (x_{l1}, \ldots, x_{ln})$ (where l=1, 2) is configured as a term proportional to $(x_{1i})^{q(z)}$ (where 1≤i≤n, $q(z) = q^z$, and 1≤z≤k).

10. The information processing method according to claim 9, wherein the message, the third information, and the response information are supplied by the circuitry of the information processing apparatus to circuitry of the verifier via a communication link.

11. An information processing method comprising: by an information processing apparatus storing a pair of multi-order multivariate polynomials $F=(f_1, \ldots, f_m)$ and vectors $y=(y_1, Y_m)=(f_1(s), f_m(s))$, acquiring a message generated based on the pair of multi-order multivariate polynomials F and a vector s which is an element of a set $K^n$;

supplying, by circuitry of an information processing apparatus, randomly selected first information to a prover that supplies the message;

acquiring third information generated by the prover based on the first information and second information obtained at a time of generation of the message;

supplying, by the circuitry, the prover with information on one verification pattern randomly selected from among k (where k≥3) verification patterns; and acquiring response information corresponding to the selected verification pattern from the prover;

verifying, by the circuitry, whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2) = F(x_1 + x_2) - F(x_1) - F(x_2)$ with respect to vectors $x_1 = (x_{l1}, \ldots, x_{ln})$ (where l=1, 2) is configured as a term proportional to $(x_{1i})^{q(z)}$ (where 1≤i≤n, $q(z) = q^z$, and 1≤z≤k).

12. The information processing method according to claim 11, wherein the randomly selected first information and the information on the one verification pattern are supplied by the circuitry of the information processing apparatus to circuitry of the prover via a communication link.

13. A non-transitory computer-readable recording medium having a program recorded thereon, the program causing a computer to:

generate a message based on a pair of multi-order multivariate polynomials $F=(f_1, \ldots, f_m)$ and a vector s that is an element of a set $K^n$;

supply the message to a verifier storing the pair of multi-order multivariate polynomials F and vectors $y=(y_1, \ldots, y_m)=(f_1(s), \ldots, f_m(s))$;

generate third information based on first information randomly selected by the verifier and second information obtained at a time of generation of the message;

supply the third information to the verifier; and supply the verifier with response information corresponding to a verification pattern which the verifier selects from among k (where k≥2) verification patterns, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2) = F(x_1 + x_2) - F(x_1) - F(x_2)$ with respect to vectors $x_1 = (x_{l1} \ldots, x_{ln})$ (where l=1, 2) is configured as a term proportional to $(x_{1i})^{q(z)}$ (where 1≤i≤n, $q(z) = q^z$, and 1≤z≤k).

14. The non-transitory computer-readable recording medium of claim 13, wherein the program causes the computer to supply the message, the third information, and the response information to circuitry of the verifier via a communication link.

15. A non-transitory computer-readable recording medium having a program recorded thereon, the program causing a computer to:

store a pair of multi-order multivariate polynomials $F=(f_1, \ldots, f_m)$ and vectors $y=(y_1, \ldots, y_m)=(f_1(s), \ldots, f_m(s))$;

acquire a message generated based on the pair of multi-order multivariate polynomials F and a vector s that is an element of a set $K^n$;

supply randomly selected first information to a prover that supplies the message;

acquire third information generated by the prover based on the first information and second information obtained at a time of generation of the message;

supply the prover with information on one verification pattern randomly selected from among k (where k≥3) verification patterns;

acquire response information corresponding to the selected verification pattern from the prover; and verify whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained by executing calculation prepared in advance for the verification pattern corresponding to the response information based on the public keys, the first information, the third information, and the response information, and wherein the pair of multi-order multivariate polynomials F include polynomials $f_1, \ldots, f_m$ defined in a ring R of a characteristic q and an order $q^k$ and are set in a manner that a polynomial $G(x_1, x_2)$ defined as $G(x_1, x_2) = F(x_1 + x_2) - F(x_1) - F(x_2)$ with respect to vectors $x_l = (x_{l1}, \ldots, x_{ln})$ (where l=1, 2) is configured as a term proportional to $(x_{l,i})^{q(z)}$ (where $1 \le i \le n$, $q(z) = q^z$, and $1 \le z \le k$).

16. The non-transitory computer-readable recording medium of claim 15, wherein the program causes the computer to supply the randomly selected first information and the information on the one verification pattern to circuitry of the prover via a communication link.

* * * * *